US008276538B2

(12) United States Patent
Ling et al.

(10) Patent No.: US 8,276,538 B2
(45) Date of Patent: Oct. 2, 2012

(54) PAINTING APPARATUSES AND METHODS

(75) Inventors: Jeremy J. Ling, St. Paul, MN (US); Britt K. Norton, Eden Prairie, MN (US); Jason Gerold, Shakopee, MN (US)

(73) Assignee: Depingo, LLC, St. Paul, MN (US)

( * ) Notice: Subject to any disclaimer, the term of this patent is extended or adjusted under 35 U.S.C. 154(b) by 0 days.

(21) Appl. No.: 13/308,183

(22) Filed: Nov. 30, 2011

(65) Prior Publication Data

US 2012/0134737 A1 May 31, 2012

Related U.S. Application Data

(63) Continuation-in-part of application No. 12/047,660, filed on Mar. 13, 2008.

(60) Provisional application No. 60/894,727, filed on Mar. 14, 2007, provisional application No. 60/997,813, filed on Oct. 5, 2007, provisional application No. 61/465,342, filed on Mar. 17, 2011.

(51) Int. Cl.

| | |
|---|---|
| ***B05C 1/06*** | (2006.01) |
| ***B05C 1/14*** | (2006.01) |
| ***B05C 1/08*** | (2006.01) |
| ***B05C 11/00*** | (2006.01) |
| ***A46B 11/00*** | (2006.01) |
| ***A46B 11/04*** | (2006.01) |
| ***A46B 13/00*** | (2006.01) |
| ***B43K 5/06*** | (2006.01) |
| ***B43K 5/00*** | (2006.01) |
| ***A47L 13/22*** | (2006.01) |
| ***A47L 11/00*** | (2006.01) |
| ***A63B 47/04*** | (2006.01) |
| ***A63D 5/10*** | (2006.01) |
| ***B60S 3/00*** | (2006.01) |

(52) U.S. Cl. ........ 118/264; 118/256; 118/259; 118/260; 118/265; 118/266; 401/119; 401/176; 401/179; 401/180; 401/204; 401/270; 15/22.1; 15/97.1

(58) Field of Classification Search ........................ None
See application file for complete search history.

(56) References Cited

U.S. PATENT DOCUMENTS 1,818,281 A 8/1931 Soss
2,295,849 A 9/1942 Kayden
(Continued)

OTHER PUBLICATIONS

"Quick Painter Instructions", www.homeright.com/manuals/820327-a.pdf, (Aug. 2002), 2 pgs.

(Continued)

*Primary Examiner* — Laura Edwards
*Assistant Examiner* — Binu Thomas
(74) *Attorney, Agent, or Firm* — Merchant & Gould P.C.

(57) ABSTRACT

A paint edging apparatus includes a body having front and rear ends defining a longitudinal axis therebetween, the body receiving a paint reservoir for supplying paint to an applicator portion of the apparatus, the body including a handle extending rearwardly at an acute angle relative to the longitudinal axis. An urging mechanism selectively engages the paint reservoir to discharge paint therefrom. A vibrator mounted to the body and operatively connected to the paint applicator portion of the apparatus imparts an oscillatory motion to the paint applicator. A trigger is pivotally mounted to the handle for activating the vibrator, wherein a user can move the apparatus over a work surface to apply paint to the work surface and also pivot the trigger at the same time by grasping the handle with a single hand.

20 Claims, 45 Drawing Sheets

U.S. PATENT DOCUMENTS

| | | | | |
|---|---|---|---|---|
| 2,509,954 | A | | 5/1950 | Barnes et al. |
| 2,913,151 | A | | 11/1959 | Wiseman et al. |
| 3,030,652 | A | | 4/1962 | Whitfield et al. |
| 3,175,242 | A | | 3/1965 | Kamondy et al. |
| 3,231,917 | A | | 2/1966 | Reed |
| 3,441,355 | A | | 4/1969 | Brown |
| 3,561,360 | A | | 2/1971 | Branfield et al. |
| 4,167,349 | A | | 9/1979 | Testa |
| 4,202,333 | A | | 5/1980 | Thill et al. |
| 4,222,678 | A | | 9/1980 | Miller |
| 4,250,586 | A | * | 2/1981 | Timian ........................... 401/204 |
| 4,293,584 | A | | 10/1981 | Clayton |
| 4,298,000 | A | | 11/1981 | Thill et al. |
| 4,422,788 | A | | 12/1983 | Braithwaite et al. |
| 4,430,079 | A | | 2/1984 | Thill et al. |
| 4,431,326 | A | | 2/1984 | Braithwaite et al. |
| 4,457,642 | A | | 7/1984 | Braithwaite et al. |
| 4,537,522 | A | | 8/1985 | Charney et al. |
| 4,552,477 | A | | 11/1985 | Braithwaite et al. |
| 4,566,816 | A | | 1/1986 | Janssen |
| 4,597,754 | A | | 7/1986 | Thill et al. |
| 4,611,941 | A | | 9/1986 | Karliner et al. |
| 4,732,503 | A | | 3/1988 | Bader et al. |
| 4,955,748 | A | | 9/1990 | Krumholz |
| 4,983,061 | A | | 1/1991 | Demarest |
| 5,054,947 | A | | 10/1991 | Frank et al. |
| 5,181,636 | A | | 1/1993 | Anderson et al. |
| 5,189,751 | A | | 3/1993 | Giuliani et al. |
| 5,299,877 | A | | 4/1994 | Birden |
| 5,331,710 | A | | 7/1994 | Tollasepp |
| 5,407,287 | A | | 4/1995 | Braun et al. |
| 5,413,258 | A | | 5/1995 | Kartler |
| 5,454,656 | A | | 10/1995 | Rowe |
| 5,496,123 | A | * | 3/1996 | Gaither .......................... 401/176 |
| 5,692,642 | A | | 12/1997 | Brattesani |
| 5,887,765 | A | | 3/1999 | Broesamle |
| 5,890,249 | A | | 4/1999 | Hoffman |
| 5,933,905 | A | * | 8/1999 | Hess ............................. 118/264 |
| 5,946,760 | A | | 9/1999 | Eames |
| 6,056,466 | A | | 5/2000 | Johnson et al. |
| 6,099,184 | A | | 8/2000 | Koptis |
| 6,206,599 | B1 | | 3/2001 | Buchanan et al. |
| 6,276,860 | B1 | | 8/2001 | Nakajima et al. |
| 6,294,021 | B1 | | 9/2001 | Platzcke et al. |
| 6,425,701 | B1 | | 7/2002 | Jacobs |
| 6,453,498 | B1 | | 9/2002 | Wu |
| 6,530,107 | B2 | | 3/2003 | Kim |
| 6,865,769 | B1 | | 3/2005 | Sorenson |
| 6,893,180 | B2 | | 5/2005 | Hall et al. |
| 6,899,485 | B2 | | 5/2005 | Hall et al. |
| 6,976,802 | B2 | | 12/2005 | Hall et al. |
| 6,981,611 | B2 | | 1/2006 | Carruth et al. |
| 6,986,618 | B2 | | 1/2006 | Hall et al. |
| 6,986,619 | B2 | | 1/2006 | Hall et al. |
| 6,986,620 | B2 | | 1/2006 | Abbas |
| 7,004,658 | B2 | | 2/2006 | Hall et al. |
| 7,024,718 | B2 | | 4/2006 | Chu et al. |
| 7,048,458 | B2 | | 5/2006 | Hall et al. |
| 7,090,421 | B1 | | 8/2006 | Mead et al. |
| 7,182,538 | B2 | | 2/2007 | Grosso et al. |
| 7,407,336 | B2 | * | 8/2008 | Giacomo ....................... 401/287 |
| 7,517,334 | B2 | | 4/2009 | Jacobs et al. |
| 7,588,196 | B2 | | 9/2009 | Kuboto et al. |
| 7,704,004 | B2 | * | 4/2010 | Fisher ............................ 401/220 |
| 7,909,529 | B2 | | 3/2011 | Gallardo |
| 2003/0005536 | A1 | | 1/2003 | Kim |
| 2004/0107525 | A1 | | 6/2004 | Newman et al. |
| 2004/0205914 | A1 | | 10/2004 | Holden et al. |
| 2005/0111905 | A1 | | 5/2005 | Glover |
| 2005/0238413 | A1 | | 10/2005 | Grosso et al. |
| 2006/0039742 | A1 | | 2/2006 | Cable, Jr. et al. |
| 2006/0213017 | A1 | | 9/2006 | Bele et al. |
| 2006/0265821 | A1 | | 11/2006 | Hause |
| 2007/0020034 | A1 | | 1/2007 | Wang |
| 2007/0020035 | A1 | | 1/2007 | Bruggeman et al. |
| 2007/0086831 | A1 | | 4/2007 | Wold |
| 2007/0110505 | A1 | | 5/2007 | Frank et al. |
| 2008/0145137 | A1 | | 6/2008 | Bruggeman et al. |

OTHER PUBLICATIONS

"Wagner USA—Wagner Trim-It", http:www.wagnerspraytech.com/portal/trim_it_spray,43353,747.html, (accessed Feb. 27, 2008), 1 pg.

* cited by examiner

PAINTING APPARATUSES AND METHODS

CROSS-REFERENCE TO RELATED APPLICATIONS

The present application is a continuation-in part of U.S. patent application Ser. No. 12/047,660, entitled "Painting Apparatuses and Methods", filed Mar. 13, 2008, which application claims the benefit of priority, under 35 U.S.C. Section 119(e), to U.S. Provisional Patent Application Ser. No. 60/894,727, entitled "Powered Paint Applicator", filed on Mar. 14, 2007, and U.S. Provisional Patent Application Ser. No. 60/997,813, entitled "Vibrating Paint Tool with Dispensing Reservoir", filed on Oct. 5, 2007, the entireties of which are incorporated herein by reference. The present application also claims the benefit of priority, under 35 U.S.C. Section 119(e), to U.S. Provisional Patent Application Ser. No. 61/465,342, entitled "Paint Application Through Controlled Applicator Compression", filed on Mar. 17, 2011, the entirety of which is incorporated herein by reference.

BACKGROUND

When painting a surface, particularly in a trimming context, it is common to apply paint to a work surface in close proximity to another surface, which is either not to be painted or to be painted a different color, for instance. This other surface can be, for example, a window, a raised molding, an intersecting wall, an intersecting ceiling, etc. Various paint applicators exist for performing the trimming function. Such trimming tools have changed little over the years.

Various paint applicators have been devised for performing the trimming function. Paint brushes are one such type of paint applicator. Paint brushes can be inefficient and can be difficult to use to uniformly coat a surface with paint, potentially leaving brush marks or uneven color coverage. Paint brushes can also require a relatively large number of brush strokes to adequately coat an area, which can be time consuming, uncomfortable, and fatiguing to a painter. Furthermore, it can be difficult to control the bristles of a brush, which could result in getting paint on undesired surfaces unless such surfaces are masked. However, masking such surfaces can be inefficient, time consuming, and tedious. Additionally, brushes can have limited paint carrying capacity, which could result in additional time and motion in repeatedly reloading the bristles with paint. Brushes can also be relatively burdensome to clean, but throwing brushes away and replacing them can be relatively costly.

Paint pads are another type of paint applicator for use in trim painting, for instance. In some instances, paint pads can be easier to control than, for instance, brushes to potentially avoid the step of masking surfaces that are not intended to receive paint. Additionally, some paint pads can be relatively cheap to buy, such that a user may be more inclined to throw away the pad to save cleaning time. However, paint pads can be difficult to use to uniformly coat a surface with paint, potentially leading streak marks or uneven color coverage. Additionally, such paint pads are generally dragged across the work surface to apply paint thereto, which can include overcoming relatively high frictional forces between the pad and the work surface. This can result in a relatively uncomfortable and fatiguing hand motion and can also result in making the paint pad relatively difficult to control, and, in turn, less precise. Additionally, paint pads can have limited paint carrying capacity, which could result in additional time and motion in repeatedly reloading the pads with paint.

Some paint applicators, such as paint pad devices, can include paint reservoirs to limit paint reloading. However, such devices can be larger and heavier than other trimming tools and can be relatively clumsy to use and relatively difficult to control for trimming. Additionally, paint dispensing from the paint reservoirs of the devices can be uneven, sporadic, or otherwise difficult to control or gauge, which can lead to uneven paint coverage. Also, such devices can be relatively difficult to clean and can be fairly expensive to replace. For example, when cleaning such a device, it can be difficult, if not impossible, to completely wash all of the paint from bristles of the paint pad or the reservoir. The remaining paint in the bristles and the reservoir can harden and can lead to decreased performance in subsequent uses.

The typical process of painting large flat surfaces, such as interior walls in a building, normally involves a two-step process, no matter if the painter is a paid professional or a "do it yourself" homeowner. As noted above, in the first step, the painter may carefully apply paint adjacent to a trim element (commonly installed around doors, windows, stairways, flooring, cabinets, etc.) for which paint is not intended to be applied, or adjacent to an intersecting wall or ceiling surface that is to remain unpainted or is to remain a different color. This step is commonly referred to as "edging". The edging function is often accomplished by first masking the trim element, usually with an adhesive tape that acts as a barrier to paint. Paint is then applied during the edging process with a brush or pad made of short bristles or a foam material. In the second step the painter may apply paint to the remaining unpainted wall using a device such as a large brush or roller that can more quickly apply larger amounts of paint, and overlap the area that had been painted during the edging process. The order of the two steps is often reversed, but the general organization of painting activities into the two steps remains the same.

The edging function can be a tedious, time-consuming task, often with paint being applied to the trim element in spite of the efforts to prevent it. Application of masking tape to trim elements also adds time and cost to the painting project. While some trim elements may be made of wood or metal, to which masking tape usually adheres well, other trim elements may be made of other materials such as plastic or carpet to which masking tape may not adhere or may not seal well, allowing paint to leave an undesired stain on the trim element. The quality of the masking tape can also easily influence the quality of its adhesion to the trim element. Furthermore, most users struggle to apply masking tape precisely which either results in paint still getting applied to surfaces not intended to receive paint, or alternatively, a portion of a surface that was intended to be painted was inadvertently masked off and therefore couldn't be coated.

As noted above, various paint applicators exist for performing the edging function. Paint brushes are one such type of paint applicator. Paint brushes can be inefficient and can be difficult to use to uniformly coat a surface with paint, potentially resulting in paint coverage on trim elements not intended to be painted, as well as leaving undesirable brush marks or uneven coverage. For example, when a brush is first pressed against the surface to be painted, this action typically results in an initial excessive discharge of paint onto that surface. The excessive paint discharge is difficult to control and therefore tends to result in paint coverage on trim elements not intended to be painted. The initial excessive discharge also tends to create an uneven coating in which there is more paint where the brush initially contacted the surface compared to adjacent areas where the brush subsequently coated. Furthermore, it can be difficult to precisely control the bristles of a brush resulting in paint coverage on the intersecting surface or other areas not intended to receive paint. The limited paint carrying capacity of brushes is yet another shortcoming of this tool. For example, after the initial excessive discharge of paint onto the surface, the brush shortly thereafter is not able to deliver enough paint to adequately coat the surface to be painted. This shortcoming ultimately results in additional time and motion in re-loading the brush bristles with paint.

As noted previously, paint pads and foamed tipped applicators are other type of applicators used for performing the edging function. These applicators typically are lower cost alternatives to a paint brush. They share all of the same inefficiencies and shortcoming previously described above for brushes. Additionally paint pads and foamed tip applicators tend to be more sensitive to how they're pressed against the surface. For example, pushing too hard generally results in excessive paint discharge onto the surface. This excessive discharge of paint tends to get onto surfaces not intended to receive paint and/or creates an uneven coating, and sometimes even leads to drips, sags, or runs in the coating. Conversely, pushing these applicators too lightly against the surface tends to leave uneven and/or incomplete coverage of the surface to be painted.

At the conclusion of the edging process, the masking tape needs to be carefully removed. If the paint is still wet, it can be difficult to remove the tape without smudging the adjacent paint finish. If the paint is dry, it can be difficult to remove the tape without peeling or chipping some of the adjacent paint finish.

A device that provides better flow and placement control of paint, when painting adjacent to a trim element or intersecting surface, could eliminate the need for masking tape and provide a smoother, more uniform coating. Such a device would offer significant time savings and reduced damage to trim elements.

These issues with the edging function using existing applicators illustrate the need for a painting apparatus that allows for improved paint coverage, paint uniformity, and control of paint delivery. Furthermore, it would be beneficial for a painting apparatus to include a feed source that substantially uniformly delivers paint to the applicator to promote a uniform coating and eliminate pauses to reload the applicator with paint. Furthermore, it would also be beneficial to control and limit compression of the applicator against the surface to avoid excessive discharge of paint. Furthermore, it would also be beneficial to contain and control paint release from the applicator such that masking can be avoided.

SUMMARY

The present inventor has recognized, among other things, that there exists a need for a painting apparatus that allows for improved efficiency, paint coverage, paint uniformity, and control of paint delivery.

In some embodiments, an apparatus for painting a work surface includes a handle housing. A disposable painting module is configured to be removably engaged with the handle housing. The painting module includes a paint applicator configured to be removably engaged with the handle housing. The paint applicator is configured to apply paint to the work surface. A paint reservoir is fluidly coupled with the paint applicator and configured to be removably engaged with the handle housing. An urging mechanism is coupled to the handle housing and configured to interact with the paint reservoir to substantially uniformly discharge the paint from the paint reservoir and supply the paint to the paint applicator.

In some embodiments, an apparatus for painting a work surface includes a handle housing including an attachment surface configured to vibrate with respect to the handle housing. A disposable painting module is configured to be removably engaged with the handle housing. The painting module includes a paint applicator configured to be removably engaged with the attachment surface. The paint applicator is configured to apply paint to the work surface. A paint reservoir is fluidly coupled with the paint applicator and configured to be removably engaged with the handle housing. An urging mechanism includes a constant force spring. The urging mechanism is coupled to the handle housing and configured to interact with the paint reservoir to substantially uniformly discharge the paint from the paint reservoir and supply the paint to the paint applicator.

Furthermore, the present disclosure relates to inventive aspects that make use of the fluid flow characteristics of open cell foam structures, which could be naturally occurring (such as the sea sponge) or synthetic, and that are non-soluble in solvents used in paint preparation (e.g., water, petroleum distillates, etc.). Open cell foam structures possess voids that intersect each other, forming pathways through the solid through which fluid can flow. They are generally soft and compressible, and liquid can be absorbed into and pass through their cells. Liquid can subsequently be expressed from the open foam cells by compressing the foam and reducing available volume for fluid retention. The inventive aspects of the present disclosure utilize the liquid absorption, retention, and expression characteristics of open cell foam structures, in part, to provide smooth uniform coatings of paint on flat surfaces. While brushes do not necessarily have the cell structure of foams, their ability to take up, retain, and release liquids such as paint at variable rates depending on application pressure ("compression") makes them useful regarding the present disclosure as well.

Generally, the inventive aspects relate to an apparatus for painting a flat surface, consisting of an applicator made of a compressible material that can absorb, retain, and release paint, and a housing into which at least a portion of the applicator is recessed, the housing being connected to the apparatus and which may have side walls to contain and prevent paint from contacting a trim element or intersecting wall. The housing has projections directed toward the surface being painted that contact the surface and limit the amount of compression of the applicator when the apparatus is pushed against the surface, hereby controlling the release of paint from the applicator. The projections also help maintain a uniform pressure of the applicator against the surface being painted. The side walls may act as projections for these purposes. The size and shape of the applicator and housing combined with the amount of compression allowed by the projections determine and control paint application by controlling both localized and overall paint release rates from the applicator, as well as promoting uniform pressure of the applicator against the surface being painted. The apparatus may also have an integral paint feed source, either self-contained (such as with a syringe or cartridge) or through a pressurized feed tube connected to a larger container of paint, and paint release openings in the housing that are fluidly coupled to the integral paint feed source to provide a path for supplying paint to the applicator.

This summary is intended to provide an overview of subject matter of the present patent application. It is not intended to provide an exclusive or exhaustive explanation of the inventive aspects. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 20A is an external view of the embodiment with internal projections (not shown in this solid view).

FIG. 21A is an external view of one embodiment with internal projections (not shown in this solid view).

FIG. 22A is an external view of the embodiment with side walls serving as external projections.

FIG. 23A is a cross-section view of the housing and the applicator in unassembled form.

DETAILED DESCRIPTION

The present inventor has recognized, among other things, that there exists a need for a practical and cost effective powered paint applicator with a paint dispensing reservoir aimed at improving efficiency, coverage, uniformity, and control of paint delivery. It can be desirable that the apparatus includes a removable and disposable paint applicator and paint dispensing reservoir to make use and clean-up relatively efficient and relatively easy and to limit performance compromises of repeated cleaning and reuses. It can also be desirable that the device provide substantially uniform, continuous trimming capability so as to limit intermittent and varying paint dispensing rates. It can also be desirable for the device to provide relatively good tactile control and feedback to the user. It can be desirable for the device to be capable of operating from a battery source to limit, if not eliminate, reliance on AC power or power cords. It can also be desirable that the paint applicator be a lightweight hand-held apparatus to limit fatigue of the user.

The subject matter described herein may take form in a variety of embodiments, including but not limited to, the embodiments, components, arrangements of components, assembly methods and arrangements of methods, and apparatus usage procedures and arrangements of procedures as described below. The embodiments described, while possibly being preferred embodiments, are illustrative examples and are not meant to limit the invention described herein. As the invention utilizes the fluidic property of paint in order to apply paint to a surface, the use of the terms "paint" "fluid" and "liquid" are often used interchangeably, with the choice of term to help explain the concept but not meant to limit the invention herein.

Figure 1:
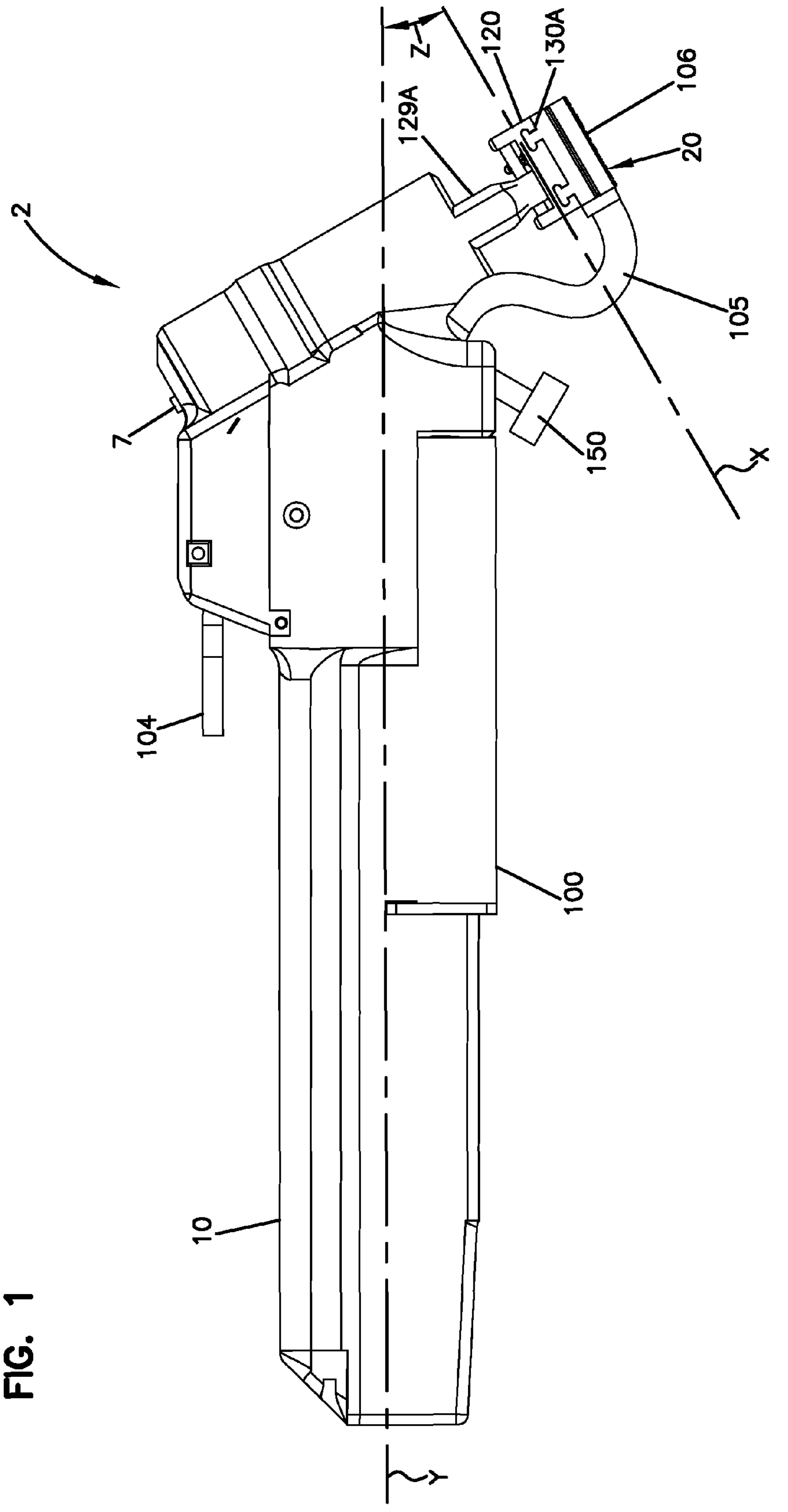
FIG. 1 is a side view of a painting apparatus according to some embodiments of the disclosed subject matter.
Figure 2:
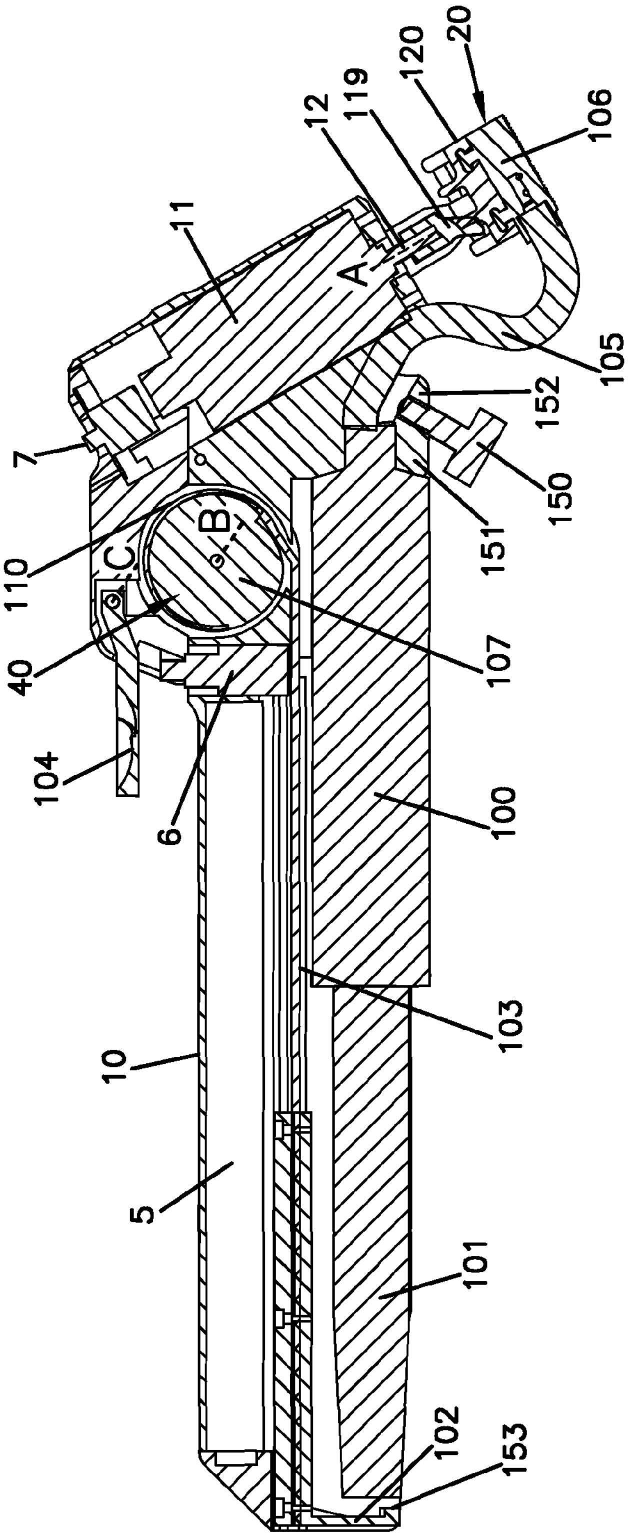
FIG. 2 is a side cross-sectional view of a painting apparatus according to some embodiments of the disclosed subject matter.

An example of a painting device or apparatus 2 is illustrated in FIG. 1 and is shown in section view in FIG. 2. In certain examples, the painting apparatus 2 is a vibrating paint tool with a dispensing reservoir for use in applying paint to a work surface. Referring to FIGS. 1 and 2, the device 2 includes a body 10. In certain examples, the body 10 is a handle housing that serves as a handle for a user to hold during use of the device 2. In one example, the body 10 is sized and shaped to allow for increased tactile feedback while painting. In certain examples, the body 10 includes a battery compartment 5 and a motor 11 disposed within the body 10. In certain examples, the motor 10 can be an electric motor, including, but not limited to a DC electric motor.

Figure 3:
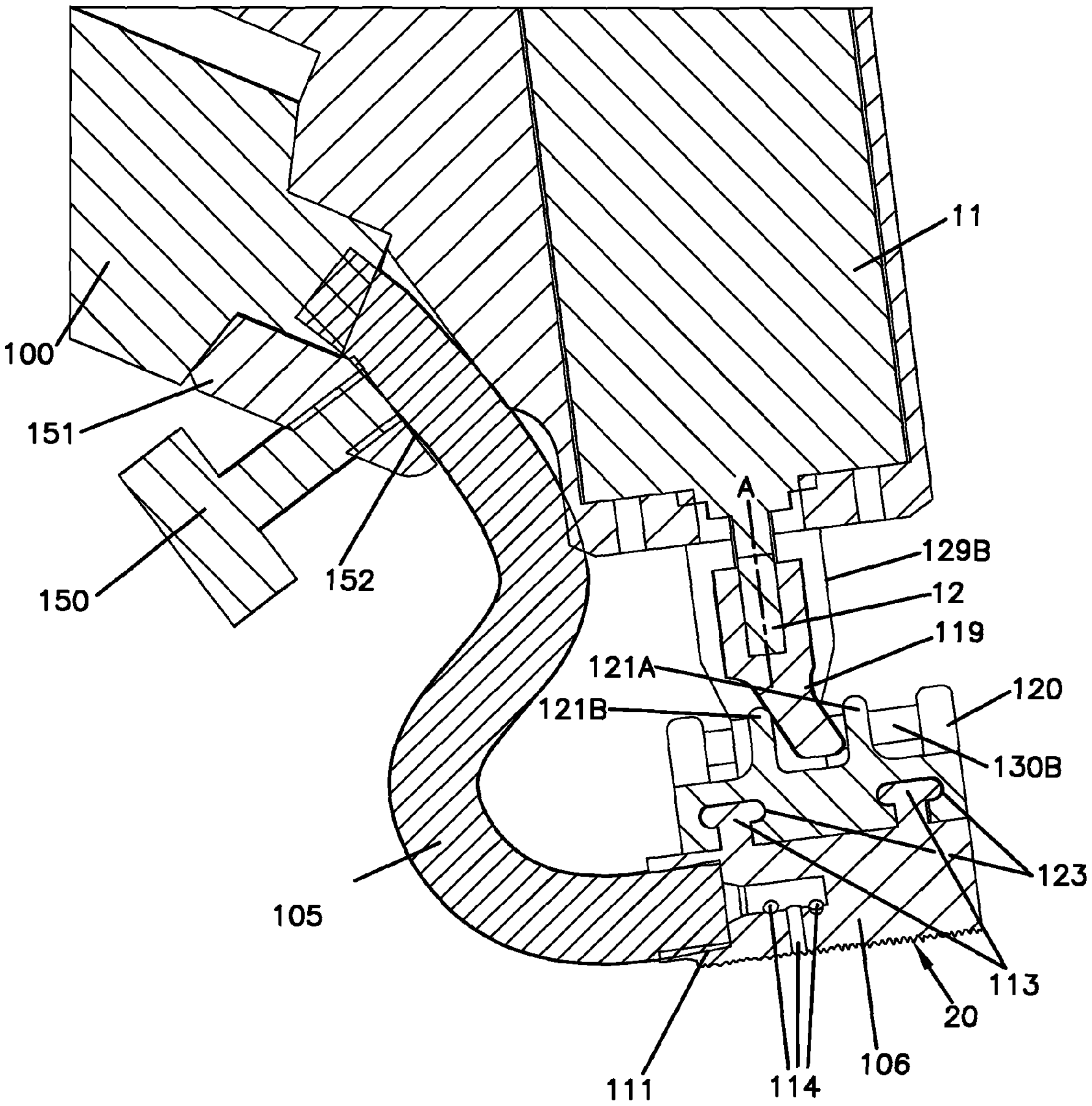
FIG. 3 is a cross-sectional view of a portion of a painting apparatus according to some embodiments of the disclosed subject matter, the painting apparatus including a paint applicator in a first position.
Figure 4:
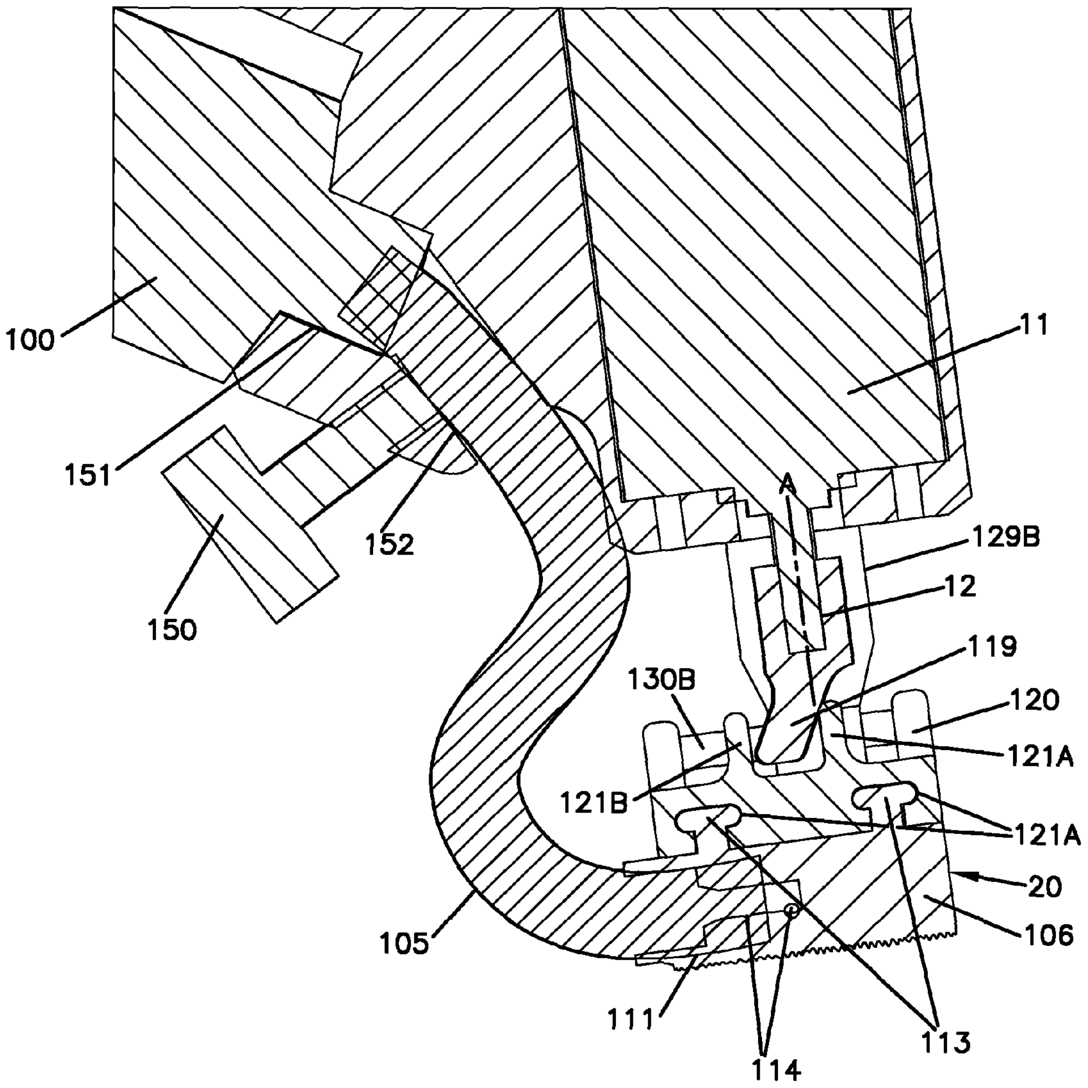
FIG. 4 is a cross-sectional view of a portion of a painting apparatus according to some embodiments of the disclosed subject matter, the painting apparatus including a paint applicator in a second position.

Referring to FIGS. 1-4, in one example, the motor 11 is a DC motor that receives current from one or more batteries within the compartment 5 via a momentary switch 6 and/or toggle switch 7. The motor output 12 couples to drive cam 119, as shown in FIGS. 2-4. When motor 11 receives current, the motor output 12 and a drive cam 119 rotate about a longitudinal axis A. In an example, the body 10 includes two support struts 129A, 129B, although in other examples, the body 10 can include more or less than two support struts. In some examples, a shuttle 120 attaches to the support struts 129A, 129B using shuttle pins 130A, 130B, as shown in FIGS. 1-4. The shuttle pins 130A, 130B can have a clearance connection with the supports struts 129A, 129B and can be rigidly connected to the shuttle 120. In some examples, as the drive cam 119 rotates about axis A, it comes into contact with a fore follower 121A and an aft follower 121B. In this manner, the shuttle 120 and shuttle pins 130A, 130B are caused to move. In some examples, the support struts 129A, 129B limit the motion of the shuttle pins 130A, 130B, and, in turn, the shuttle 120, to a single plane of motion disposed along a line X, which is substantially coplanar with a longitudinal axis Y of the body 10. Referring specifically to FIG. 1, the line X is offset from the longitudinal axis Y by an angle Z. Depending upon the application of the device 2, in some examples, the angle Z can be between zero degrees and 180 degrees. In this example, each revolution of the drive cam 119 moves the shuttle 120 forward and backward a distance within the plane of motion along the line X. FIG. 3 shows the drive cam 119 and shuttle 120 generally in a forward-most position, and FIG. 4 shows the drive cam 119 and shuttle 120 generally in an aft-most position. In this way, the shuttle 120 can be reciprocated, oscillated, or otherwise vibrated along the line X.

In certain examples, a paint applicator 20, including a manifold 106 and a paint pad 15, can be coupled to the shuttle 120, as will be described in more detail below, to move with the shuttle 120 in a forward and backward motion along the work surface to be painted. Such forward and rearward motion substantially in line with the longitudinal axis Y of the body 10 can increase control and reduce drag while trimming or otherwise painting. In various examples, the paint applicator 20 can include a pad, a sponge, a brush, etc. In one example, the device 2 is pulled by the user in line with the longitudinal axis Y of the body 10. Oscillating or otherwise vibrating the paint applicator 20 against the work surface, substantially in line with the direction the user is pulling the device 2, can inhibit drag and increase control of the device 2. In other examples, other directions of vibration are contemplated. For instance, in one example, the direction of vibration is substantially perpendicular to the longitudinal axis Y of the body 10 (side to side motion). In such an example, moving the device 2 perpendicular to the longitudinal axis Y of the body 10 during painting could inhibit drag and increase control of the device 2. However, it is further contemplated that the user can move the device 2 in any direction with respect to the direction of vibration, although, if the direction of vibration is different from the direction of movement of the device, it can result in forces imparted in a different direction than the direction of trimming, which can increase resistance and decrease control. For example, if the direction of vibration were perpendicular to the direction of motion of the device, the vibrations of the paint applicator would tend to pull the device in a direction perpendicular to the direction of motion of the device, which can result in the paint applicator potentially pulling toward a surface that is not to receive paint.

Some other mechanisms for creating vibratory motion of a paint applicator against the work surface are described below or are contemplated herein. In various examples, motion of the paint applicator can be in virtually any direction, including forward and backward, side-to-side, circular, angular, etc. In other examples, motion of the paint applicator can be within a single plane or within multiple planes. In one example, motion of the paint applicator is into and away from the work surface to be painted. In further examples, it is contemplated that the device include a paint applicator with reconfigurable direction of vibration. For instance, the shuttle or other vibratory feature of the body can be selectively rotated or otherwise reconfigured to change the direction of vibration, for instance, between forward and backward motion, side-to-side motion, circular motion, angular motion, transverse motion (toward and away from the work surface), or incremental variations therebetween.

Figure 5:
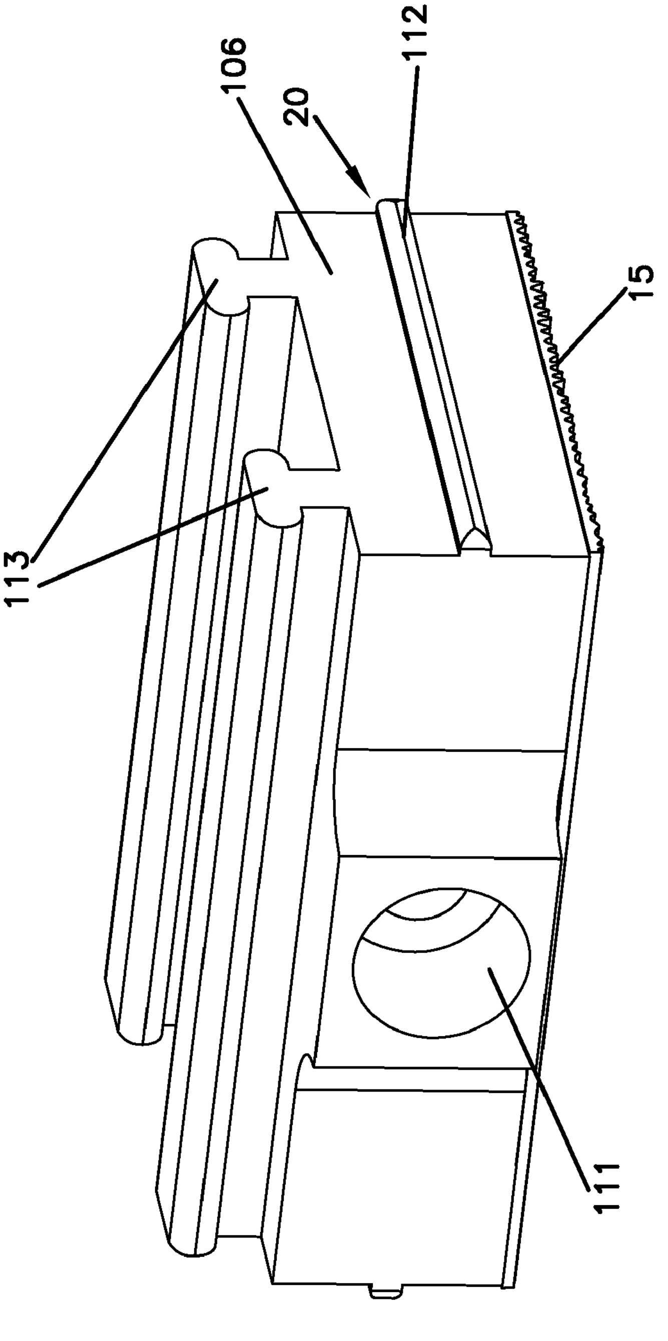
FIG. 5 is a perspective view of a paint applicator of a painting apparatus according to some embodiments of the disclosed subject matter.

Referring to FIGS. 3-5, in some examples, the manifold 106 is removably coupled to the shuttle 120 with slider features 113 on the manifold 106 and receiving guide tracks 123 on the shuttle 120. In this way, the shuttle 120 acts as an attachment surface to engage the manifold 106 of the paint applicator 20. In some examples, the guide tracks 123 and slider features 113 can provide a rigid connection between the manifold 106 and the shuttle 120 and allow for repeatedly connecting and disconnecting the manifold 106 to the shuttle 120. In one example, the paint pad 15 is part of and makes up one face of the manifold 106. In one example, the surface of the paint pad 15 includes a brush or bristle surface backed by a soft, fast reacting, cellular layer that helps accommodate surface irregularities of the work surface.

Figure 6:
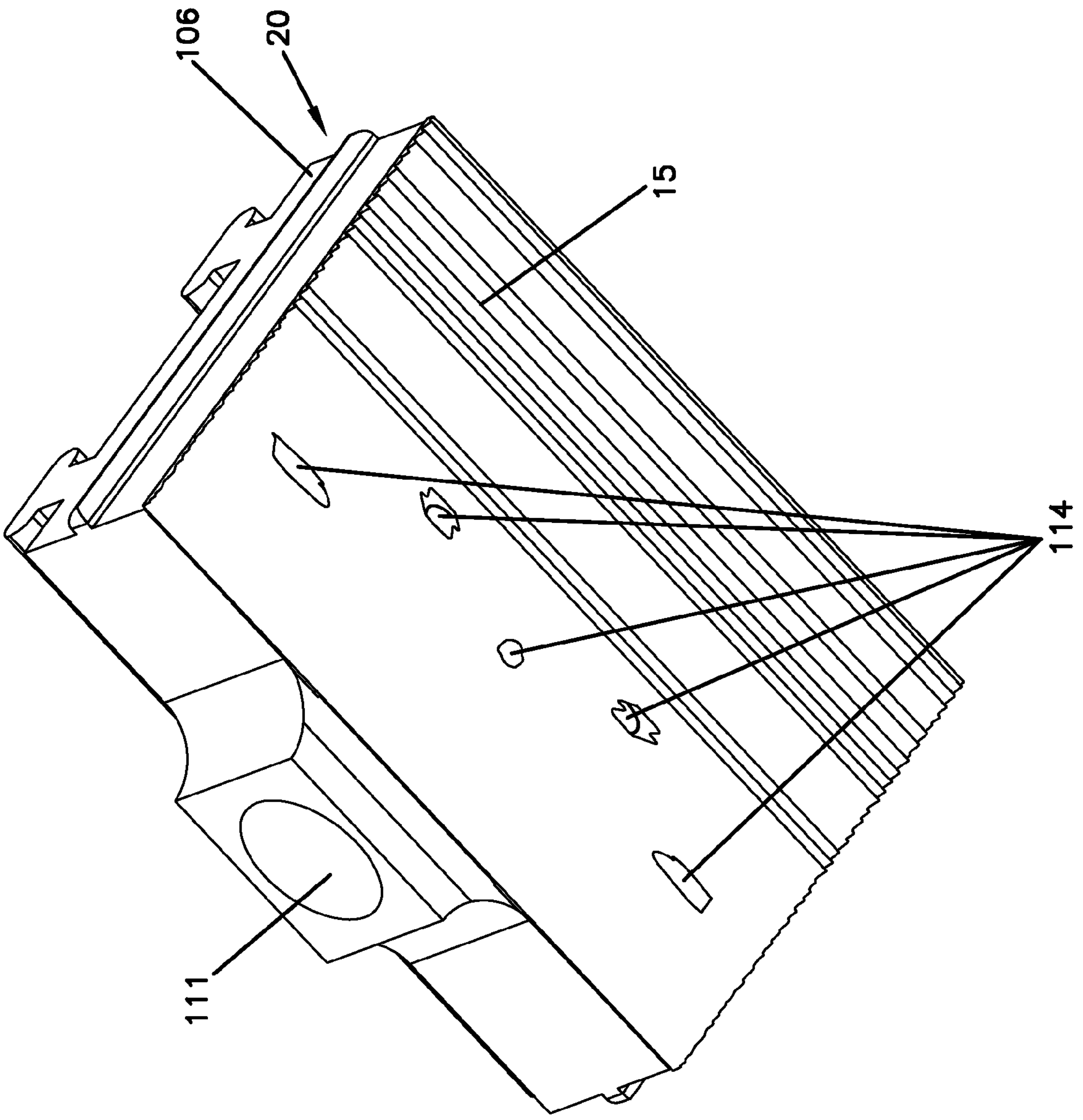
FIG. 6 is a bottom plan view of a paint applicator of a painting apparatus according to some embodiments of the disclosed subject matter.

Referring now to FIG. 6, the paint applicator 20 includes paint dispensing openings 114. In certain examples, different paint applicators can include openings that vary in number, size, location, and shape, for instance to tune the different paint applicators for different painting applications, different painting techniques, or different work surfaces. For instance, a particular paint applicator can be used to optimize distribution of paint onto the work surface.

In one example, the manifold 106 supplies the paint to the openings 114. In one example, the manifold 160 includes an edging feature 112 that assists in maintaining a small gap with a surface adjacent the work surface to inhibit application of paint on the adjacent surface. In certain examples, the manifold 106 includes a tube inlet 111 for connection with a paint feed tube 105. In one example, as shown in FIGS. 1-4, the paint feed tube 105 is pushed into the tube inlet 111 and is retained with an interference fit. In other examples, this connection could include a number of different connectors such as a barbed fitting, a luer lock, a push-to-connect configuration, etc. In still other examples, multiple paint feed tubes are connected to multiple tube inlets. In this way, the paint feed tube 105 and manifold inlet 111 supplies the paint to the manifold 106, which, in turn, supplies the paint to the openings 114, so that the paint can be supplied to the paint pad 15 to be applied to the work surface to be painted.

Figure 7:
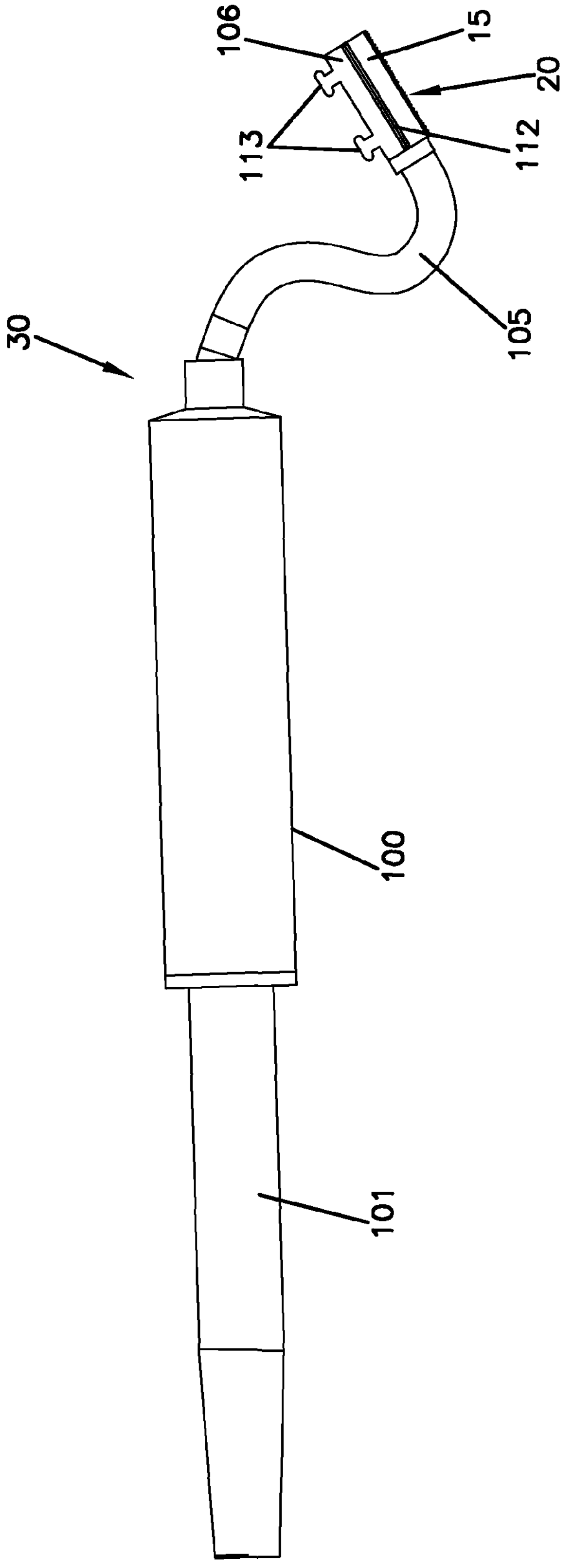
FIG. 7 is a side view of a painting module of a painting apparatus according to some embodiments of the disclosed subject matter.

Referring to FIG. 7, in some examples, removable, replaceable, and disposable paint-contacting pieces of the device 2 are included in a painting module 30. In certain examples, the painting module 30 includes the paint applicator 20, the paint feed tube 105, and a paint reservoir 100. In one example, the paint reservoir 100 is a syringe-style design including a plunger 101 to allow for paint filling and dispensing. Such a paint reservoir 100 can be produced relatively cheaply to make disposal and replacement relatively cost effective. Although a syringe-type paint reservoir 100 is described herein, other examples contemplated herein include other configurations of paint reservoirs.

In one example, the paint feed tube 105 can be permanently or releasably connected to a nozzle of the paint reservoir 100. In some examples, the painting module 30 includes the components of the device 2 that carry, transfer, and otherwise contact the paint. As such, by making the painting module 30 rapidly removable from the body 10, disposable, and replaceable, clean-up time for the device 2 can be reduced. Instead of washing paint pads, which can be tedious and time consuming and can result in the paint pads not performing as well after the initial use due to residual paint remaining on the paint pad, the used painting module 30 can be removed and replaced with a new, clean, replacement painting module 30. In this way, the disposable painting module 30 of the device 2 can save the user time, can increase ease of use of the device 2, and can enhance performance of the device 2 over multiple uses of the device 2.

Figure 8:
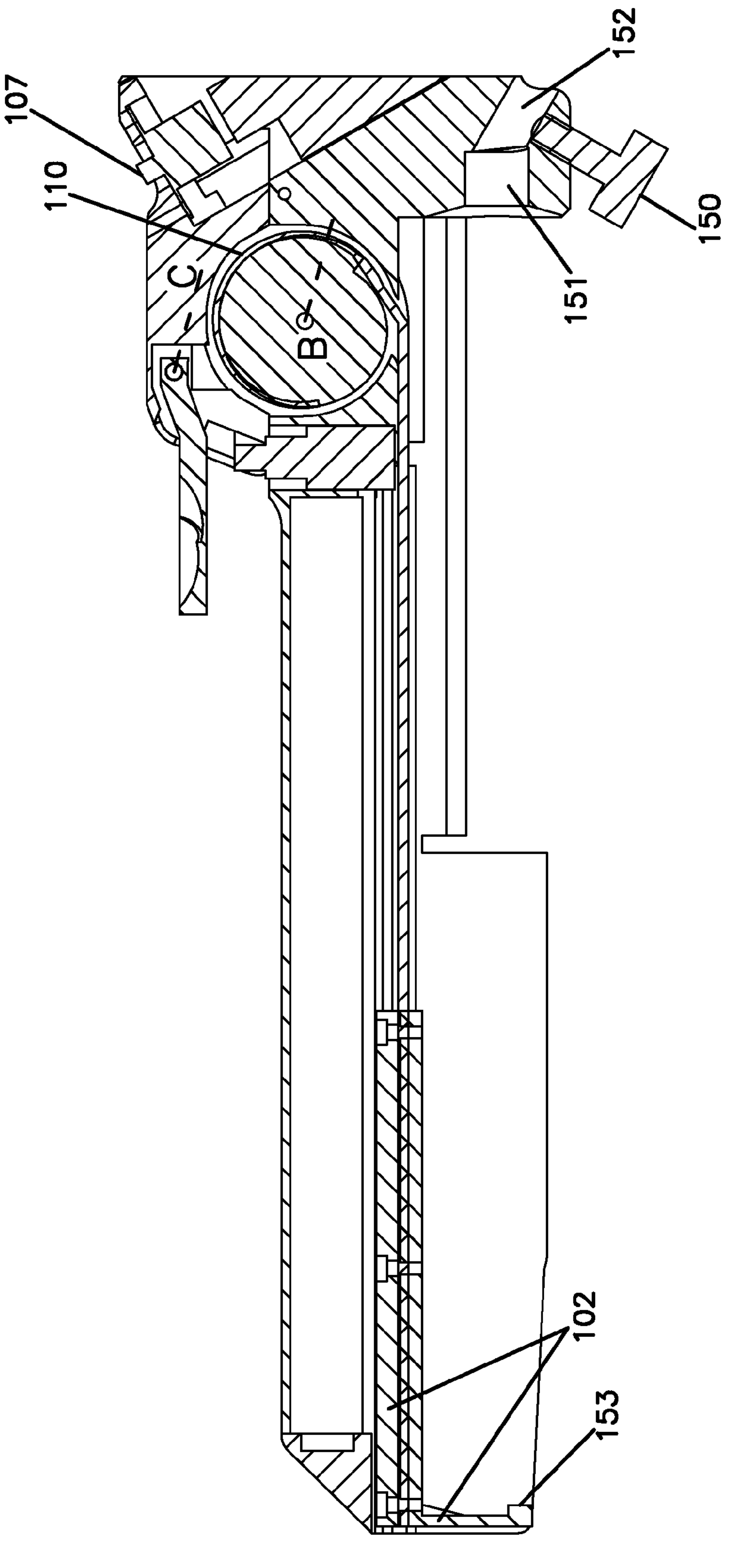
FIG. 8 is a perspective cross-sectional view of a painting apparatus according to some embodiments of the disclosed subject matter, the painting apparatus having a painting module removed.

Referring to FIGS. 1-8, in one example, to connect the disposable painting module 30 with the device 2, the slider features 113 of the manifold 106 are manually engaged with the receiving linear guide tracks 123 of the shuttle 120. A plunger advance bracket 102, as will be described in more detail below, can be manually retracted to a rearward position, as shown in FIGS. 2 and 8. The paint feed tube 105 and the paint reservoir 100 (in one example, at least partially filled with paint, as described above) can be guided into a nozzle cavity 151 and a tube cavity 152 of the body 10. With the paint reservoir 100 seated in the nozzle cavity 151, the plunger advance bracket 102 can be advanced so that, in one example, a plunger advance detent 153 captures the plunger 101. The paint feed tube 105 can be connected to the manifold 106 to complete attachment of the painting module 30 with the body 10. In this way, the device 2 can be configured to dispense paint.

In certain examples, referring to FIGS. 2 and 8, the plunger 101 is advanced to dispense paint by an urging mechanism 40. In one example, the urging mechanism 40 includes a constant force spring 103 to advance the plunger 101. In one example, one end of the constant force spring 103 can be connected to a drum 107, and the other end of the constant force spring 103 can be connected to the plunger advance bracket 102. In one example, the constant force spring 103 is biased to coil onto the drum 107. As the constant force spring 103 coils onto the drum 107, it exerts a force that pulls the plunger advance bracket 102 toward a forward position. In this way, in certain examples, the plunger advance bracket 102 is urged into motion and, in turn, advances the plunger 101 to supply the paint to the paint applicator 20. In an example, the constant force spring 103 provides a substantially constant, uniform advance force on the plunger advance bracket 102 as the constant force spring 103 coils around the drum 107, which is substantially maintained throughout the advance stroke. In this way, a relatively constant paint output rate can be achieved by using the constant force spring 103, which can result in a substantially uniform supply of paint to the paint applicator 20 to allow substantially uniform application of paint to the work surface. Although the constant force spring 103 is described herein for use with the urging mechanism 40, other examples of urging components can be used to advance the plunger 101, which are also contemplated herein. In some examples, compression or extension spring are used to exert an advance force on the plunger 101. In other examples, spring mechanisms such as elastic bands, power reels, or spring motors, for instance, can be used to advance the plunger 101. In still further examples, the plunger advance can be powered, for instance, using a motor and lead screw.

Figure 9:
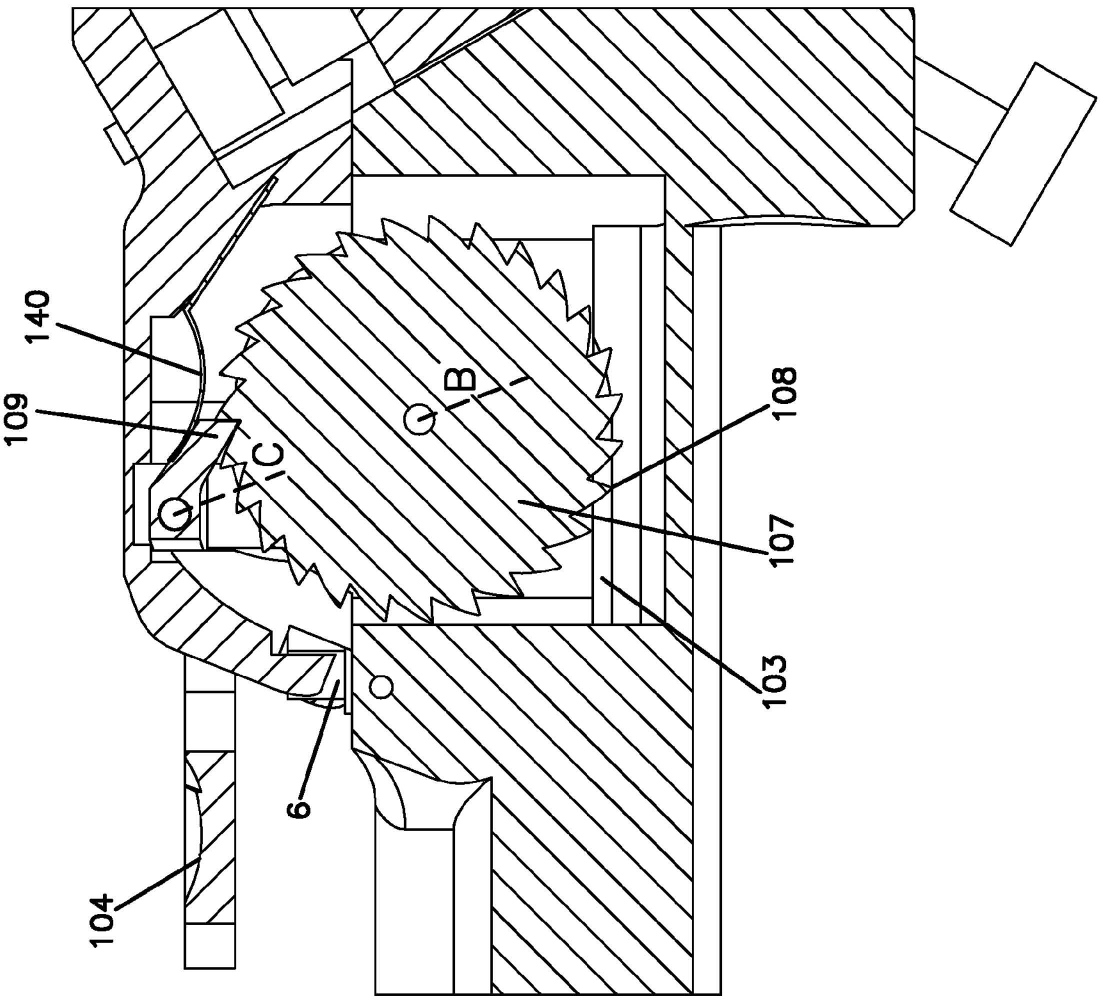
FIG. 9 is a cut-away side view of a portion of an urging mechanism of a painting apparatus according to some embodiments of the disclosed subject matter.

Referring to FIG. 9, an example of selectively activating paint dispensing provides an "on/off" mechanism to allow the user to inhibit paint dispensing when desired. In one example, the drum 107 includes a ratchet feature 108. In one example, a paint dispensing trigger 104 includes a pawl lever that pivots about axis C to selectively disengage with the ratchet feature 108 to allow rotation of the drum 107 and advancement of the plunger advance bracket 102. A spring tab 140, in one example, biases a pawl face 109 to engage the drum ratchet 108 to inhibit rotation of the drum 107, which, in turn, inhibits the constant force spring 103 from coiling to exert force on the plunger 101, thereby inhibiting dispensing of paint. In this example, when the paint dispensing trigger 104 is depressed (moved toward the body 10) by the user, the pawl face 109 pivots up and releases from the ratchet 108, which allows the drum 107 to turn as the constant force spring 103 coils to exert a force on the plunger 101 to dispense paint.

Such a design can facilitate loading and unloading of the paint reservoir 100. For instance, as the plunger advance bracket 102 is manually retracted, the drum 107 is forced to rotate about axis B, as is allowed by the geometry of the ratchet 108 and pawl 109. When this manual retraction is halted, the constant force spring 103 will exert force on the drum 107 to try to rotate the drum 107 in the opposite direction. However, the pawl face 109 can then engage the ratchet feature 108 to inhibit motion of the drum 107 and generally maintain the position of the plunger advance bracket 102. In this way, the plunger advance bracket 102 can be manually retracted to and retained at a location to allow sufficient clearance for loading and unloading the paint reservoir 100.

Referring again to FIGS. 2 and 8, in some examples, an enclosure 110 is disposed around the drum 107. The enclosure 110 can be configured to maintain a relatively small amount of clearance at least partially around the constant force spring 103 to inhibit the constant force spring 103 from diametrically expanding on the drum 107. For instance, when the pawl face 109 is engaged with the ratchet feature 108, the drum 107 is inhibited from rotating in the direction that the constant force spring 103 tends to coil. However, because of the coiling tendency of the constant force spring 103, the constant force spring 103 can tend to continue retracting and coiling on the drum 107 by expanding away from the drum 107. By providing the enclosure 110 around the drum 107, this coiling of the constant force spring 107 through expansion on the drum 107 can be inhibited.

Referring to FIGS. 8 and 9, in certain examples, the motor 11 can be selectively powered to oscillate or otherwise vibrate the paint applicator 20. In one example, a switch 6 can be a normally-open, momentary switch. In this example, depression of the paint dispensing trigger 104 (toward the body 10, in this example) can cause a portion of the paint dispensing trigger 104 to contact and close the momentary switch 6. This allows current to flow to the motor 11, which, in turn, can cause the motor output to rotate to move the paint applicator 20 in a vibratory or other motion. When the paint dispensing trigger 104 is released, a spring tab 140 can cause the paint dispensing trigger 104 to pivot away from the switch 106 to allow the switch 106 to return to its normally open state. In this way, paint dispensing and vibration of the paint applicator 20 both can be simultaneously activated and halted through manipulation of the trigger 104. In another example, a toggle switch 7 can be used instead of or in addition to the switch 6. In one example, the toggle switch 7 can be manually turned on or off to bypass switch 106 and allow vibration without dispensing of paint, or just dispensing without vibration.

Referring to FIGS. 2-4 and 8, the device 2 can include a flow control mechanism 150. In one example, the flow control mechanism 150 can include a user adjustable thumb screw to impede paint flow through the paint feed tube 105 by incrementally collapsing the paint feed tube 105 in the tube cavity 152. By collapsing the paint feed tube 105, a lumen of the paint feed tube 105 is reduced to inhibit paint flow through the lumen. In certain examples, the flow control 150 can include user adjustable settings to allow the flow to be tuned to varying paint viscosities and the user's rate of painting or trimming. For instance, the pitch on the thumb screw of the flow control mechanism 150 can be such that one revolution results in range from zero to substantially completely occluded flow. In one example, tuning increments can be provided, such as increments that can correspond to, for instance, a quarter turn resulting in approximately 25% occlusion of the lumen of the paint feed tube 105, a half turn resulting in approximately 50% occlusion of the lumen of the paint feed tube 105, etc. In this way, combining a substantially consistent paint dispense rate with a user adjustable paint flow volume control can allow the user to relatively consistently apply a substantially uniform amount of paint to the work surface. In other examples, other types of flow controls are contemplated by the present subject matter, such as, for instance, adjustable nozzles, needle valves, adjustable pinch valves, etc.

In use, with reference to FIGS. 1-9, in certain examples, the user can obtain the disposable painting module 30 and attach the disposable painting module 30 to the body 10 of the device 2. For instance, the user can obtain a new disposable painting module 30 to replace a used painting module 30 that has been discarded. In an example, the user can attach the paint applicator 20 to the attachment surface of the shuttle 120 of the device 2. In certain examples, the user can place the end of the paint feed tube 105 into a bucket, tray, container, or other source of paint and draw back the plunger 101 to at least partially fill the syringe-style paint reservoir 100 with paint. In an example, the user can couple the paint reservoir 100 with the body 10 and the urging mechanism 40 of the device 2. The user, in one example, can connect the paint feed tube 105 to the manifold 106. In one example, the user can place the paint pad 15 to the work surface to be trimmed or otherwise painted and begin painting by pulling the device 2 along the work surface while depressing the paint feed trigger 104 to dispense paint and vibrate the paint applicator 20 as the trigger 104 is depressed.

Figure 10:
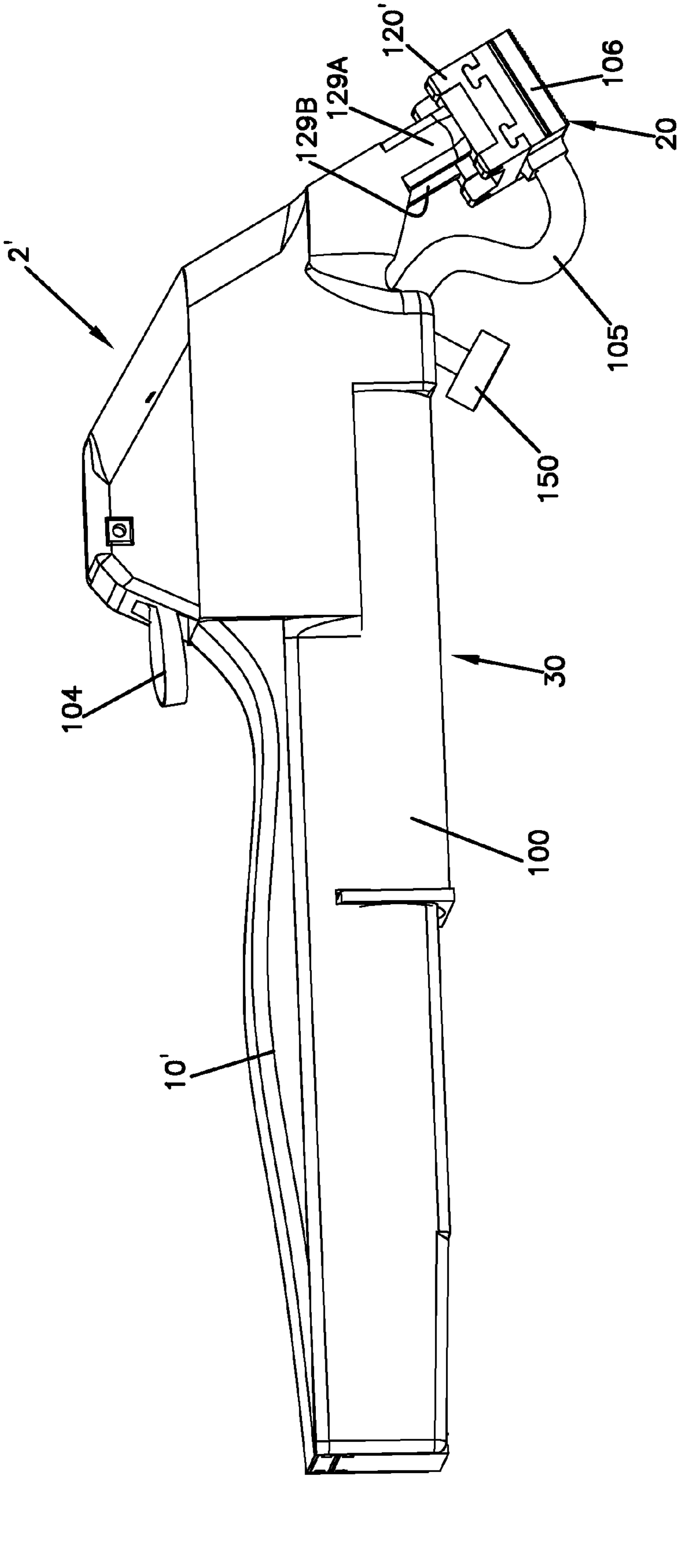
FIG. 10 is a side view of a painting apparatus according to some embodiments of the disclosed subject matter.
Figure 11:
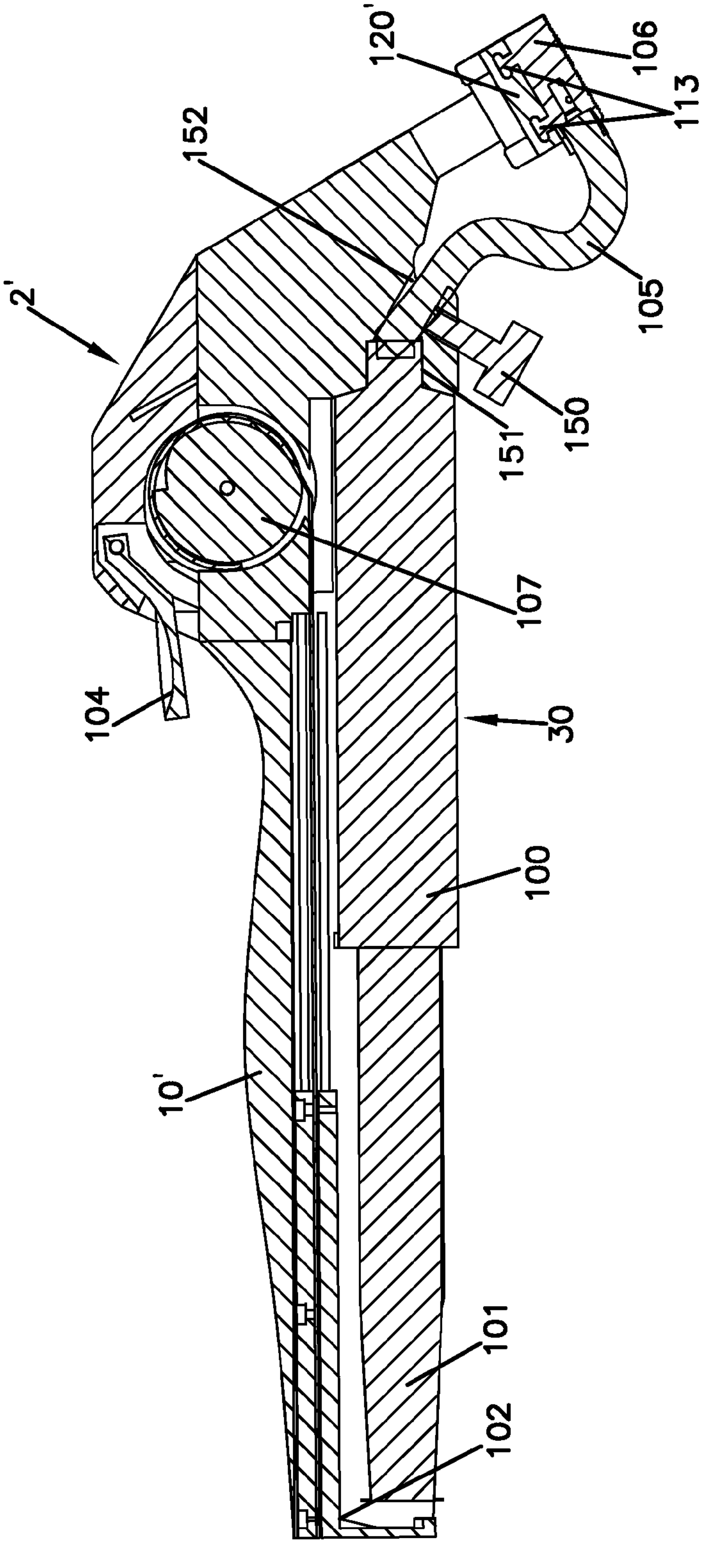
FIG. 11 is a side cross-sectional view of a painting apparatus according to some embodiments of the disclosed subject matter.
Figure 12:
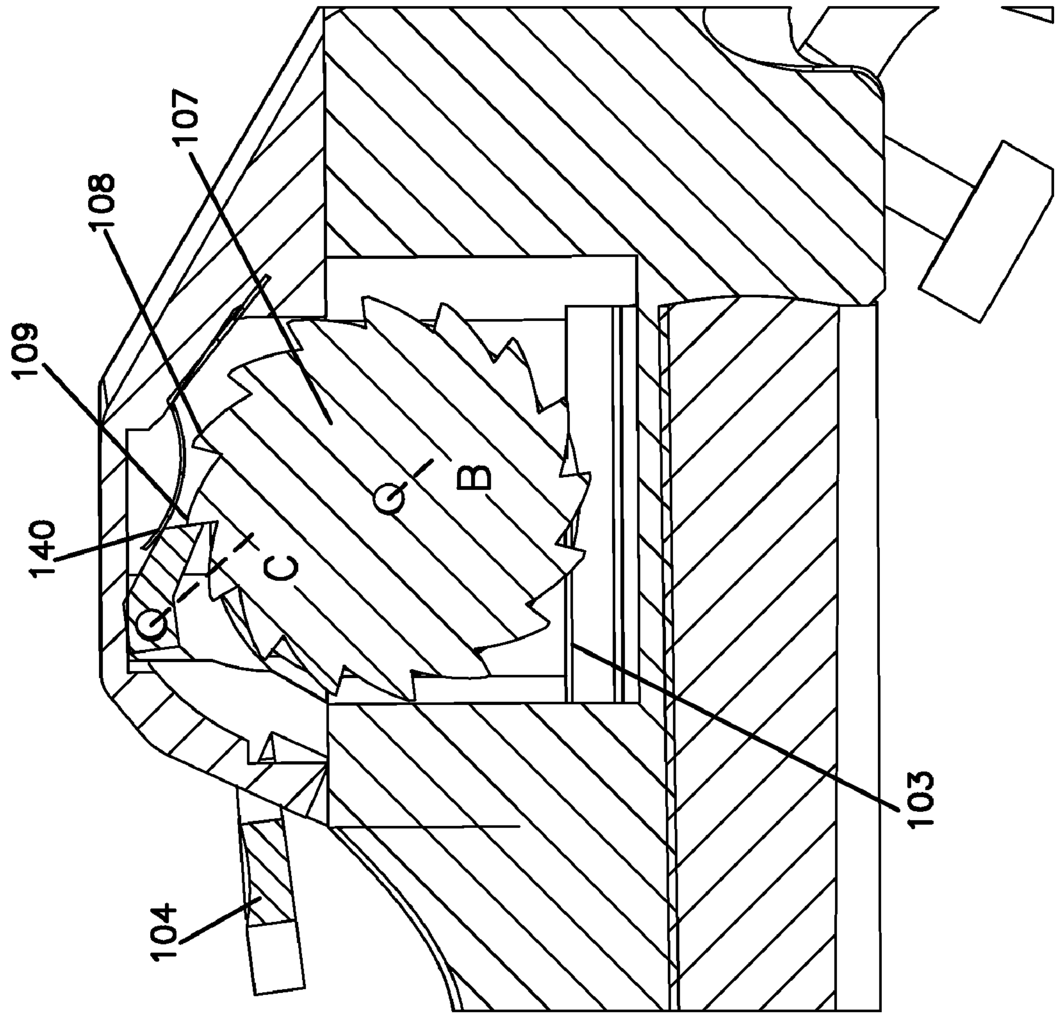
FIG. 12 is a cut-away side view of a portion of an urging mechanism of a painting apparatus according to some embodiments of the disclosed subject matter.
Figure 13A:
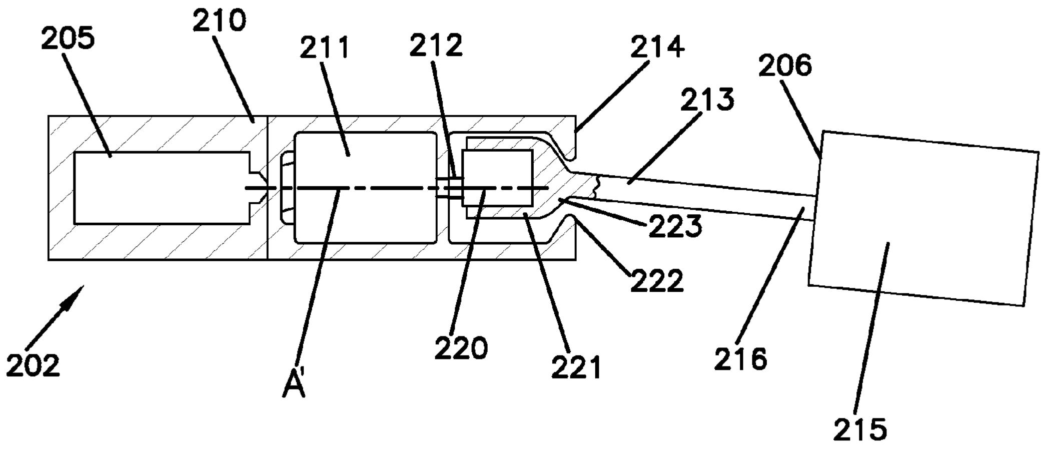
FIG. 13A is a cross-sectional view of a painting apparatus according to some embodiments of the disclosed subject matter.
Figure 13B:
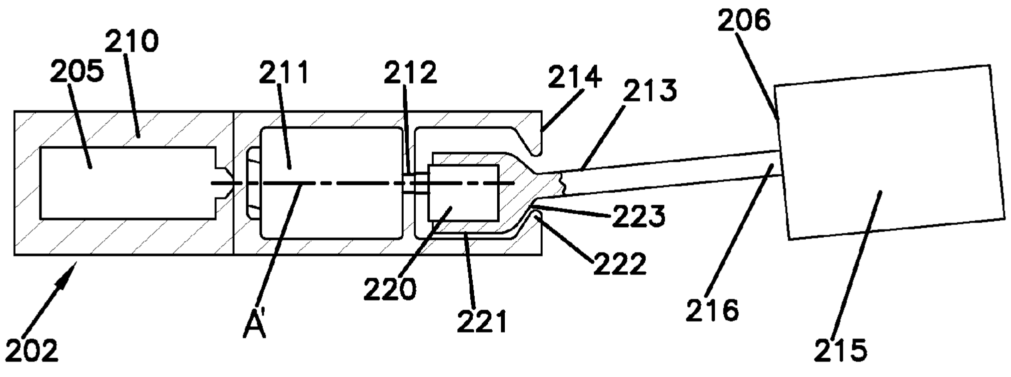
FIG. 13B is a cross-sectional view of a painting apparatus according to some embodiments of the disclosed subject matter.
Figure 14A:
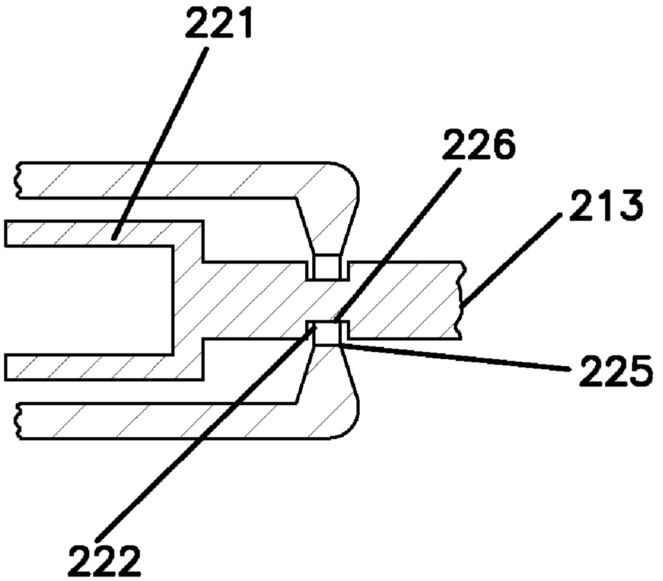
FIG. 14A is a cross-sectional view of a portion of a painting apparatus according to some embodiments of the disclosed subject matter.
Figure 14B:
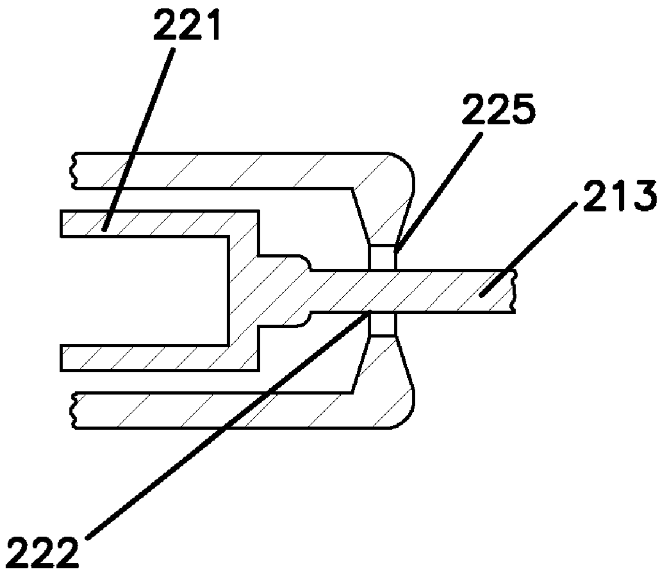
FIG. 14B is a cross-sectional view of a portion of a painting apparatus according to some embodiments of the disclosed subject matter.

Referring now to FIGS. 10-12, in certain examples, a painting device 2' is similar to the device 2 described above, but includes a paint applicator 20 that is stationary with respect to a body 10' of the device 2' and does not include an actuator to vibrate the paint applicator 20 against a work surface. In one example, components related to dispensing paint are substantially similar to those components described above. In certain examples, the vibratory shuttle 120 of the device 2 can be replaced with an attachment surface rigidly attached to the body 10' with the support struts 129A, 129B. The disposable painting module 30 and the connections with the body 10' can be substantially similar to those of the previous examples of the device 2 discussed above. In this way, the device 2' allows for substantially constant dispensing of paint at a substantially uniform rate to allow relatively uniform paint application to the work surface. In certain examples, paint flow can be user adjustable using a flow control 150 similar to the flow control 150 discussed above, such that paint output can be generally tuned to a user's painting rate. In some examples, the user adjustable flow control and the substantially constant flow rate provided by a constant force spring urging mechanism can allow the user to relatively continually and substantially uniformly dispense paint. Moreover, as with the device 2 described above, the disposable aspect of the painting module 30 of the device 2' can allow for decreased clean-up time and enhance performance of the device 2'.

Referring to FIGS. 13A, 13B, 14A, and 14B, in certain examples, a painting device 202 comprises a body 210. In some examples, the body 210 can include a battery compartment 205 and a motor 211, for instance an electric motor 211. The electric motor 211 can receive current from one or more batteries within the compartment 205 via a switch. The motor 211 can include a motor output 212 rotatable about a longitudinal axis A'. A lever arm 213 can extend generally in line with the longitudinal axis of the body 210 beyond one end 214 of the body 210. In some examples, a disposable paint pad 215 and a manifold 206 can be releasably attached at a remote distal end 216 of the lever arm 213 and another end of the lever arm 216 can couple with the motor output 212. In one example, the coupling between the motor output 212 and the lever arm 213 can be include a cam feature 220 on the motor output 212 and a mating follower cup feature 221 on the lever arm 213. In certain examples, the follower cup 221 can slidingly fit over the cam 220 and can bear against a surface of the cam feature 220 during use. In this manner, when the motor output 212 rotates, the mechanical coupling between the cam 220 and the follower cup 221 translates the rotation into an oscillatory or other vibratory motion of the lever arm 213. In some examples, the lever arm 213 can be pivotably supported intermediate its length by an aperture 222 formed in the distal end 214 of the body 210. In some examples, this can be accomplished with a ball and socket type joint in which the lever arm 213 includes a ball feature 223 that can mate with the aperture socket 222. In other examples, other types of pivot joints are contemplated herein. For example, referring to FIG. 14A, a circular washer 225 can be mounted in the aperture 222 and can fit within a peripheral groove 226 formed in the lever arm 213. In another example, referring to FIG. 14B, a similar configuration is shown without a peripheral groove in the lever arm 213.

In these examples, the paint pad 215 can be oscillated or otherwise vibrated in a direction opposite to the force applied to the follower cup 221 by the cam 220. For instance, referring to FIG. 13A, as the cam 220 is offset above the longitudinal axis A', the lever arm 213 pivots such that the paint pad 215 can be offset below the longitudinal axis A'. In further examples, referring now to FIG. 13B, the cam 220 is offset below the longitudinal axis A' to pivot the paint pad 215 above the longitudinal axis A'. In some examples, the cam 220 and cup 221 can be shaped such that this oscillatory or otherwise vibratory motion can result in the paint pad 215 traveling in a substantially circular path about the longitudinal axis A'. In other examples, the cam 220, cup 221, and pivot joint can be shaped such that the paint pad 215 can be moved back and forth between any path about the longitudinal axis A'. In certain examples, the motion of the paint pad 215 can be back and forth motion that falls generally within one plane of motion (side to side type motion or longitudinally fore and aft).

In other examples, it is contemplated that the oscillatory or vibratory motion of the paint pad 215 can be accomplished in a number of different configurations. In one example, the motor output 212 can include the cam feature 220 and the lever arm 213 can include the mating follower cup feature 221. In another example, this configuration can be reversed such that the motor output 212 includes a follower cup and the lever arm includes a mating cam.

Figure 15:
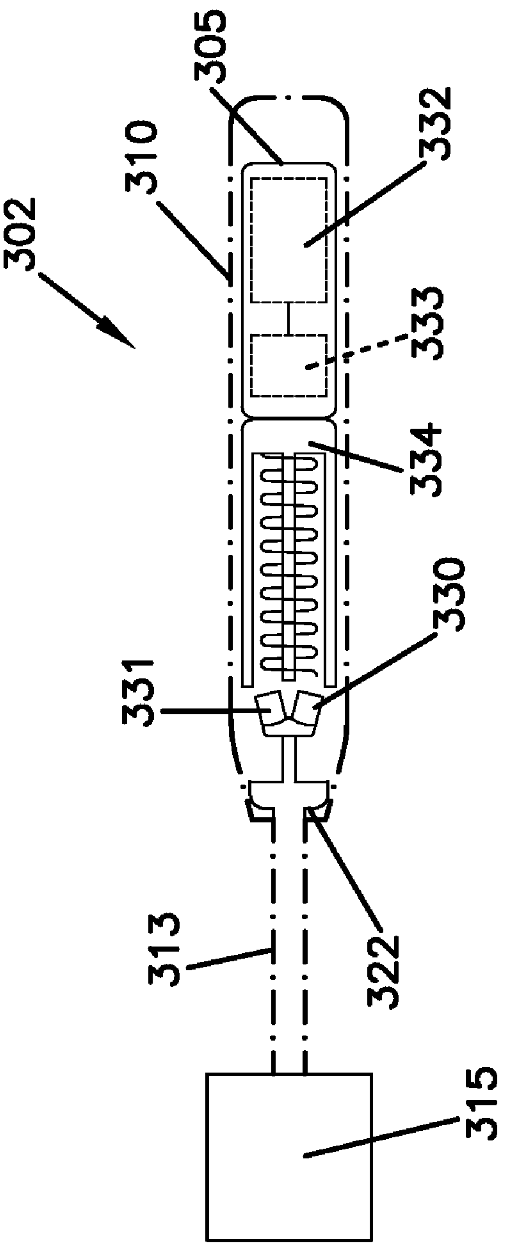
FIG. 15 is a cross-sectional view of a painting apparatus according to some embodiments of the disclosed subject matter.

Referring to FIG. 15, in certain examples, oscillatory or vibratory motion of a paint pad 315 can be accomplished in a painting device 302 including a configuration in which a proximal end of a lever arm 313 includes a pair of permanent magnets 330, 331 mounted side by side and with opposite polarities. In some examples, the lever arm 313 can be mounted for pivotal movement at a pivot member 322. A body 310 of the device 302 can include a battery compartment 305 and an electromagnet 334 which can receive an alternating current driving signal from an oscillator 333 and a battery 332. For instance, the action of the alternating current in the electromagnet 334 interacting with permanent magnets 330, 331 can cause the lever arm 313 to move about the pivot member 322 first in one direction and then in an opposing direction to provide the desired oscillating or vibrating effect.

Figure 16:
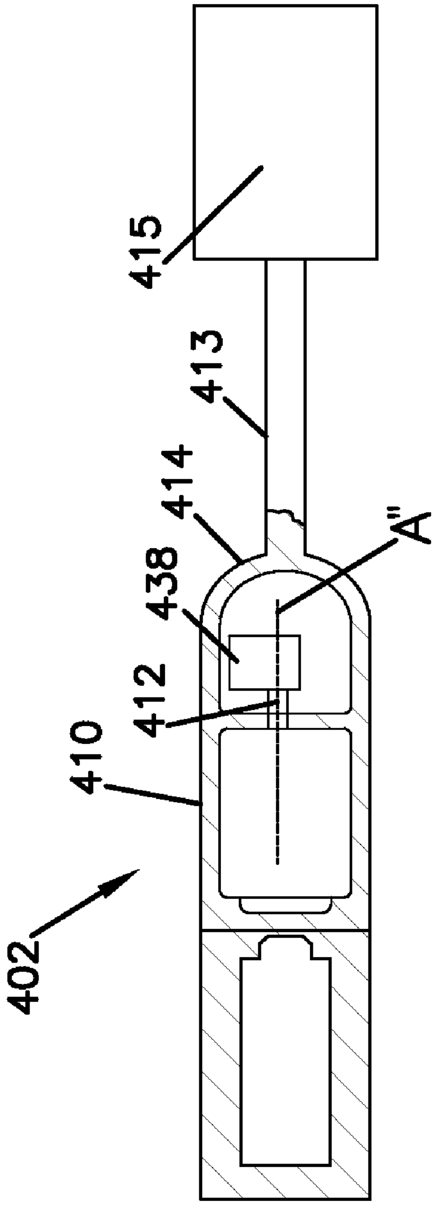
FIG. 16 is a cross-sectional view of a painting apparatus according to some embodiments of the disclosed subject matter.

Referring to FIG. 16, in certain examples, oscillatory or vibratory motion of a paint pad 415 can be accomplished in a painting device 402 including a configuration in which a lever arm 413 can be vibrated using an offset flywheel 438 connected to a motor output 412. In this way, vibration can be produced as the offset flywheel 438 pivots or swings about a longitudinal axis A". In some examples, the lever arm 413 can be integrally attached with an end 414 of a body 410. In this manner, the vibration created by rotating the offset flywheel 438 can be transferred through the body 410, which can result in vibration of the lever arm 413 and the paint pad 415, attached thereto.

Figure 17:
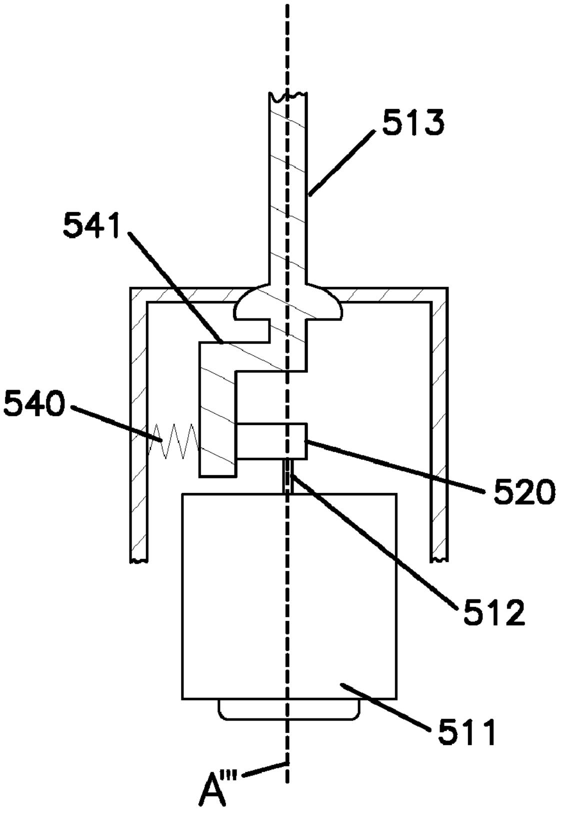
FIG. 17 is a cross-sectional view of a portion of a painting apparatus according to some embodiments of the disclosed subject matter.

Referring to FIG. 17, in certain examples, oscillatory or vibratory motion of a paint pad can be accomplished in a painting device including a spring 540 that can bias a lever arm 513 in one planar direction against a surface of a cam 520. In some examples, as the cam 520 rotates about a longitudinal axis A''', an offset radius can apply force to the lever arm 513 opposing force of the spring 540. In an example, as the spring 540 compresses, the lever arm 513 can pivot. In some examples, as the cam 520 rotates and the radius in contact with the lever arm 513 is reduced, the spring 540 can pivot the lever arm 513 in the opposite direction to complete a cycle of motion. In this way, the cycle can result in the lever arm 513 and the attached paint pad oscillating about the longitudinal axis A'''. In some examples, the lever arm 513 can include a step 541 to accommodate spatial constraints for this configuration.

Figure 18:
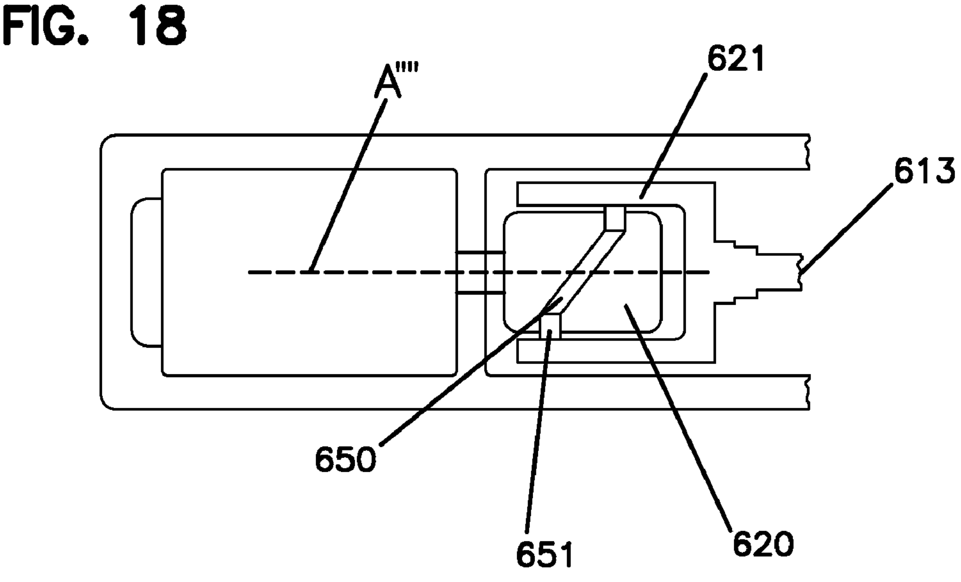
FIG. 18 is a cross-sectional view of a portion of a painting apparatus according to some embodiments of the disclosed subject matter.

Referring to FIG. 18, in certain examples, oscillatory or vibratory motion of a paint pad can be accomplished in a painting device including a cam 620 that can include a peripheral continuous channel 650 extending generally in an axial direction with respect to a longitudinal axis A''''. In some examples, a follower cup 621 includes a finger 651 that can engage the channel 650, such that when a drive shaft rotates, the cup 621, and, in turn, a lever arm 613, is urged backward and forward along the longitudinal axis A''''. In some examples, the cam 620 rotating against the follower cup 621 can provide oscillatory or otherwise vibratory motion that is generally perpendicular to the longitudinal axis A'''', and the channel 650 and finger 651 can provide oscillatory or otherwise vibratory motion that is generally in line or parallel with the longitudinal axis A''''. In some examples, the device can include a pivot configuration similar to that described above with respect to FIG. 14B. In this way, the lever arm 613 can be caused to move forward and backward along the longitudinal axis A''''.

Figure 19A:
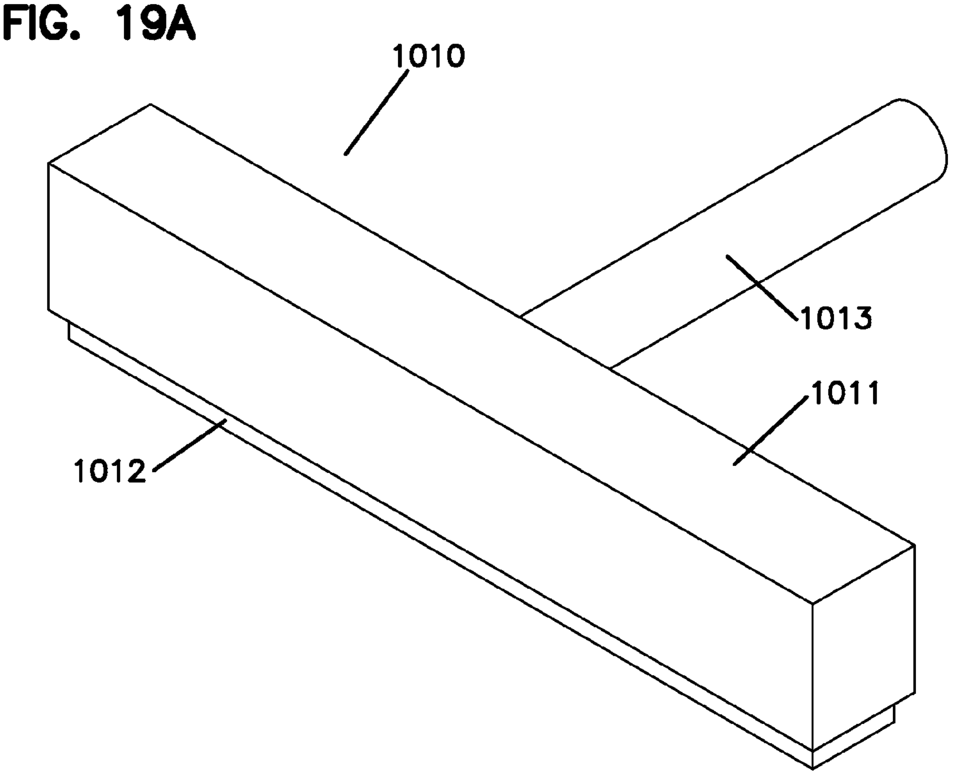
FIG. 19A is a perspective view of another embodiment of a painting apparatus, showing an applicator of the painting apparatus extending from a housing. The apparatus includes internal projections (not shown in this solid view).
Figure 19B:
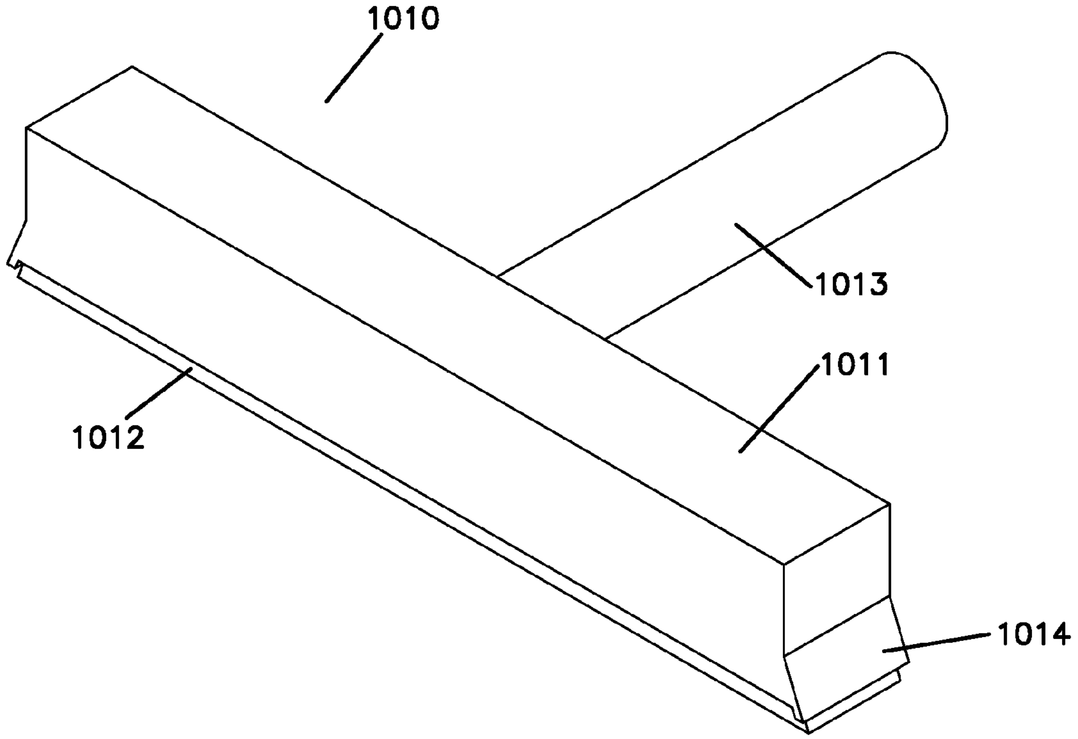
FIG. 19B is a perspective view of another embodiment of a painting apparatus, showing an applicator of the painting apparatus extending from a housing. The apparatus includes angled side walls that serve as external projections.

Referring now to FIGS. 19-25, another example of a painting apparatus 1010 is illustrated in FIG. 19 and is shown in two embodiments in FIG. 19A and FIG. 19B. Applicator 1012 is located within, and extends out from housing 1011. Applicator 1012 is made from a compressible material or construction that has the ability to absorb and retain a fluid. The applicator 1012 also has the ability to express (release) fluid when pressed against a surface and/or forced into a compressed state. Suitable materials and constructions include natural or synthetic open cell foam structures, bristles, brushes or other like materials commonly used as paint or coating applicators. Housing 1011 can be made from any rigid non-porous material, such as metal, plastic composite or any material commonly used in the painting and coating industries. In FIG. 19, housing 1011 is attached to handle 1013. As described below, handle 1013 in an alternate embodiment may have an internal channel for an integral paint supply. The embodiment in FIG. 19A possesses internal projections, which cannot be seen in the solid view of FIG. 19A, that control the degree of compression of the applicator when placed against the surface being painted. FIG. 19B shows an embodiment where the projections are external and take the form of a side wall 1014 located at both housing edges parallel with the direction of apparatus movement in use, as shown. In FIG. 19B the side walls 1014 control the degree of compression of the applicator 1012 against the surface being painted. As previously noted, it is common for paint to excessively discharge out of an applicator when it is compressed against a surface without compression limitations. By using projections, like side wall 1014, to limit and control the compression of the applicator, the excessive paint discharge can be reduced or eliminated. Additionally, to achieve a uniform paint coating it is typically important to maintain uniform pressure of the applicator against the surface being painted. By limiting and controlling the compression of the applicator 1012, the side walls 1014 also provide a means to maintain uniform pressure of the applicator against the surface being painted.

Figure 24:
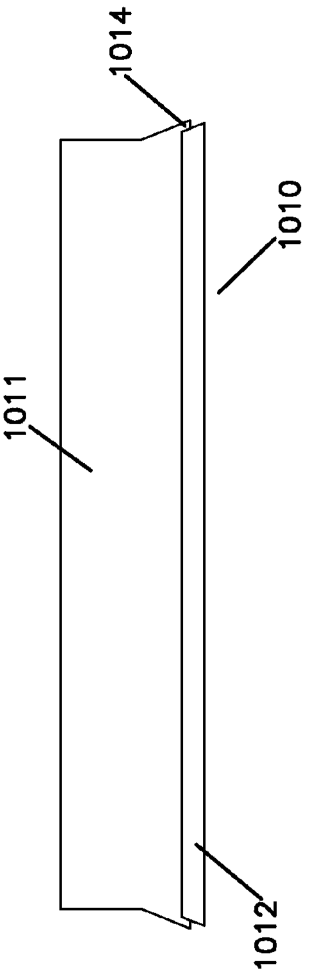
FIG. 24 is a front view of the embodiment of the painting apparatus shown in FIG. 19B, the embodiment includes angled side walls serving as external projections.

In FIG. 19B the side walls 1014 are angled, which may provide an advantage to keeping paint from contacting adjacent trim elements or intersecting walls. The angled side walls 1014 offset the housing 1011 away from any trim elements. A front view of the embodiment of FIG. 19B is shown in FIG. 24. The angle of the side walls 1014 can range from 0° (perpendicular to surface) where spacing from a trim element or intersecting wall is provided solely by the thickness of the side wall 1014, to 90° away from housing 1011 (parallel to surface), or more, where spacing from a trim element or intersecting wall is determined by the distance side wall 1014 projects from the housing. In some instances, it may be beneficial to angle the side wall 1014 toward the applicator 1012 for specialty painting applications.

Figure 20A:
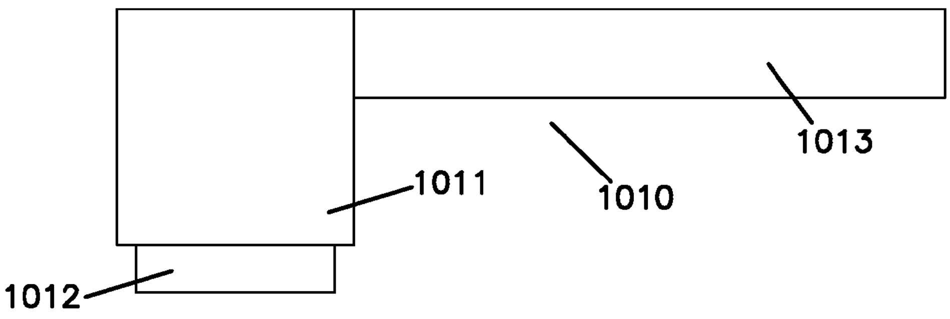
FIG. 20A is a side view of the painting apparatus of FIG. 19A, showing the applicator recessed into, and extending from, the housing.
Figure 20B:
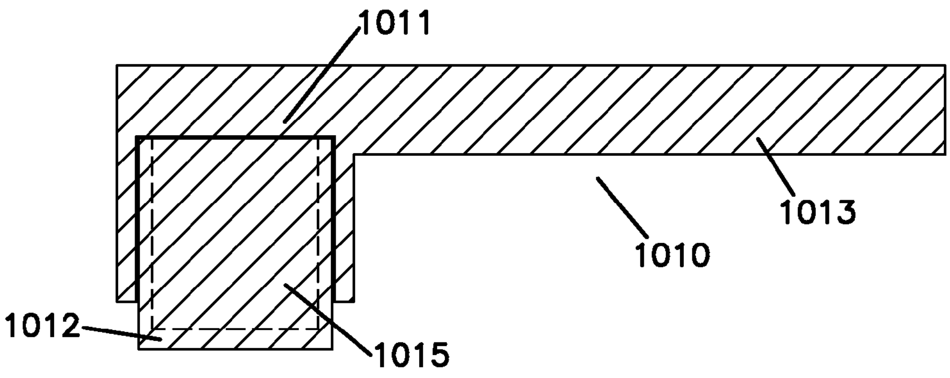
FIG. 20B is a cross-section view of the embodiment of FIG. 20A without an integral paint feed source, illustrating the internal projections in relation to the applicator.
Figure 20C:
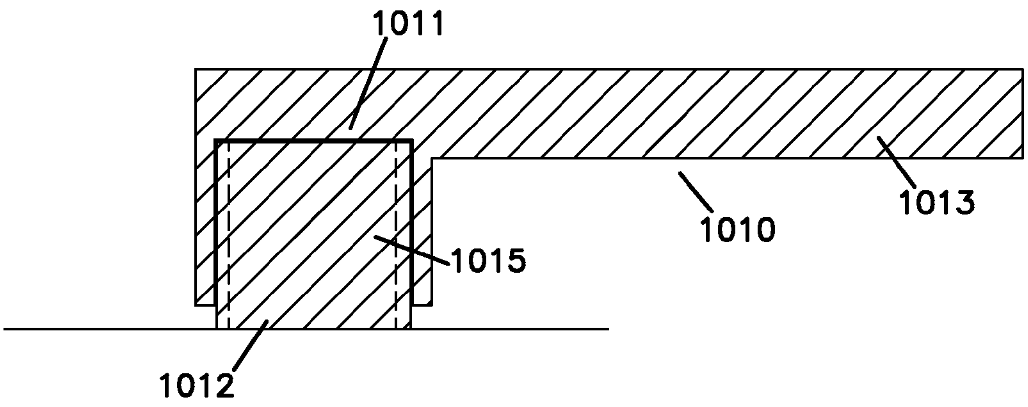
FIG. 20C is the embodiment shown in FIG. 20B, shown with the applicator compressed when applied to a surface being painted and the projections in contact with the surface.

Apparatus 1010 is further described in a side view in FIG. 20 and is shown in two embodiments and compressive states in FIGS. 20A through 20D. FIG. 20B shows a cross-section view of apparatus 1010 with components housing 1011, applicator 1012, handle 1013 and internal projection 1015. Internal projection 1015 can be molded integral with housing 1011 or be otherwise permanently affixed to housing 1011 generally as shown. Applicator 1012 is constructed with a slot that traverses the entire length of internal projection 1015, which conforms to the shape of internal projection 1015 and allows internal projection 1015 to contact the surface being painted when apparatus 1010 is applied to the surface and applicator 1012 has compressed, as shown in FIG. 20C. Compression of applicator 1012 reduces the available volume within the applicator for paint retention and forces the release of paint onto the surface being painted. Since the rate of paint release is proportional to the degree of applicator 1012 compression, control of the paint release rate is provided by the length of the internal projection 1015 and its function of limiting the compression of applicator 1012. Apparatus 1010 may possess multiple internal projections, and these projections can have shapes different than that shown, such as (but not limited to) a regular or oblong cylinder; and, the projections can be formed to contact the surface being painted in symmetric or non-symmetric patterns; and, the contact area of the projections with the surface can be tapered to prevent scratch of the surface.

Figure 20D:
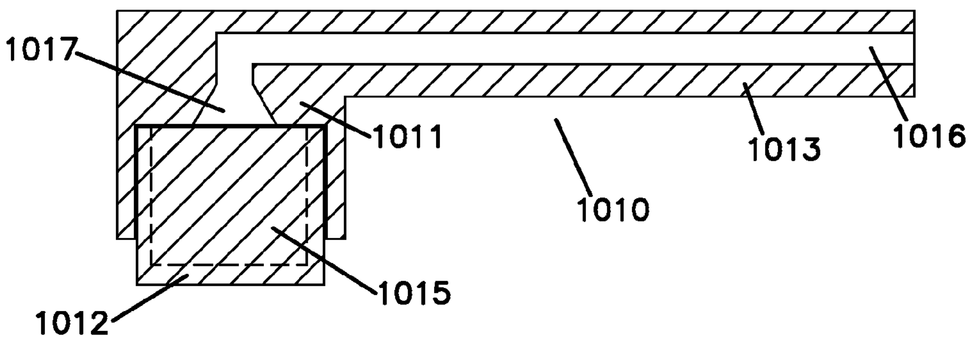
FIG. 20D shows another embodiment similar to those shown in FIGS. 20A-20C with an internal channel connecting an integral paint feed source with paint release openings adjacent to the applicator.

FIG. 20D shows an alternative embodiment of apparatus 1010 with a fluid channel 1016 that is fluidly connected to a paint feed source (such as with a syringe, cartridge or via a pressurized feed tube connected to a larger container of paint), and a paint release opening 1017 located adjacent to applicator 1012 which provides a flow of paint directed to applicator 1012. Apparatus 1010 may possess channel and paint release openings of different configurations than that shown. The configuration (size, geometry and location) of the paint release openings can be modified to deliver varying amounts of paint to specific areas of the applicator, with resulting controlled localized paint flow rates from different areas of the applicator.

Further illustration of the invention is shown in a front view in FIG. 21, representing the same embodiments as shown in FIG. 20. FIG. 21B shows a multiplicity of internal projections 1015, with the applicator 1012 in an uncompressed state. FIG.

Figure 21A:
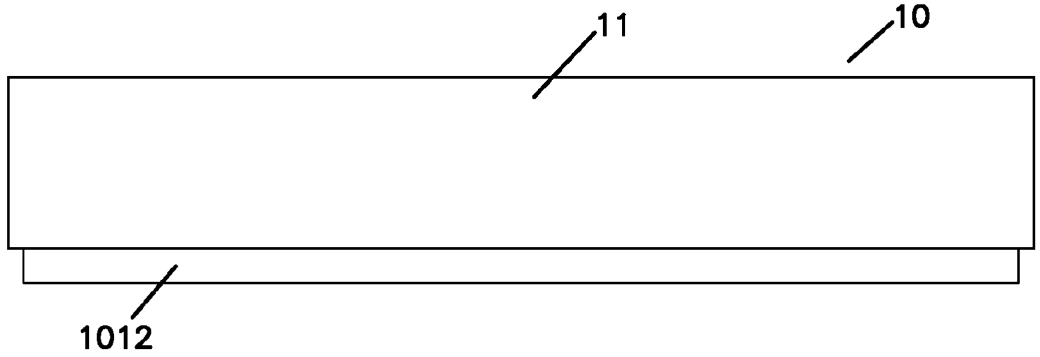
FIG. 21A is a front view of the painting apparatus of FIG. 19A, showing the applicator recessed into, and extending from, the housing.
Figure 21B:
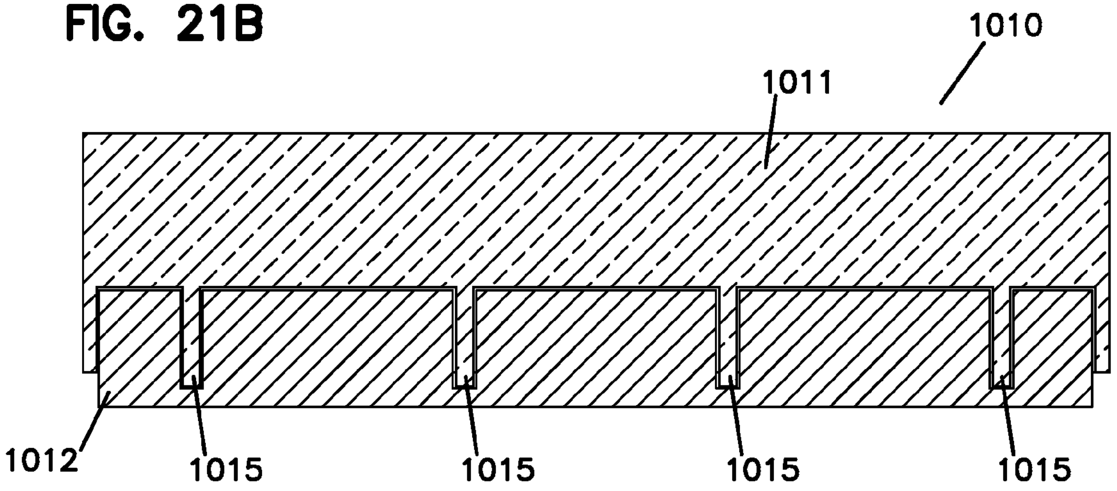
FIG. 21B is a cross-section view of the embodiment of FIG. 21A without an integral paint feed source, illustrating the internal projections in relation to the applicator.
Figure 21C:
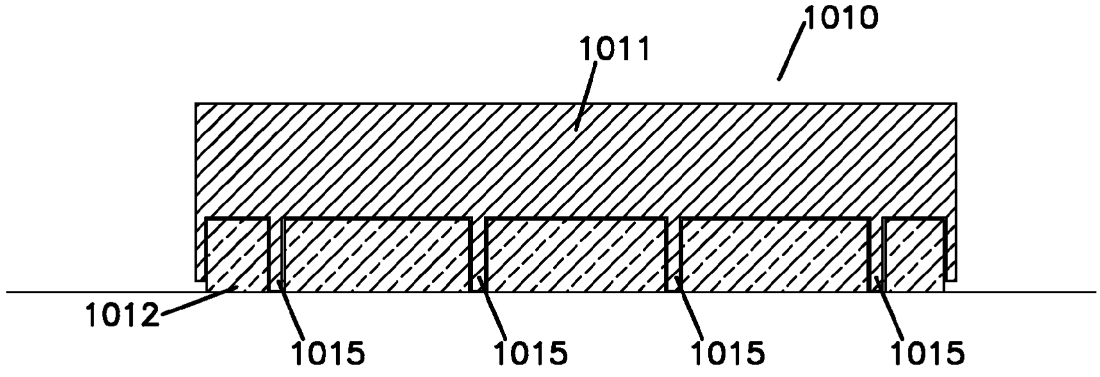
FIG. 21C is the embodiment shown in 21B, shown with the applicator compressed when applied to a surface being painted and the projections in contact with the surface.
Figure 21D:
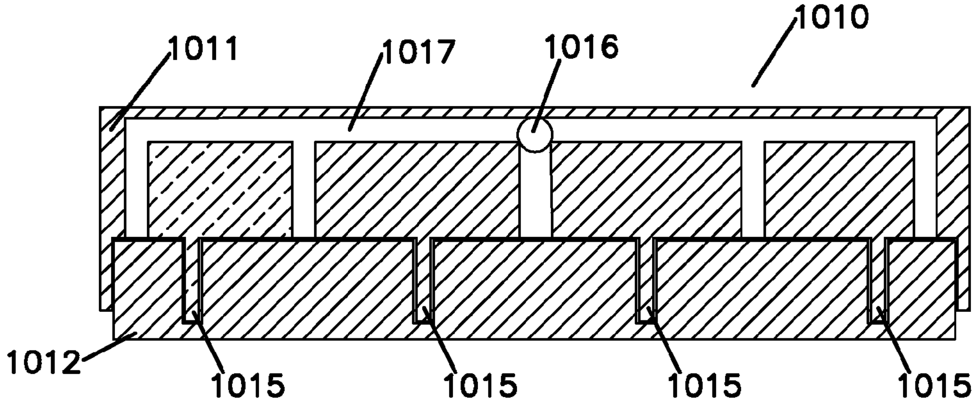
FIG. 21D shows another embodiment similar to those in FIGS. 21A-21C with an internal channel connecting an integral paint feed source with paint release openings adjacent to the applicator.

21C shows the same embodiment of FIG. 21B in a compressed state when apparatus 1010 is applied to the surface being painted. FIG. 21D shows one configuration of paint release openings of an alternative embodiment with a fluid channel 1016.

Figure 22A:
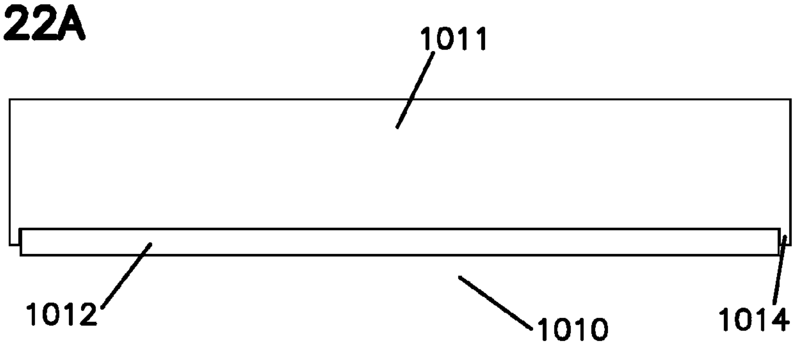
FIG. 22A is a front view of another embodiment of a painting apparatus, showing an applicator recessed into, and extending from, a housing.
Figure 22B:
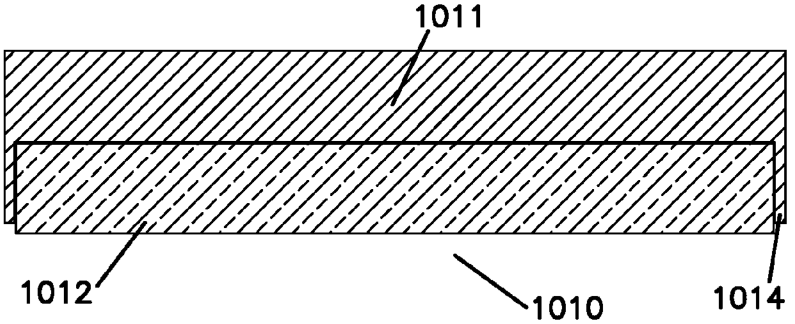
FIG. 22B is a cross-section view of the embodiment of FIG. 22A without an integral paint feed source, illustrating the external projections in relation to the applicator.
Figure 22C:
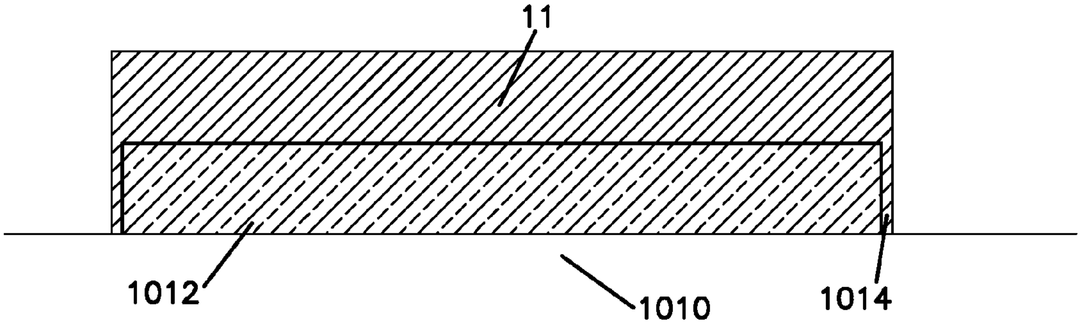
FIG. 22C is the embodiment shown in 22B, shown with the applicator compressed when applied to a surface being painted and the projections in contact with the surface.

FIG. 22 is a front view of an alternative embodiment that has external projections identified as side walls 1014. FIG. 22B is a cross-section view of such an embodiment with the applicator 1012 in an uncompressed state recessed within housing 1011. FIG. 22C shows a cross-section view, of the same embodiment of FIG. 22B, except with the applicator 1012 in a compressed state, such as would occur when apparatus 1010 is applied to the surface being painted. In FIG. 22C, the side walls 1014 contact the surface being painted, thereby controlling and limiting the degree of compression of the applicator 1012 against the surface being painted. In this configuration, the side walls 1014 can also act as seals or barriers to substantially contain and prevent paint from releasing onto adjacent trim elements. The location, size, and shape of the side walls 1014 can be varied to control where the paint is substantially contained versus where the paint is substantially allowed to release. Side walls may also comprise materials that aid in sealing against the surface being painted, such as elastomeric silicone, polyurethane, or similar in order to further contain and prevent excess paint from wicking under the side wall and staining the trim element or intersecting wall. By using the housing and side walls to contain and control paint release, the need for masking tape can be avoided.

Figure 23A:
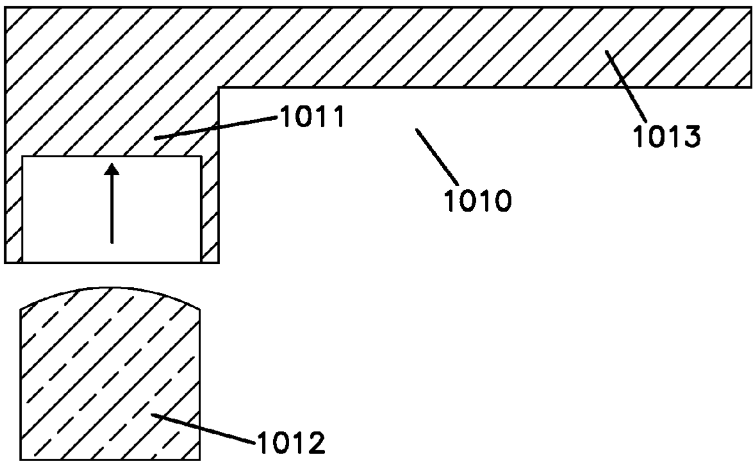
FIG. 23A is a side view of another embodiment of a painting apparatus, with an applicator having a domed superior surface which contacts a flat interior surface of a housing. Internal projections are not shown, for clarity.
Figure 23B:
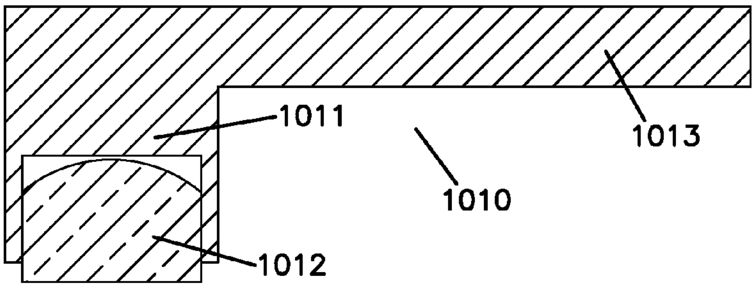
FIG. 23B is the assembled form of the embodiment of FIG. 23A, with the applicator in an uncompressed state.
Figure 23C:
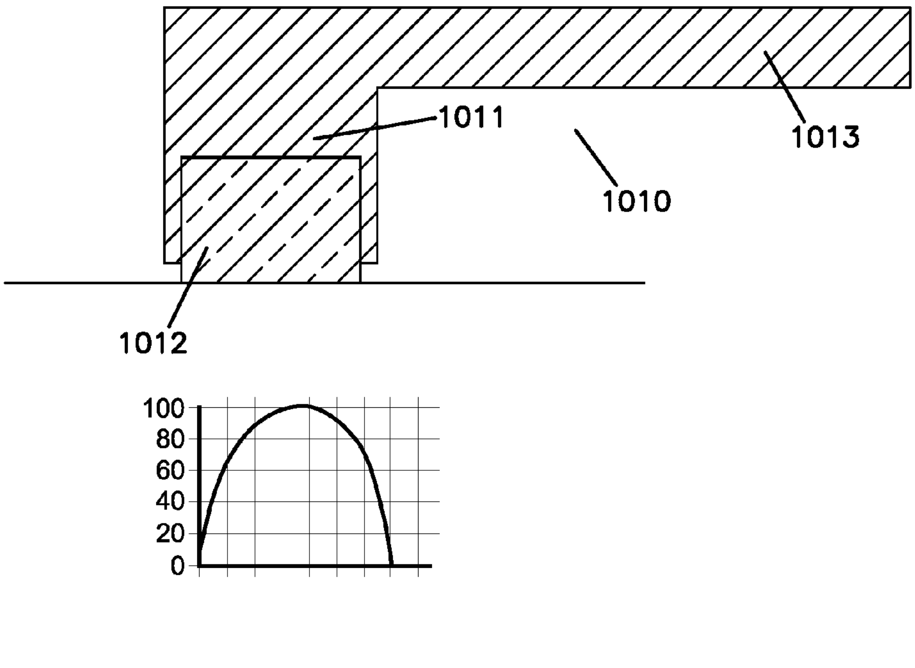
FIG. 23C is the embodiment shown in 23B, shown with the applicator compressed when applied to a surface being painted and the projections in contact with the surface. The profile graph under the applicator shown in 23C generally illustrates the degree of maximum possible applicator compression (limited by the projections) that corresponds with the relative position of the applicator.

Each of the embodiments shown in FIGS. 19 through 22 utilizes an applicator 1012 with generally flat surface shapes, creating a generally rectangular shape when viewed from the side. Applicators can have surface shapes, however, in order to provide different fluid flow and paint release characteristics when compressed. One embodiment using an alternative shape is shown in FIG. 23, where the superior surface of applicator 1012 has a convex shape when viewed from the side. FIG. 23A shows the convex shape of applicator 1012 and how it will contact the flat interior surface of housing 1011 when inserted into the housing, as shown in FIG. 23B. Due to the compressive nature of applicator 1012 and the unmatched shapes of the applicator 1012 and interior surface of housing 1011, when forced into a compressed state when apparatus 1010 is applied to the surface being painted, the amount of localized compression of applicator 1012 will vary across the profile of the applicator. FIG. 23C is the embodiment shown in 23B, shown with the applicator compressed when applied to a surface being painted and the projections in contact with the surface. The profile graph under the applicator shown in 23C generally illustrates the degree of maximum possible applicator compression (limited by the projections) that corresponds with the relative position of the applicator. The effect of this varying compression profile is the release of paint at a higher rate at the central portion of the applicator than at the outer edges of the applicator. With proper control of fluid flow, either through an integral paint feed source or by controlled uptake in an apparatus without an integral paint feed source, paint can be applied to the surface primarily at the central portion of the applicator, with excess paint reabsorbed by the applicator at the outer edges where the internal fluid-retaining volume of the applicator is greater. The applicator in alternative embodiments may have a convex shape in multiple axes and not just from the side, and may have shapes other than convex. Alternatively, the interior surface of the housing may have a shape other than flat, in conjunction with an applicator with a flat surface, or both housing and applicator may have non-flat surfaces. In another embodiment, the relative shapes of the applicator and housing may be such in order to provide higher localized paint application to certain areas other than the central region of the applicator, such as the applicator edge farthest from the trim element or intersecting wall.

Limiting and controlling the compression of the applicator has several advantages. It is common for paint to excessively discharge out of an applicator when it is compressed against a surface without compression limitations. By limiting and controlling the compression of the applicator, the excessive paint discharge can be reduced or eliminated. Additionally, to achieve a uniform coating it is typically important to maintain uniform pressure of the applicator against the surface being painted. Uniform pressure tends to result in uniform paint release rate from the applicator. By limiting and controlling the compression of the applicator, the housing provides a means to maintain uniform pressure of the applicator against the surface being painted.

Recessing an applicator within a housing has several advantages. The housing can incorporate side walls to control paint release. The location, size, and shape of the side walls can be varied to control where the paint is substantially contained versus where the paint is substantially allowed to release. By containing and controlling paint release from the applicator, precise edging can be accomplished and masking can be avoided.

Recessing an applicator within a housing also provides means to fluidly couple the applicator with an integral paint feed source. In this configuration, the housing provides a path for supplying paint to the applicator. Delivering paint to the applicator can eliminate pauses to reload the applicator with paint.

Figure 25:
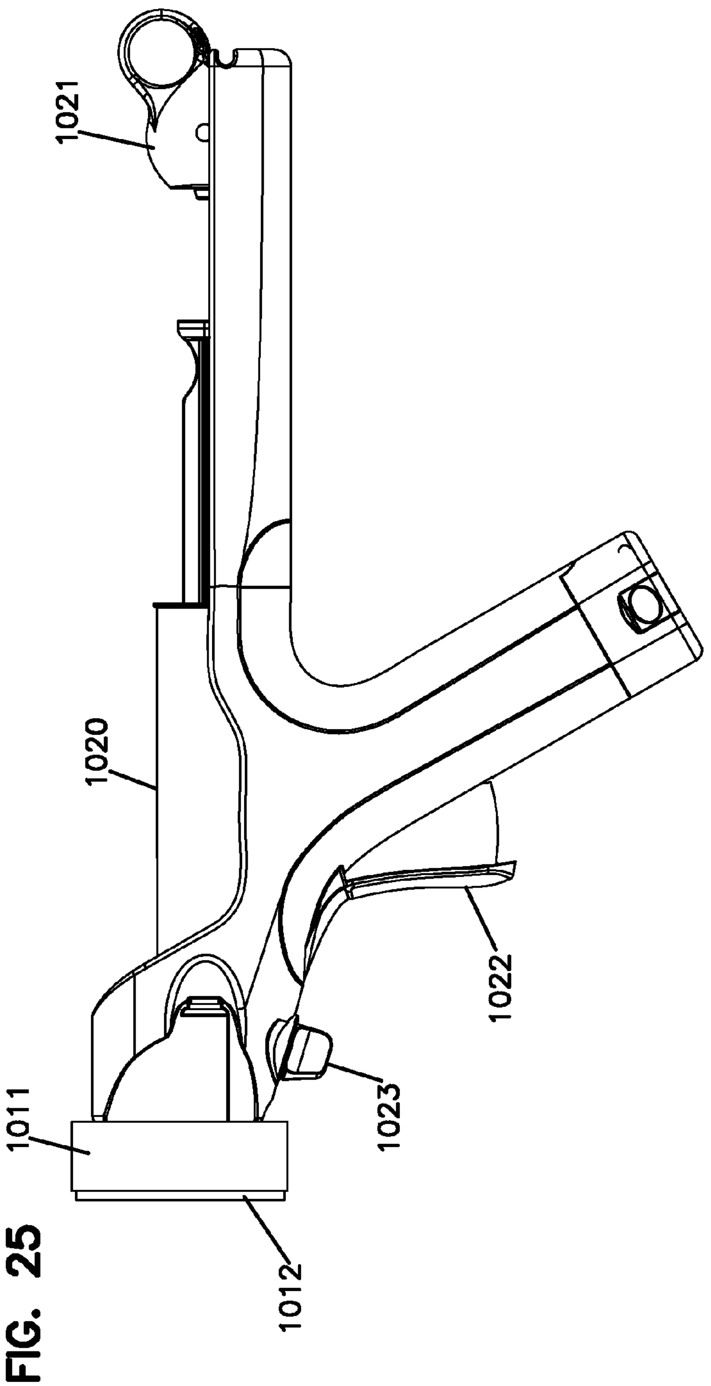
FIG. 25 is a side view of another embodiment of a painting apparatus including internal projections, an integral paint feed source, and a spring-actuated syringe serving as the paint source.

FIG. 25 is a stylized embodiment of an apparatus, incorporating an integral paint feed source. The apparatus shown in FIG. 25 may include any of the features relating to the paint applicators 1012 discussed above with respect to FIGS. 19-24 such as internal projections 1015. The apparatus shown in FIG. 25 may also include any of the features relating to the painting devices incorporating an integral paint feed source discussed with respect FIGS. 1-18. In this example embodiment, the apparatus utilizes a syringe 1020 filled with paint serving as the paint source. An urging mechanism 1021 acts on the syringe to dispense paint. The urging mechanism 1021 may, for example, be spring driven, motor driven, or manually advanced by the operator. A trigger 1022 may selectively allow the urging mechanism 1021 to dispense paint out of the paint syringe 1020 thereby delivering paint to the applicator 1012. A flow control 1023 may be incorporated to vary the volume and rate of paint being delivered to the applicator.

FIGS. 26-47 illustrate another embodiment of an apparatus or device 1100 having features similar to those of the embodiment shown in FIG. 25. As in the embodiment of FIG. 25, the painting apparatus 1100 is a paint tool that incorporates an integral paint feed source 1102. This embodiment may also utilize a syringe filled with paint serving as the paint source 1102. An urging mechanism 1104 is configured to act on the syringe 1102 to dispense paint. In the depicted embodiment, the urging mechanism 1104 is spring driven. A trigger 1106 is incorporated into the painting apparatus 1100 that may selectively allow the urging mechanism 1104 to dispense paint out of the paint syringe 1102 thereby delivering paint to the applicator portion 1108 of the device 1100. In the depicted embodiment, a flow control system 1110 is also incorporated to vary the volume and rate of paint being delivered to the applicator portion 1108 of the device 1100.

It will be understood that many of the inventive concepts featured on the painting devices or apparatuses illustrated in FIGS. 1-18 can be utilized on the apparatus 1100 of FIGS. 26-47. For example, as will be discussed in further detail below, the painting apparatus 1100 of FIGS. 26-47, in the depicted embodiment, is a vibrating paint tool that includes a motor 1112 for providing vibration to the paint applicator 1108 of the device 1100. Moreover, any of the features that are applicable to the different embodiments of the painting apparatus 1010 described above may be featured on the apparatus 1100 illustrated in FIGS. 26-47. For example, the painting apparatus 1100 illustrated in FIGS. 26-47, in the depicted embodiment, includes an applicator 1108 having external projections 1114 that control the degree of compression of the applicator 1108 against a surface being painted. As will be discussed in further detail below, in the embodiment shown in FIGS. 26-47, the external projections 1114 are in the form of angled side walls 1116 defined by a removable manifold structure 1120 of the device 1100.

Since the general configuration and operation of the paint apparatus 1100 of FIGS. 26-47 may parallel that of the embodiments discussed above with respect to FIGS. 1-25, at least in certain aspects, generally only the differences therebetween will be addressed below, with the understanding that the embodiment of FIGS. 26-47 can fully incorporate any of the features discussed with respect to the previous embodiments.

Referring now specifically to FIGS. 26-30, the painting apparatus 1100 generally includes a main body 1122 defining a first end 1124, a second end 1126, a first side 1128 and a second side 1130. The main body 1122 may also be referred to herein as a main housing 1122. The first end 1124 may also be referred to as the back or the rear end 1124 and the second end 1126 may also be referred to as the front end 1126. The first side 1128 may be referred to herein as the right side 1128 and the second side 1130 may be referred to herein as the left side 1130 of the main body 1122. The main body 1122 defines a longitudinal axis $A_{MB}$ extending in a direction from the rear end 1124 toward the front end 1126. The main body 1122 is generally formed from a right body half 1132 that is configured to be fastened to a left body half 1134 to capture the internal features of the apparatus 1100 therein during assembly of the device 1100.

Referring now specifically to FIGS. 31 and 35-45, the depicted example of the painting apparatus 1100 is configured with a removable painting module 1136 that generally includes a removably mounted paint source 1102 and a removable paint applicator 1108. As will be discussed in further detail below, the device 1100 and the removable features thereof are configured such that the entire fluid/paint path is disposed within the removable painting module 1136 such that paint is prevented or limited from coming into contact with non-disposable parts of the device 1100, such as the main body 1122 of the device 1100.

The paint source 1102, in the depicted example, is in the form of a removable paint reservoir such as a syringe having a plunger portion 1140. The plunger 1140, in the depicted example, includes a seal 1142 in the form of an O-ring for providing the proper vacuum seal to allow for paint filling and dispensing. Please see FIG. 31.

The syringe 1102, removed from the main body 1122 of the device 1100, may be used with a fill sleeve in filling the reservoir with paint. Further details of such a fill sleeve including the structure and the function thereof are described in U.S. patent application entitled "Apparatus for Reducing Syringe Fill Pressures", having Attorney Docket No. 16916.0002USU1, being filed concurrently herewith on the same day as the present application, the entire disclosure of which is incorporated herein by reference.

Now, referring back to FIGS. 26-30, similar to the previous embodiments described, the plunger 1140 of the syringe 1102, after the syringe 1102 has been loaded into a syringe cavity 1144 defined on the main body 1122 of the apparatus 1100, is configured to be advanced by an urging mechanism 1104. The urging mechanism 1104 is biased toward the front end 1126 of the main body 1122 for advancing the plunger 1140 during operation of the device 1100. In the depicted example, the biasing force is provided by a constant force spring 1146. At least a portion of the spring 1146 including the first end 1148 is coiled within an enclosure 1152 defined by the urging mechanism 1104. A second end 1154 of the spring 1146 is attached to a toe portion 1156 of the trigger 1106, as will be discussed in further detail below.

As also noted above, a constant force spring such as spring 1146 is configured to provide a substantially constant, uniform advance force on the plunger 1140, which is substantially maintained throughout the advance stroke. In this way, a relatively constant paint output rate can be achieved by using the constant force spring 1146, which can result in a substantially uniform supply of paint to the paint applicator 1108 to allow substantially uniform application of paint to the work surface. Although the constant force spring 1146 is described herein for use with the urging mechanism 1104 of the depicted embodiment, other examples of urging components can be used to advance the plunger 1140, which are also contemplated herein.

The urging mechanism 1104, in the depicted example, includes a pull handle 1160 for pulling the mechanism 1104 rearwardly during the loading of the syringe 1102 into the syringe cavity 1144. In the depicted example, the urging mechanism 1104 is configured to slide within a track 1162 defined on the main body 1122 in pushing the plunger 1140 toward the front end 1126 of the device 1100 for dispensing the paint. The urging mechanism 1104 includes a pair of track followers 1164 on each side of the enclosure 1152 that are configured to ride along a portion of the track 1162 defined by each of the main body halves 1132, 1134. The urging mechanism 1104 also includes a lateral projection 1166 on each side of the enclosure 1152. The lateral projections 1166 are configured to be positioned above the track 1162 when the urging mechanism 1104 slides in moving the plunger 1140. The lateral projections 1166 can be used for temporarily docking the urging mechanism 1104 at the rear of the device 1100 by inserting the projections 1166 into slots 1168 (e.g., c-shaped in the given embodiment) at the rear end 1124 of the main body 1122. In this manner, the urging mechanism 1104, which is normally biased forwardly by the constant force spring 1146, can be temporarily positioned out of the way of the syringe 1102 when the syringe 1102 is being loaded/reloaded into or unloaded from the syringe cavity 1144 of the device 1100.

Figure 26:
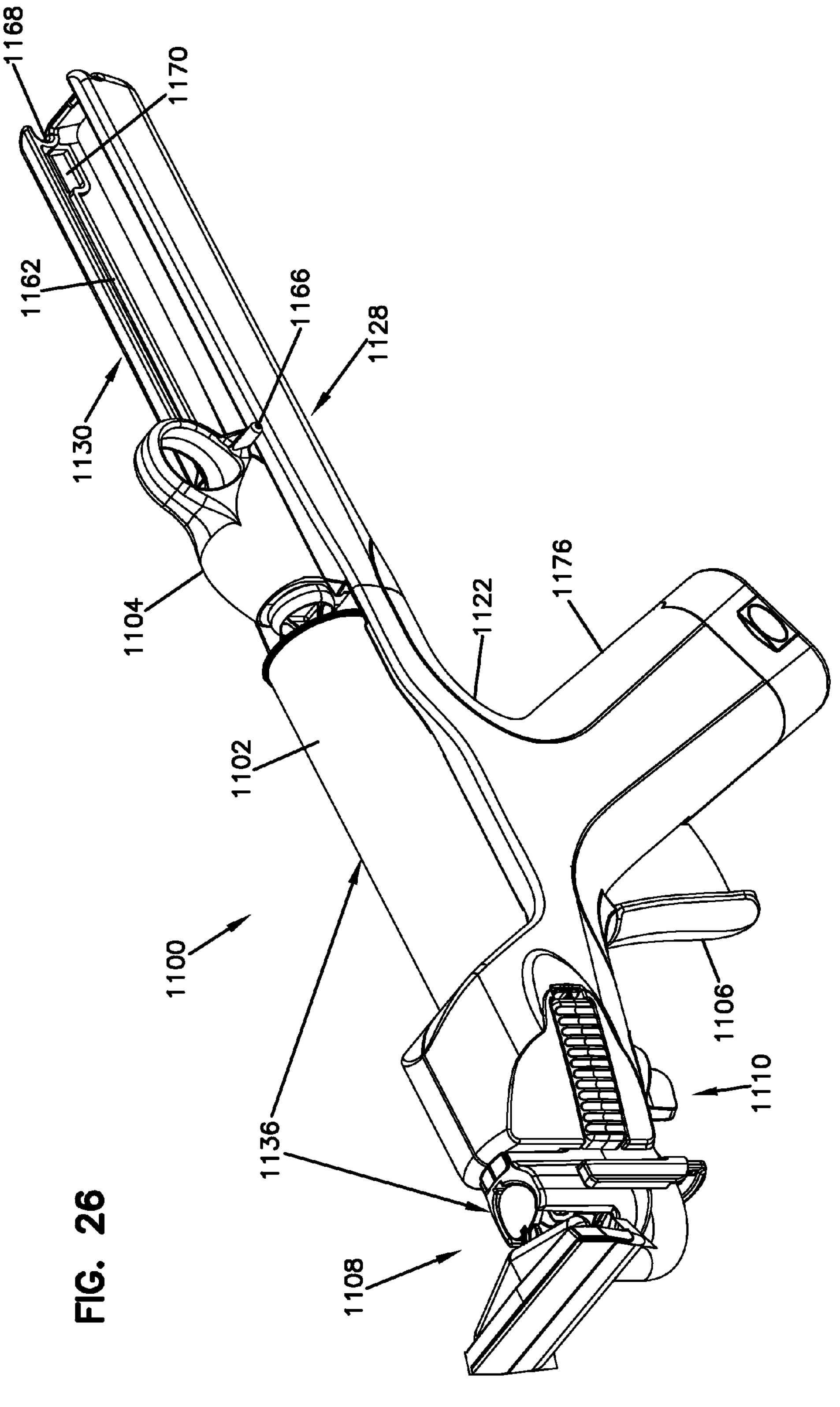
FIG. 26 is a front perspective view another embodiment of a painting apparatus including external projections, an integral paint feed source, and a spring-actuated syringe serving at the paint source.
Figure 27:
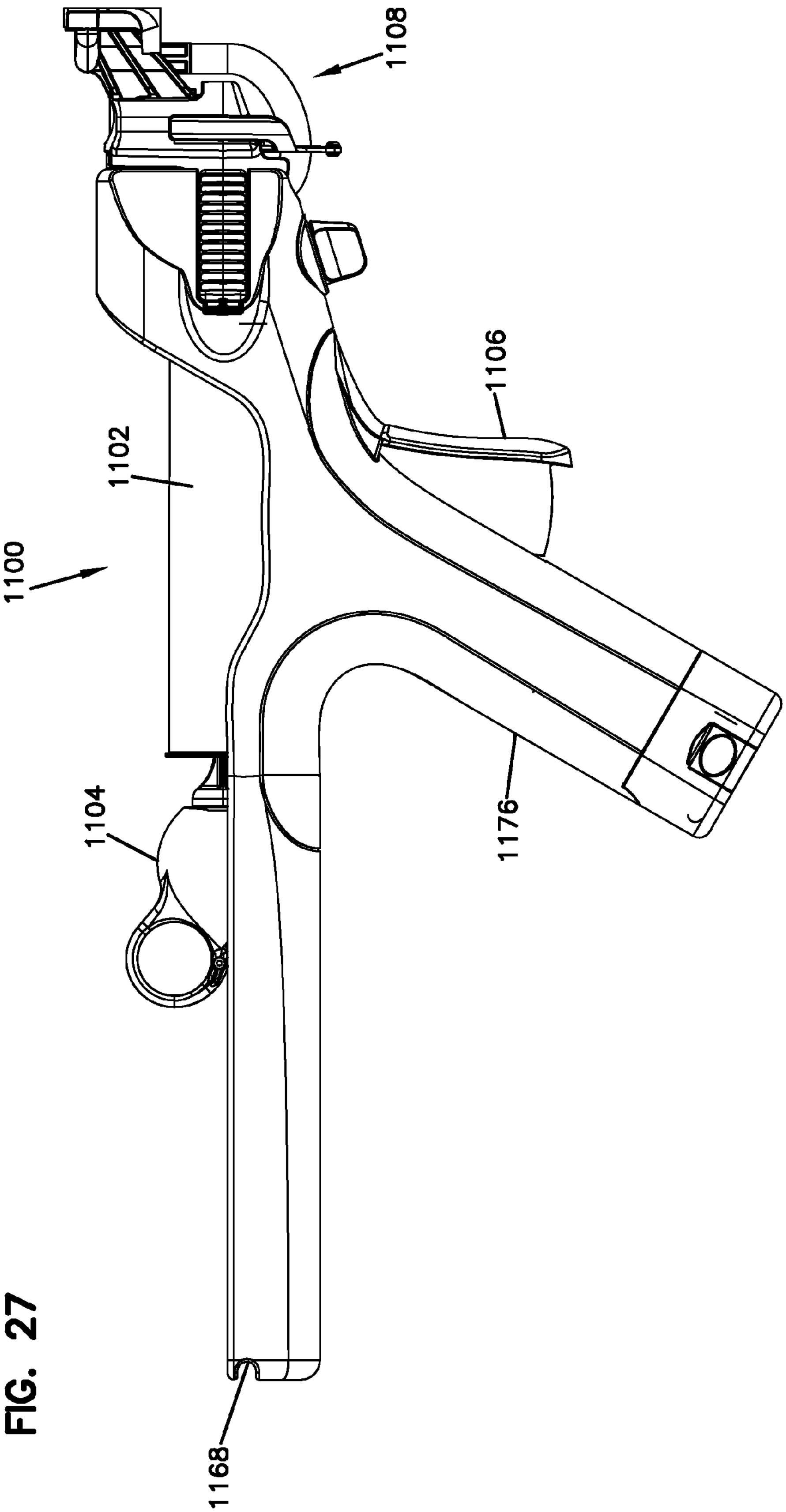
FIG. 27 is a side view of the painting apparatus of FIG. 26.
Figure 28:
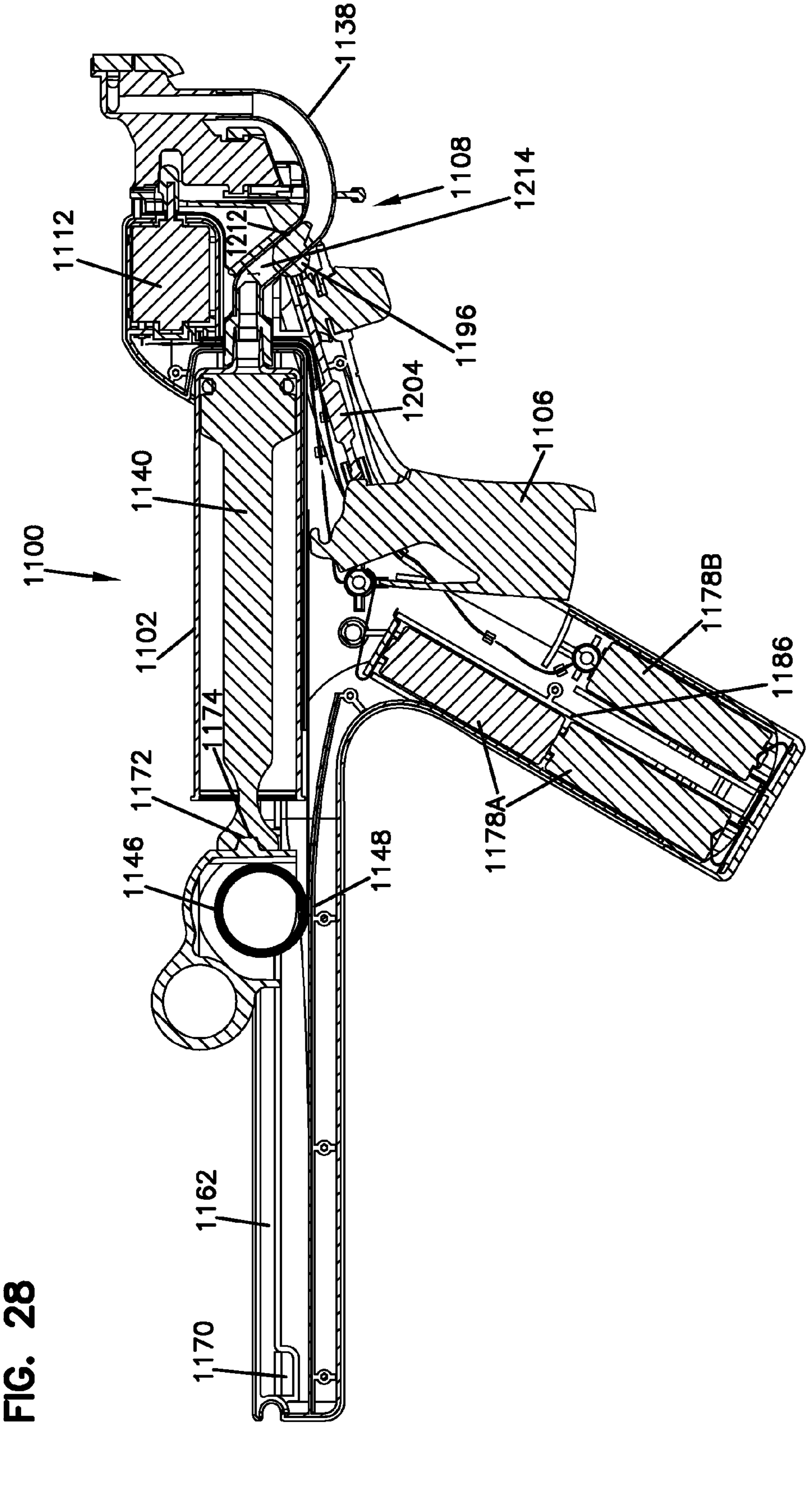
FIG. 28 is a cross sectional view of the painting apparatus of FIG. 27 taken along a line bisecting the painting apparatus.
Figure 29:
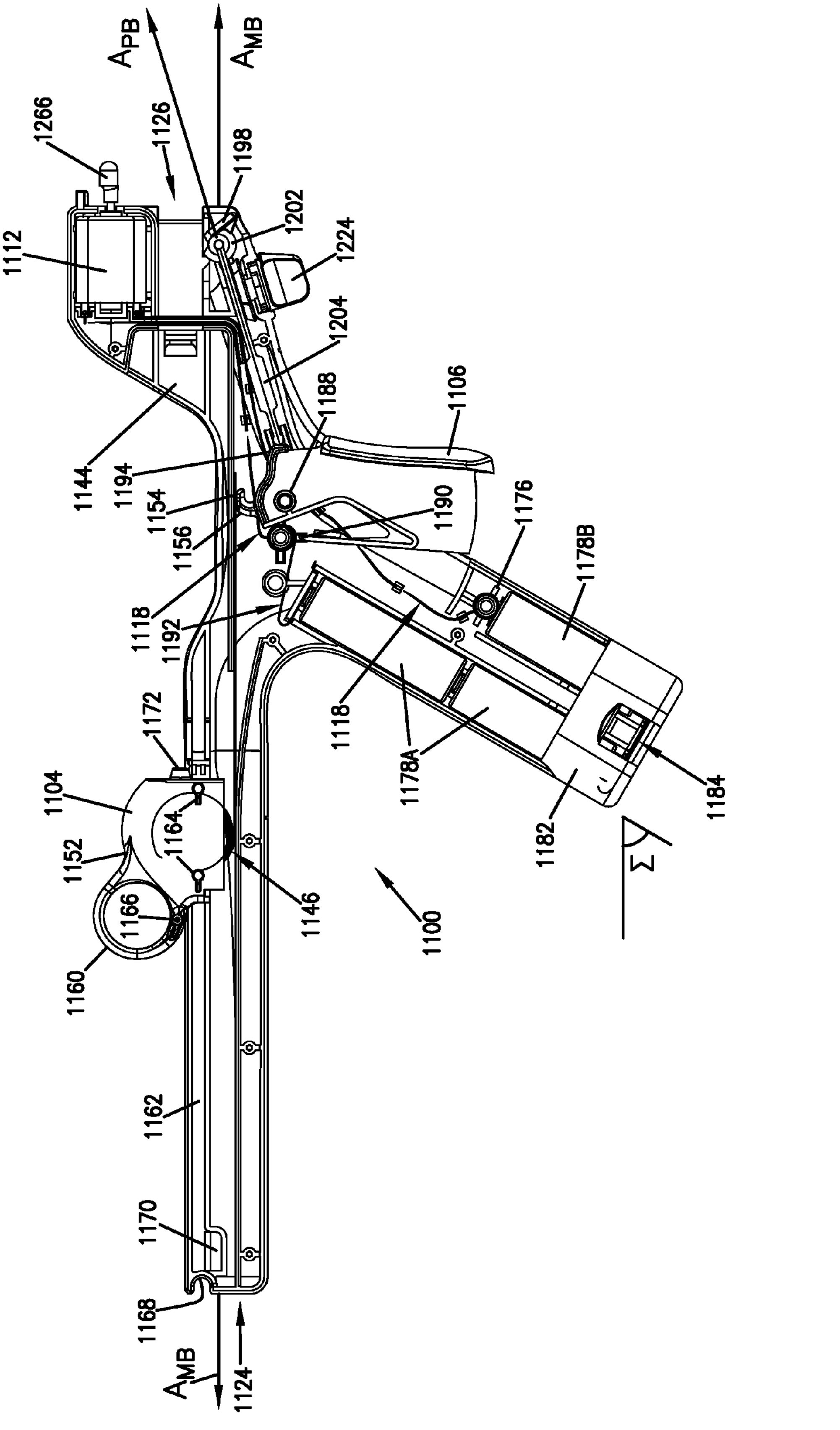
FIG. 29 is a side view of the painting apparatus of FIG. 27, shown with one of the body halves removed to expose the interior features thereof.
Figures 30A, 30B:
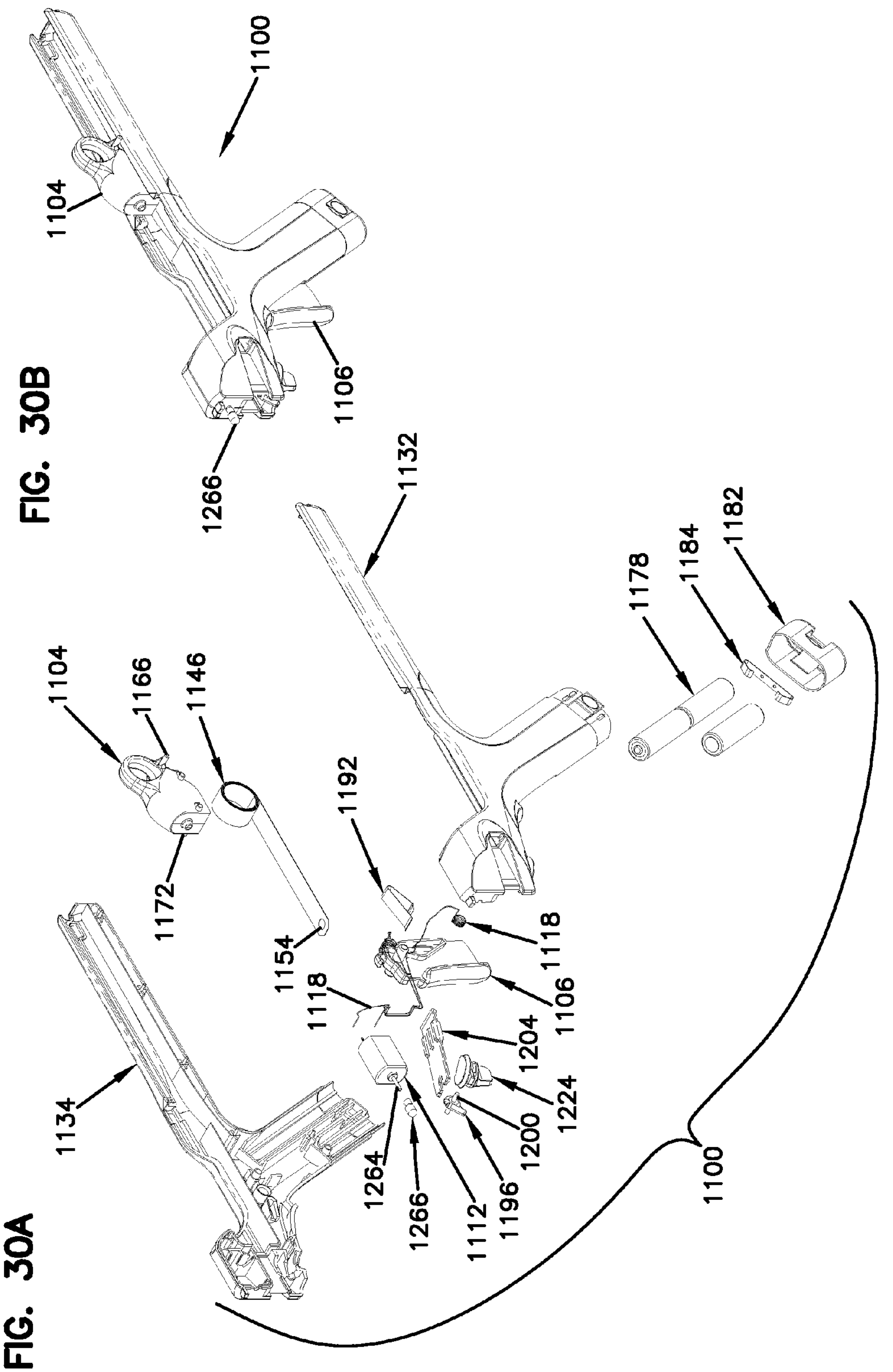
FIG. 30A is an exploded view of the painting apparatus of FIG. 26, the painting apparatus shown without the removable painting module of the apparatus.
FIG. 30B illustrates the painting apparatus of FIG. 30A in a fully assembled form.
Figure 31:
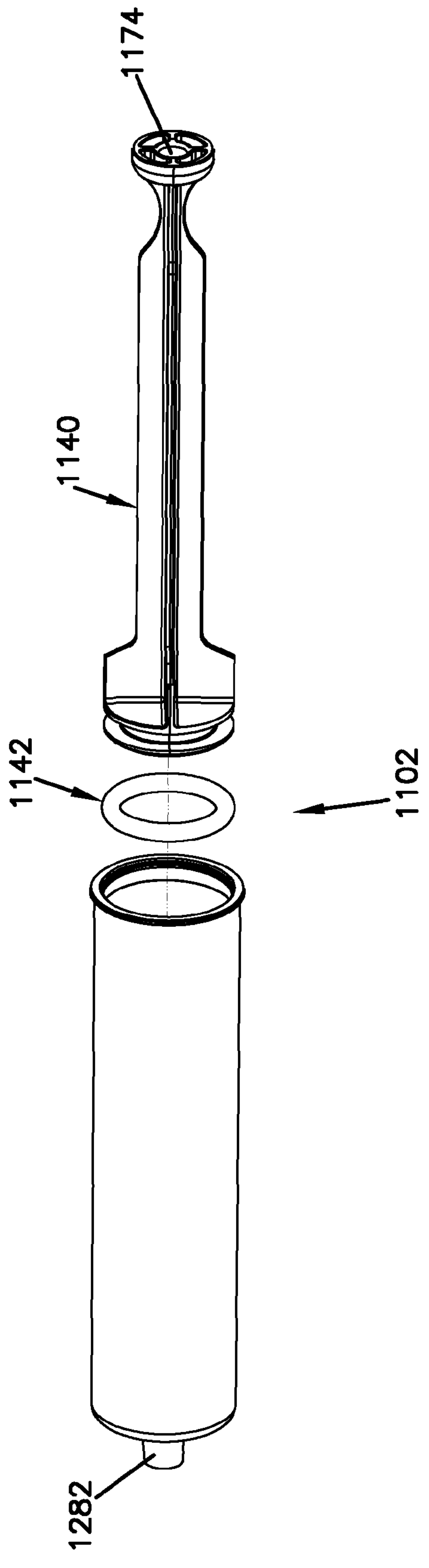
FIG. 31 is an exploded view of the paint feed source of the apparatus of FIG. 26.
Figure 32:
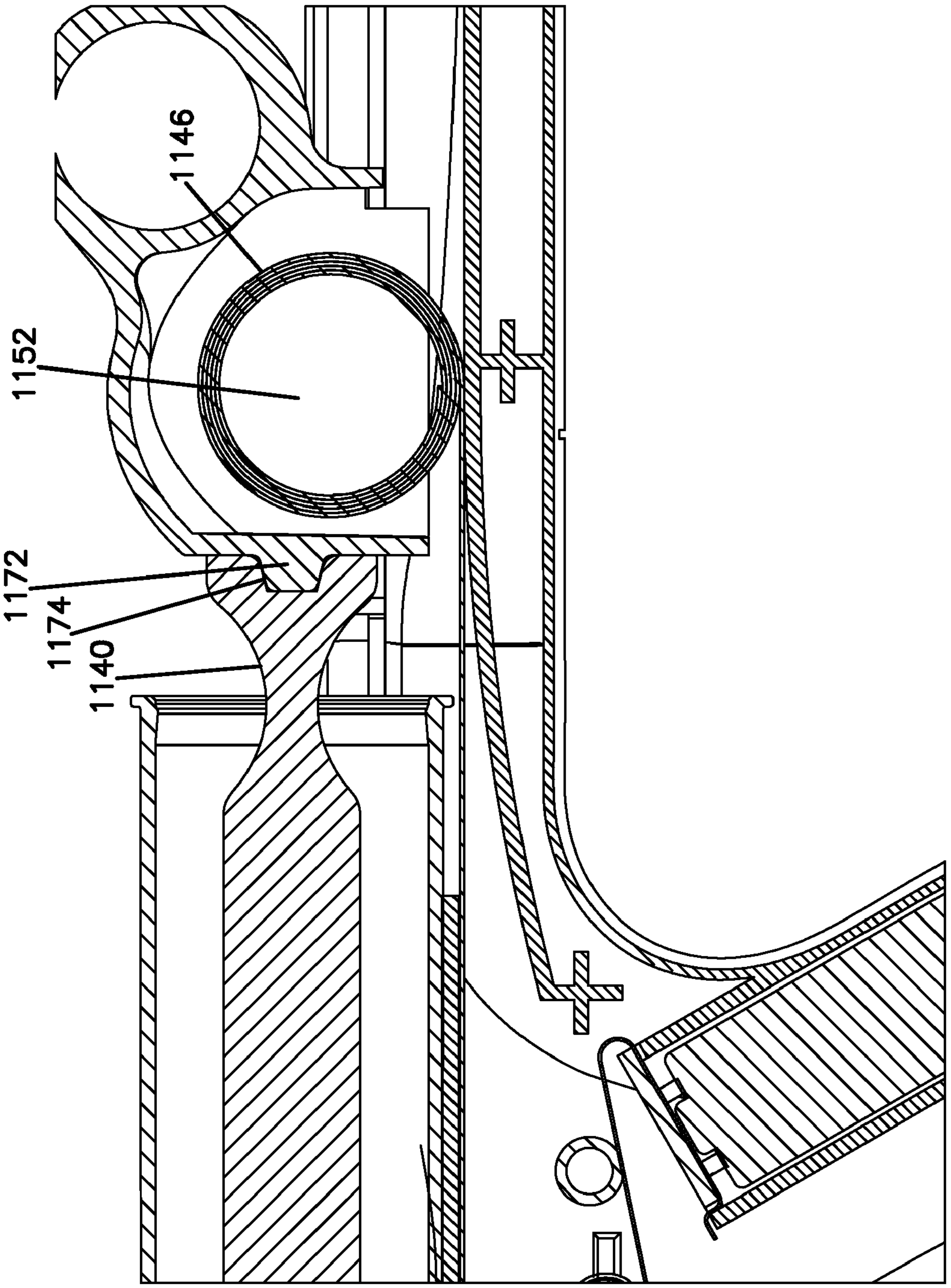
FIG. 32 illustrates the keying feature between the plunger of the syringe defining the paint feed source and the urging mechanism of the apparatus of FIG. 26.

As shown in FIGS. 26 and 29, the track 1162 includes an enlarged portion 1170 at each side of the device 1100 for accommodating the track followers 1164 when removing the urging mechanism 1104 off the track 1162 and engaging the slots 1168 with the lateral projections 1166 in docking the urging mechanism 1104.

Referring to FIGS. 29-32, the urging mechanism 1104 may also include a protrusion 1172 received within a bore 1174 formed on the plunger 1140 of the syringe 1102 to provide stability to and centering of the syringe 1102 resting in the syringe cavity 1144. The interaction of the protrusion 1172 and the bore 1174 might also serve a keying function. As will be described in further detail below, the keying feature provided by the protrusion 1172 and the bore 1174 is just one of the numerous keying features that might be provided between the main body 1122 of the device 1100 and some of the removable or disposable portions of the device 1100 (such as the syringe 1102) so as to associate a particular removable or disposable feature with a given device.

Referring now specifically to FIG. 29, the apparatus main body 1122 defines a handle portion 1176 that extends rearwardly and downwardly at a generally acute angle Σ with respect to the longitudinal axis $A_{MB}$ defined by the main body 1122. As will be discussed in further detail below, the handle portion 1176, the depicted embodiment, defines a generally hollow structure configured to house therein the power source 1178 (e.g., batteries) for powering the vibration motor 1112 of the device 1100. Wiring 1118 provided within the main body 1122 of the device 1100 electrically connects the power source 1178 with the motor 1112. An open end 1180 of the handle portion 1176 is closed by a battery cover 1182 to capture the batteries 1178 therein. In the depicted embodiment, the battery cover 1182 includes an electric contact 1184 attached thereto that is configured to continue the current flow from one set of batteries 1178A within a battery chamber 1186 to a third battery 1178B that is spaced apart from the first set 1178A. The battery cover 1182 may be coupled to the handle portion 1176 via any mechanical means such as a snap-fit interlock.

The handle portion 1176 also provides ergonomic support to a user of the apparatus 1100 in pressing/actuating the trigger 1106 of the apparatus 1100 and applying paint during use of the device 1100.

Still referring to FIG. 29, the trigger 1106 of the apparatus 1100 is pivotally coupled to the main body 1122 via a hinge portion 1188 that is captured between the right and left main body halves 1132, 1134. The trigger 1106 is biased to a non-actuated position via the spring 1146 housed within the main body 1122. Please see FIG. 30A for the spring 1146. As will be discussed in further detail below, the trigger is configured to perform multiple functions when actuated.

Figure 33:
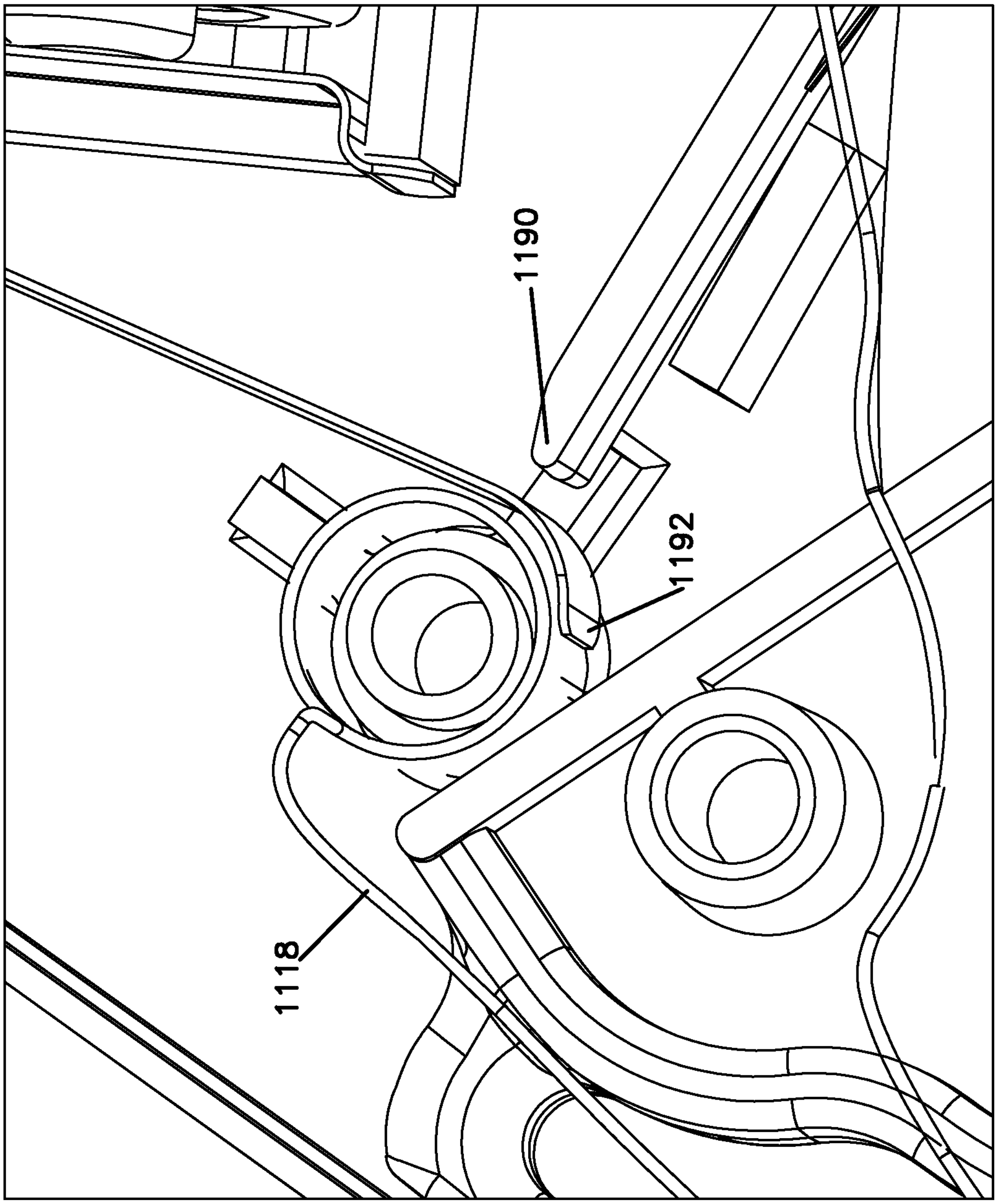
FIG. 33 illustrates a close-up view of the switch contact portion of the trigger of the apparatus of FIG. 26.
Figure 34:
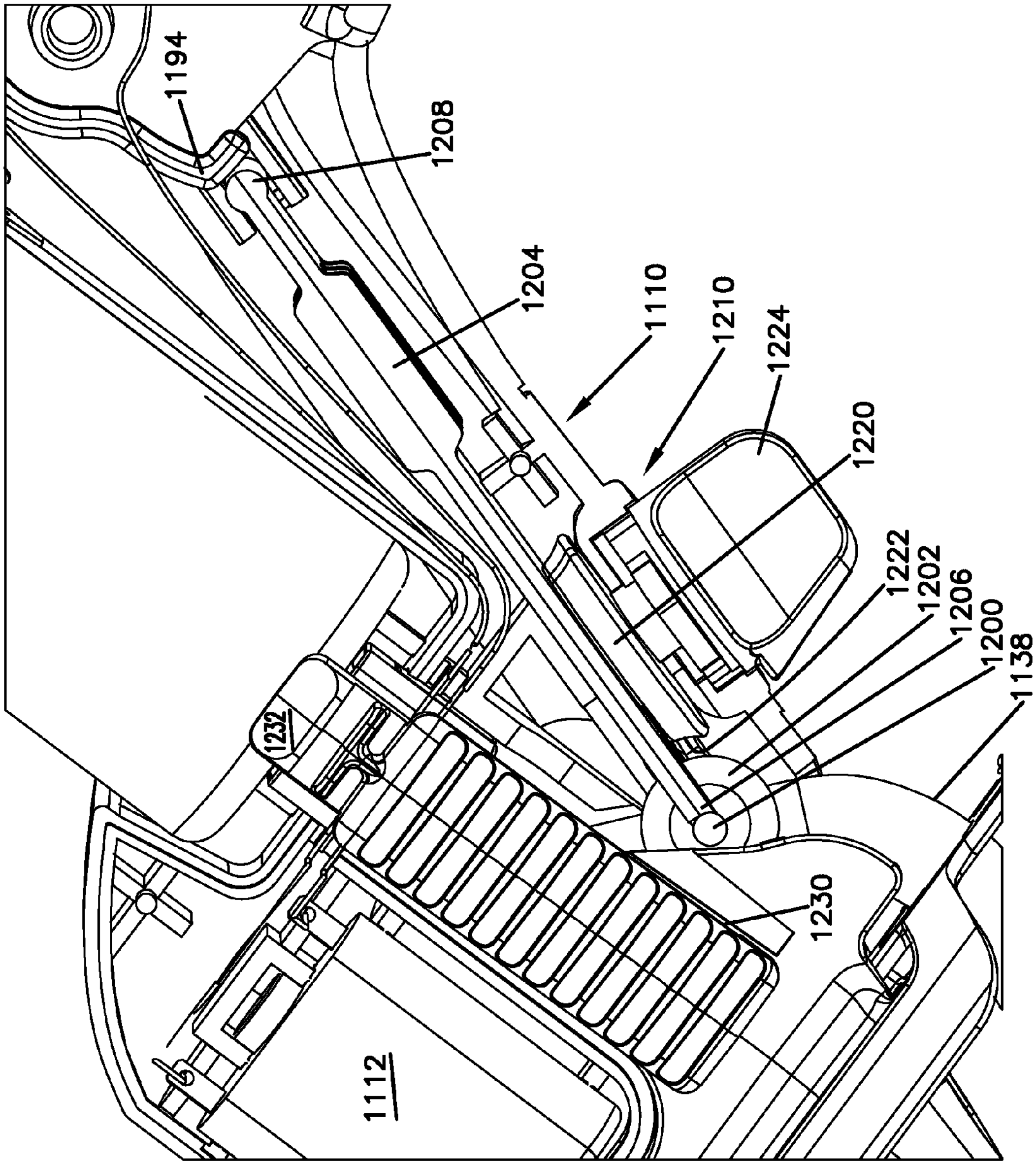
FIG. 34 illustrates a close-up view of the paint flow control system of the apparatus of FIG. 26.

Firstly, in the depicted embodiment, the trigger 1106 includes a switch contact portion 1190 that is configured to abut and move a contact switch 1192 of the device 1100 when actuated to establish current flow to the motor 1112 through the wiring 1118. A close-up view of the switch contact portion 1190 of the trigger 1106 is shown in FIG. 33.

Still referring to FIG. 29, secondly, the trigger 1106 defines a cam surface 1194 residing within the interior of the main body 1122 that is configured to form a part of the flow control system 1110 of the device 1100.

As will be described in further detail below, the flow control system 1110 includes a pinch blade 1196 that defines a pinching surface 1198, a pair of lateral projections 1200, and a curved cam follower surface 1202. The flow control system 1110 also include a pinch bar or linkage 1204 that operatively connects the trigger 1106 to the pinch blade 1204, wherein the pinch bar 1204 defines a first end 1206, a second end 1208, and a longitudinal axis $A_{PB}$ that extends from the first end 1206 to the second end 1208. The flow control system 1110 further includes a control mechanism 1210 that interacts with the pinch blade 1196 in controlling the paint flow rate or volume being dispensed from the paint source 1102 to the paint applicator 1108.

The control system 1110 is arranged such that the pinching surface 1198 of the pinch blade 1196 is configured to contact and collapse the paint feed tube 1138 against a surface 1212 defining at least a portion of a tube cavity 1214 of the device 1100 to reduce the lumen of the paint feed tube 1138 to inhibit paint flow through the lumen when the trigger 1106 is not actuated. When the trigger 1106 is in the non-actuated position, the pair of lateral projections 1200 of the pinch blade 1196 contact the first end 1206 of the pinch bar 1204, wherein the opposite second end 1208 of the pinch bar 1204 is contacted by the cam surface 1194 of the trigger 1106 in restraining any movement of the pinch blade 1196 rearwardly along its longitudinal axis $A_{PB}$. Thus, when the trigger 1106 is in a non-actuated state, the pinch blade 1196 is at a fully forward position, collapsing the lumen of the paint feed tube 1138 within the tube cavity 1214. The pinch blade 1196 is prevented from moving back by the pinch bar 1204 that contacts the lateral projections 1200.

When the trigger 1106 is actuated, the second end 1208 of the pinch bar 1204 starts to encounter a change in the cam profile of the cam surface 1194 of the trigger 1106 and is allowed to move rearwardly along its longitudinal axis $A_{PB}$. The pinch blade 1196 is normally biased rearwardly along the longitudinal axis $A_{PB}$ of the pinch bar 1204 by the material properties (e.g., rigidity/elasticity) of the paint feed tube 1138. Thus, when the pinch bar 1204 encounters a change in the cam profile of the cam surface 1194 of the trigger 1106, the pinch bar 1204 is allowed to move rearwardly, which in turn allows the pinch blade 1196 to move rearwardly due to the recovery bias force of the paint feed tube 1138.

It should be noted that the cam surface 1194 of the trigger 1106 can include a variable cam profile such that partial actuation of the trigger 1106 can allow the pinch blade 1196 to move partially rearwardly under the bias force of the paint feed tube 1138 without necessarily fully opening the lumen of the paint feed tube 1138. In this manner, a user can use the trigger 1106 to control the amount of paint passing through the lumen. When the trigger 1106 is fully pivoted, the lumen of the paint feed tube 1138 can be fully opened. However, as will be described in further detail below, even when the trigger 1106 is fully pivoted, the device is configured such that the amount of paint flow through the lumen can be adjusted to be less than the maximum rate. It is the flow control mechanism 1210 of the control system 1110 that can allow a user to adjust the paint flow to less than the maximum flow through the lumen of the paint feed tube 1138, even when the trigger 1106 is fully opened.

The rearward movement of the pinch blade 1196 allows opening at least a portion of the collapsed lumen of the paint feed tube 1138 to establish paint flow. As will be described in further details below, the flow control mechanism 1210 of the control system 1110 can dictate how far the lumen can be allowed to be opened by the pinch blade 1196.

Still referring to FIG. 29, the flow control mechanism 1210 is configured to control the paint flow rate and volume by controlling how far rearwardly the pinch blade 1196 can move along the longitudinal axis $A_{PB}$ of the pinch bar 1204 after it has been freed by actuation of the trigger 1106. The control mechanism 1210 defines an eccentric cam portion 1220 defining a cam face 1222, the profile of which is adjustably by a flow control knob 1224. After the trigger 1106 is actuated, how far the pinch blade 1196 can be allowed to move rearwardly is controlled by the profile of the cam face 1222 of the control mechanism 1210 (please see FIG. 34). The curved cam follower surface 1202 of the pinch blade 1196 interacts with the cam face 1222 of the eccentric cam portion 1220 of the flow control mechanism 1210 in limiting movement of the pinch blade 1196. The abutment of the curved surface 1202 of the pinch blade 1196 with the cam face 1222 of the control mechanism 1210 determines how far the pinch blade 1196 can move rearwardly along the longitudinal axis $A_{PB}$ of the pinch linkage 1204. Thus, actuation of the trigger 1106 establishes paint flow for the device 1100 by opening the lumen of the paint feed tube 1138, the size of the opening adjustable by the flow control mechanism 1210 via the flow control knob 1224.

As discussed above with regard to previous embodiments, the flow control knob 1224 may be provided in the form of an adjustable thumb screw to impede paint flow through the paint feed tube 1138 by incrementally collapsing the paint feed tube 1138 in the tube cavity 1214. In certain examples, the flow control knob 1224 can include user adjustable settings to allow the flow to be tuned to varying paint viscosities and the user's rate of painting or trimming. For instance, the pitch on the thumb screw of the flow control mechanism 1210 can be such that one revolution results in range from zero to substantially completely occluded flow. In one example, tuning increments can be provided, such as increments that can correspond to, for instance, a quarter turn resulting in approximately 25% occlusion of the lumen of the paint feed tube 1138, a half turn resulting in approximately 50% occlusion of the lumen of the paint feed tube, etc. In this way, combining a substantially consistent paint dispense rate with a user adjustable paint flow volume control can allow the user to relatively consistently apply a substantially uniform amount of paint to the work surface.

Still referring to FIG. 29, thirdly, as will be described in further detail below, the trigger 1106 is also configured to provide an initial "kick-start" to the movement of the plunger 1140. The trigger 1106 is configured to provide a break-away force or jolt to the constant force spring 1146 of the device 1100 to move the spring 1146 from a static non-flow position to a dynamic flow position. Since the second end 1154 of the constant force spring 1146 is attached to the toe portion 1156 of the trigger 1106, when the trigger 1106 is actuated and pivoted forwardly, the toe 1156 also moves slightly forwardly, providing a pulling force on the constant force spring 1146. Even though the constant force spring 1146 is configured to bias the plunger 1140 of the syringe 1102 forwardly during operation of the device 1100, it is advantageous to provide an initial break-away force to the spring 1146 to cause the spring 1146 to start coiling and to start advancing the plunger 1102 forwardly. If the forward motion of the urging mechanism 1104 has been interrupted for any reason and is, thus, in a static state, such as by, for example, the plunger 1140 encountering an opposing frictional force due to dry paint, the slight break-away force provided by the trigger 1106 is enough to overcome such a halting force and move the urging mechanism 1104 forwardly. It is believed that at least part of the reason that a forward movement of the toe 1156 results in the providing a forward force on the urging mechanism 1104 is that the force to uncoil the depicted constant force spring 1146 is normally greater than the force provided by the spring 1146 when the spring 1146 is coiling up.

Now referring specifically to FIGS. 35-42, as noted above, in addition to a removable paint source 1102, the painting module 1136 of the device 1100 also includes the removable paint applicator 1108. The removable paint applicator 1108 generally includes a removable receiver structure 1226, a removable manifold 1120 that is slidably and movably engaged with the receiver 1226, a paint feed tube 1138, and a paint pad 1228 attached to the manifold 1120.

Figure 42:
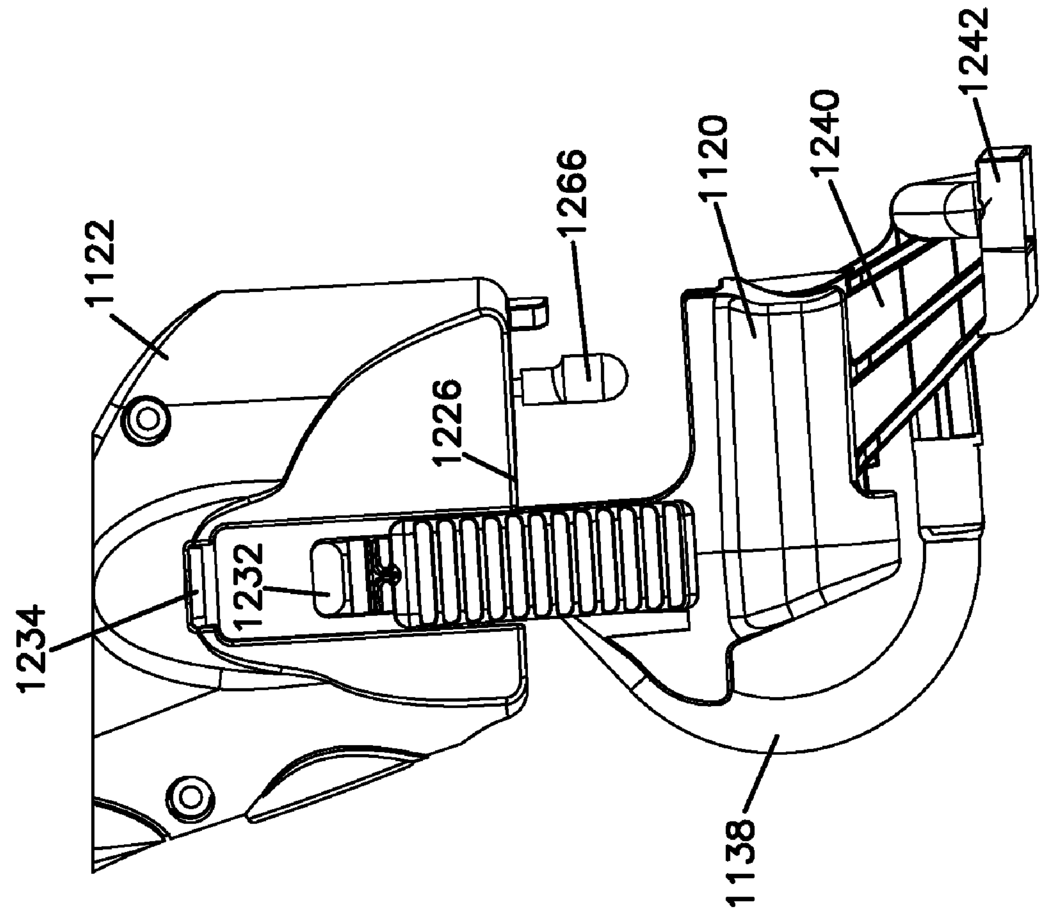
FIG. 42 illustrates the engagement of the removable paint applicator of FIG. 35 with the body of the apparatus of FIG. 26.

Referring to FIG. 42, the receiver 1226 is configured to be removably attached to the main body 1122 of the device 1100 with a snap-fit interlock. The receiver 1226 defines elastically flexible cantilever arms 1230 with ramped tabs 1232 that fit within grooves 1234 defined adjacent the front end 1126 of the main body 1122 for coupling the two structures together. The receiver structure 1226 is the portion of the removable paint applicator 1108 of the device 1100 that directly interacts with the body 1122 for coupling the paint applicator 1108 to the body 1122.

Referring to FIGS. 35-42, the receiver 1226 defines a socket portion 1236. The manifold 1120 includes a manifold body 1238. The manifold body 1238 defines a coupling portion 1240 for coupling to the socket 1236 of the receiver 1226, a paint surface contact portion 1242 and an intermediate portion 1244 that connects the coupling portion 1240 to the surface contact portion 1242.

The coupling portion 1240 is slidably and pivotably disposed within the socket 1236 of the receiver 1226. In the depicted embodiment, the coupling portion 1240 defines a generally cylindrical configuration that is configured to slide within a complementarily shaped socket 1236 of the receiver 1226.

The body 1238 of the manifold 1120 defines a dispensing chamber 1246 for dispensing paint to the paint pad 1228 attached to the manifold 1120. As will be discussed in further detail below, the intermediate portion 1244 of the manifold body 1238 that connects the coupling portion 1240 to the surface contact portion 1242 includes a tube inlet 1248 that is configured to receive an end 1250 of the paint feed tube 1138 for fluidly connecting the dispensing chamber 1246 to the paint source 1102 through the paint feed tube 1138.

Figure 40:
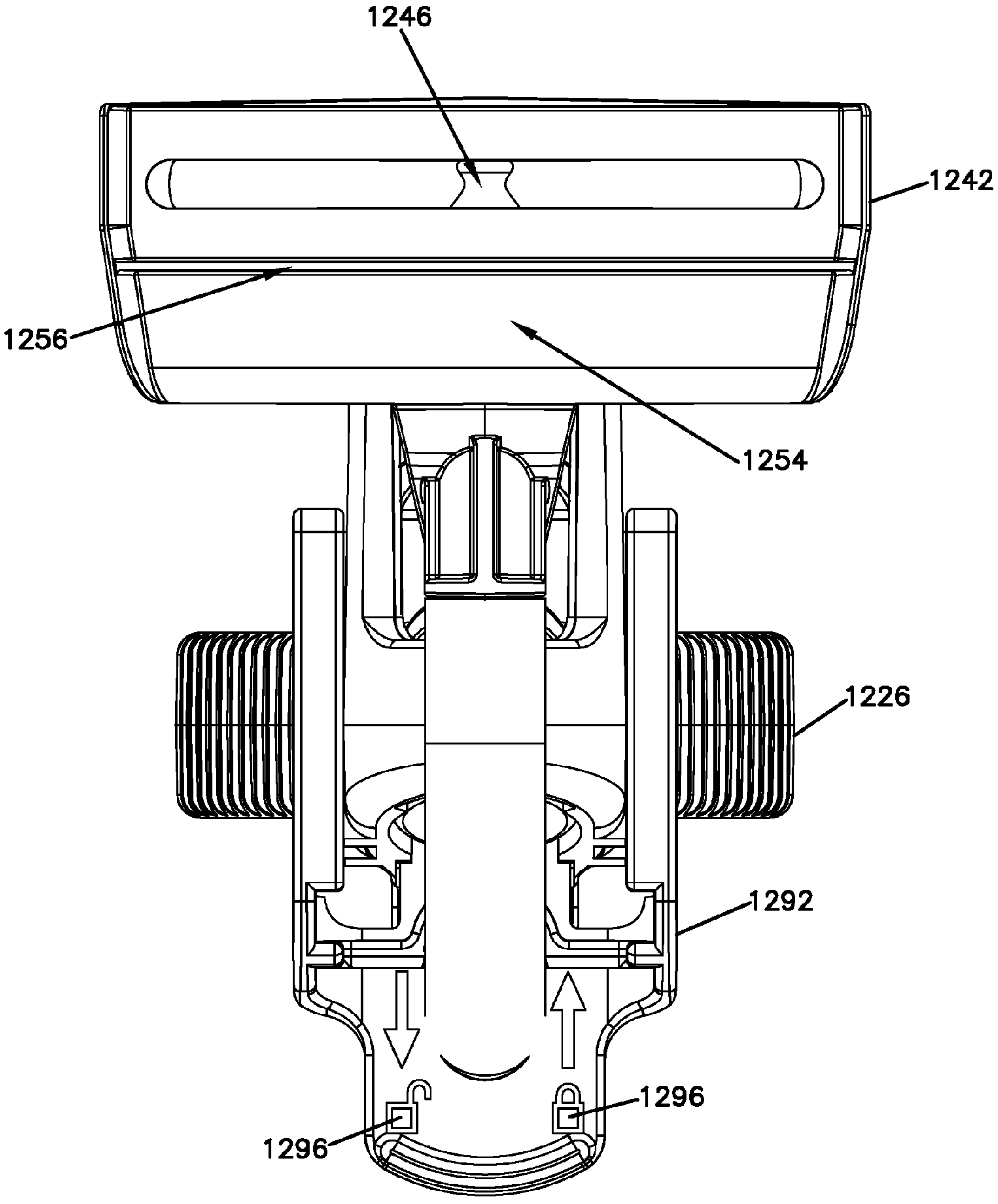
FIG. 40 is a front view of the manifold of the removable paint applicator of FIG. 35, the manifold shown without a foam applicator attached thereto.

The paint pad 1228, in the depicted embodiment, is made up of a foam paint applicator 1252 and a foam wiper 1254 that are attached to the manifold 1120 so as to receive paint from the dispensing chamber 1246. As shown in FIG. 40, the foam applicator 1252 communicates with the dispensing chamber 1246, which may be blocked off from the foam wiper 1254 by a divider 1256 provided on the manifold 1120. The porous nature of the foam applicator 1252 transfer paint from the dispensing chamber 1246 to an opposite side of the applicator 1252. The foam applicator 1252 and the foam wiper 1254 are arranged such that during use of the device 1100, as paint is applied, the foam wiper 1254 is able to clean surfaces to be painted prior to contact by the foam applicator 1252. The foam wiper 1254 may also prevent drip of any paint when the device 1100 is being used. As discussed above, similar to the previous embodiments of the paint apparatuses described with respect to FIGS. 19-25, the surface contact portion 1242 of the manifold body 1238 may define angled side walls 1116 that serve as external projections 1114. As described in detail previously, the external projections 1114 can help control the degree of compression of the foam paint applicator 1252 and foam wiper 1254 against the surface being painted and the angled profile of the sidewalls 1116 can help provide spacing for edging purposes. The external projections 1114 may prevent paint from flowing out as the foam applicator 1252 and foam wiper 1254 are compressed between the applicator 1108 and the work surface. According to one example embodiment, the foam applicator 1252 and the foam wiper 1254 may extend outwardly, preferably, not more than about 0.125 inches from a plane P defined by the surface contact portion 1242 of the manifold body 1238, as shown in FIGS. 35-39 to provide proper application.

As noted previously, providing a manifold structure 1120 that utilizes a surface contact portion 1242 having sidewalls 1116 that serve as external projections 1114 provides a number of advantages. The sidewalls 1116 contact the surface being painted, thereby controlling and limiting the degree of compression of the foam applicator 1252 against the surface being painted. The sidewalls 1116 can also act as seals or barriers to substantially contain and prevent paint from releasing onto adjacent trim elements. The location, size, and shape of the sidewalls 1116 can be varied to control where the paint is substantially contained versus where the paint is substantially allowed to release. Sidewalls 1116 may also comprise materials that aid in sealing against the surface being painted, such as elastomeric silicone, polyurethane, or similar in order to further contain and prevent excess paint from wicking under the sidewall 1116 and staining the trim element or intersecting wall. By using the sidewalls 1116 of the manifold 1120 to contain and control paint release, the need for masking tape can be avoided.

In certain embodiments, bristles can also be used along side edges 1258 defined by the surface contact portion 1242 of the manifold body 1238 that contact the work surface. Bristles can also be provided on a front edge 1260 defined by the surface contact portion 1242 of the manifold body 1238. Bristles may help with paint drip and/or build-up.

Referring to FIG. 42, as noted above, in the depicted embodiment of the device, a motor 1112 (e.g., a DC electric motor) that is powered by an integral power source 1178 such as batteries, is mounted adjacent the front 1126 of the body 1122 of the device 1100 in a motor chamber 1262. The motor 1112 includes an output in the form of a drive shaft 1264 that is generally oriented parallel to the longitudinal axis $A_{MB}$ of the main body 1122. The drive shaft 1264 extends outwardly from the main body 1122 so as to contact portions of the removable paint applicator 1108 of the device 1100. The drive shaft 1264 defines a drive cam 1266 that is configured to cause movement to a cam follower surface 1268 (e.g., the cam follower surface 1268 defined by the coupling portion 1240 of the manifold body 1238) in a direction generally perpendicular to the drive shaft 1264 so as to cause a vibrating motion generally perpendicular to the drive shaft 1264.

Oscillating or otherwise vibrating the paint applicator 1108 against the work surface, substantially in line with the direction the user is pulling the device, can inhibit drag and increase control of the device 1100. However, as noted previously, it is further contemplated that the user can move the device 1100 in any direction with respect to the direction of vibration.

Figure 35:
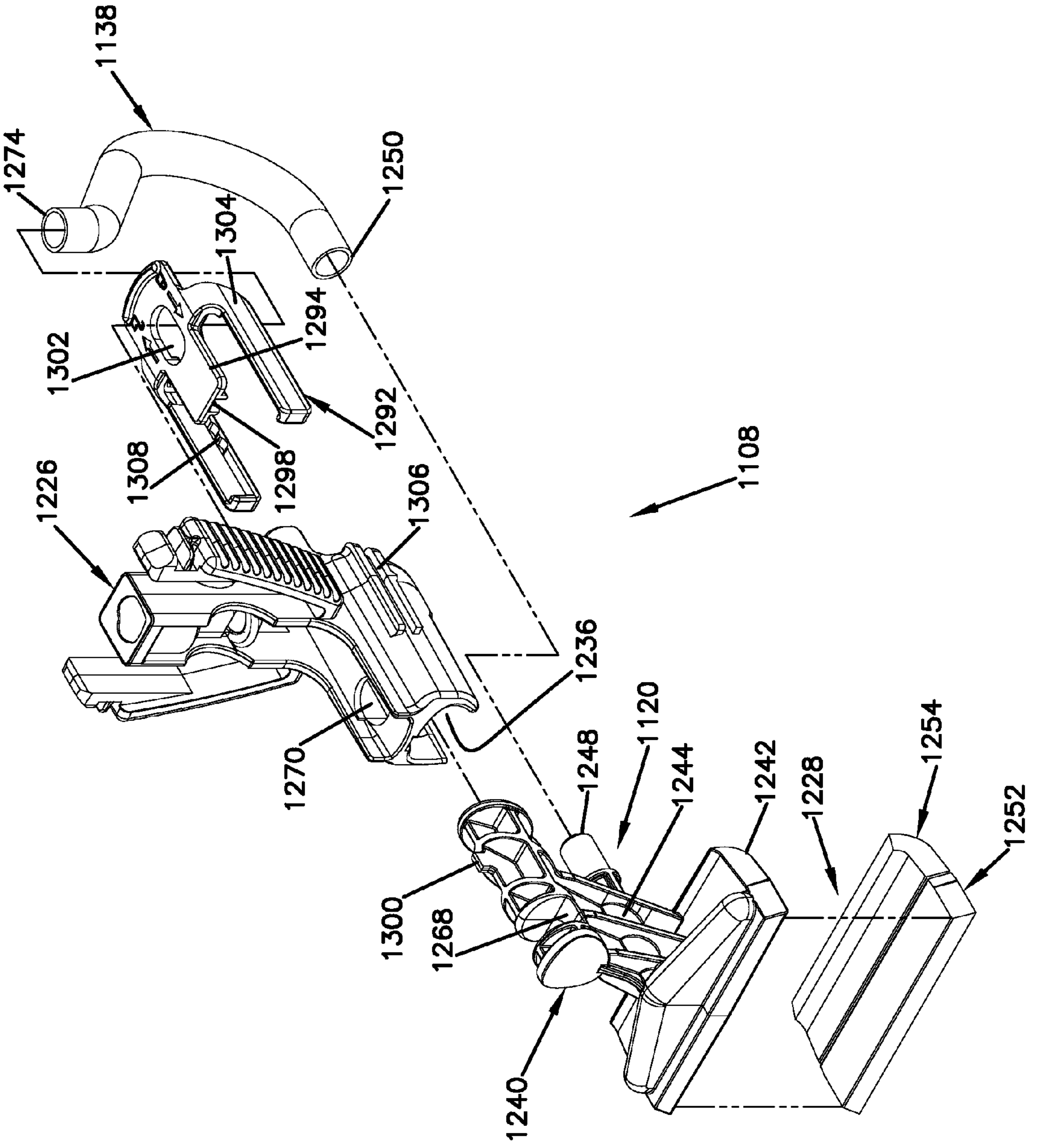
FIG. 35 is an exploded view of the removable paint applicator of the apparatus of FIG. 26.
Figure 36:
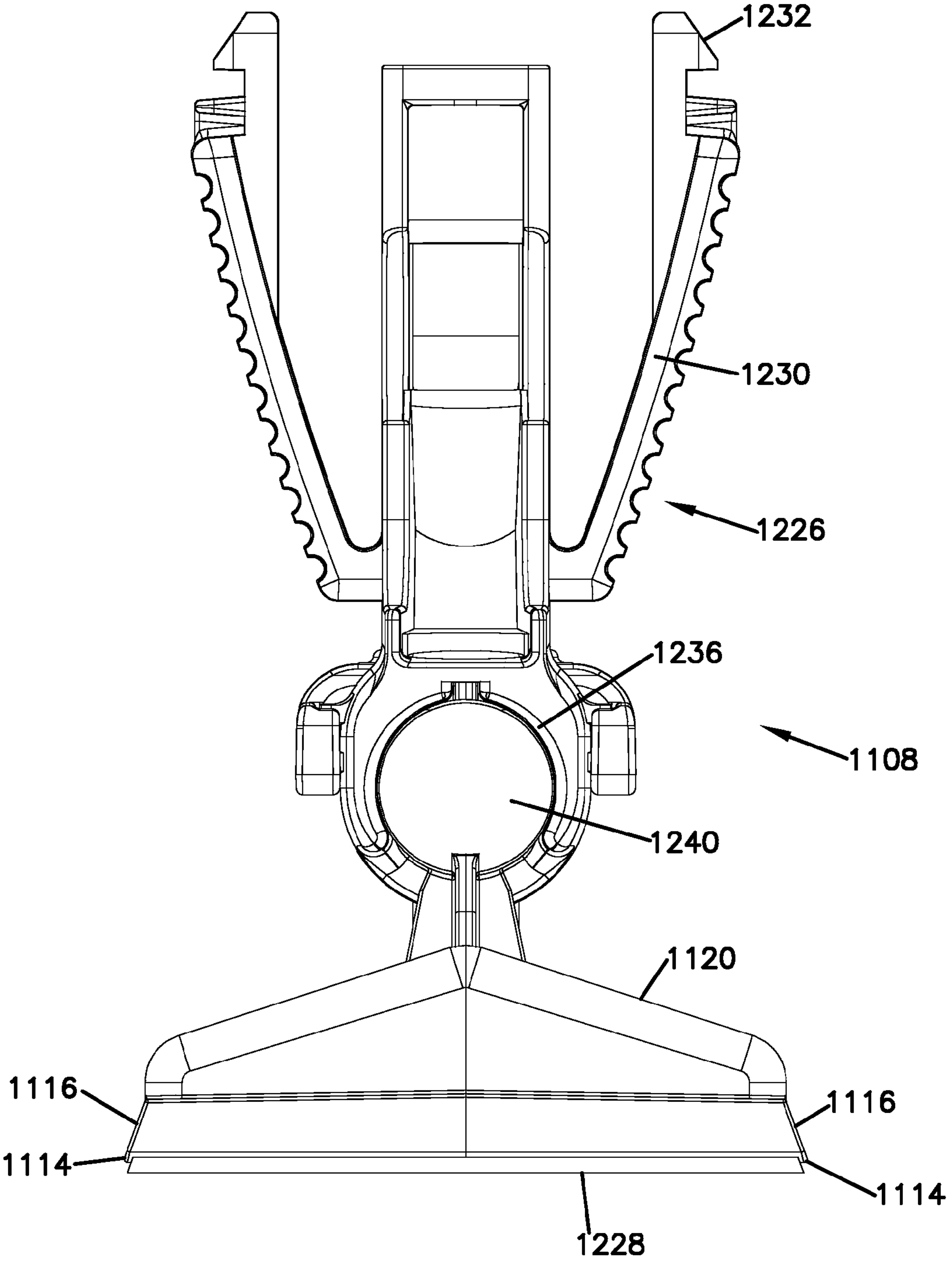
FIG. 36 illustrates a front view of the removable paint applicator of FIG. 35 in a fully assembled form.
Figure 37:
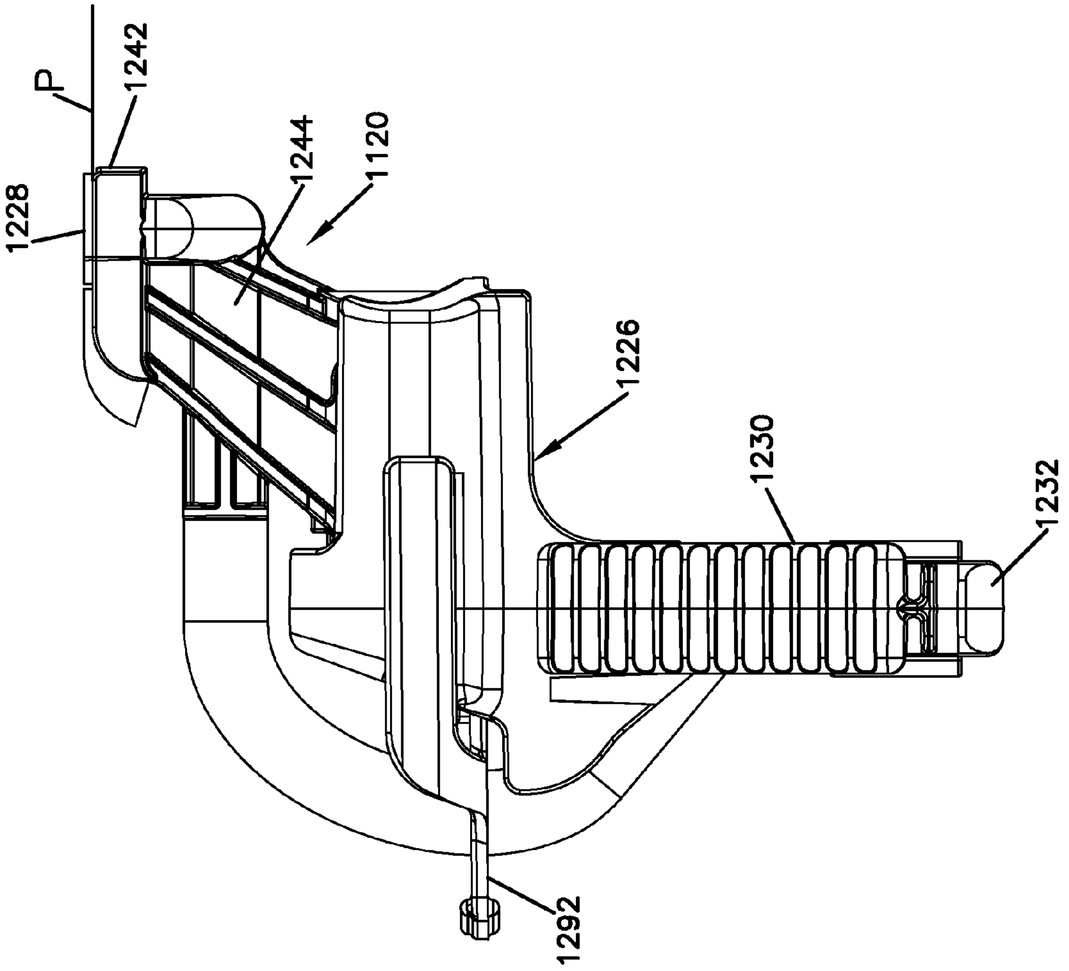
FIG. 37 is a side view of the removable paint applicator of FIG. 36.
Figure 38:
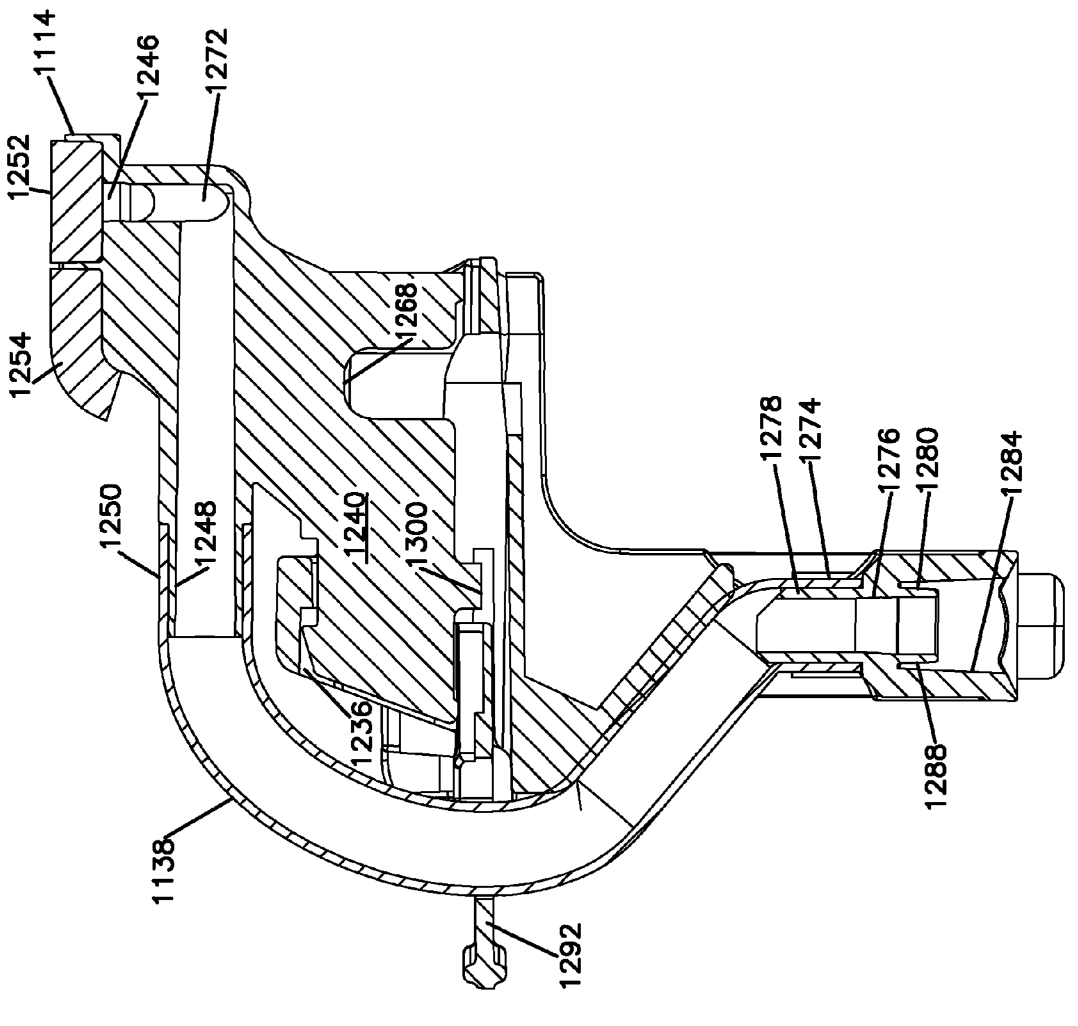
FIG. 38 is a cross-sectional view of the removable paint applicator of FIG. 37 taken along a line bisecting the removable paint applicator.
Figure 39:
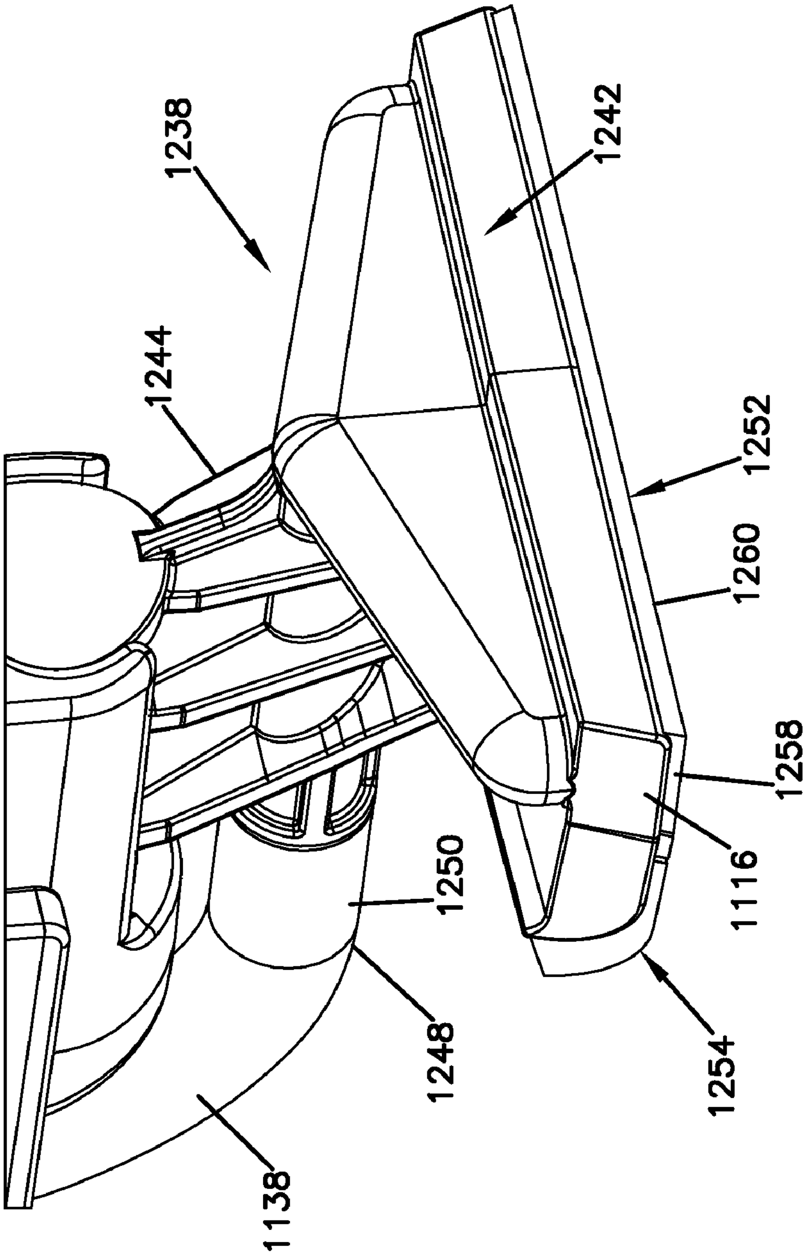
FIG. 39 is a perspective view illustrating the manifold of the removable paint applicator of FIG. 35.
Figure 41:
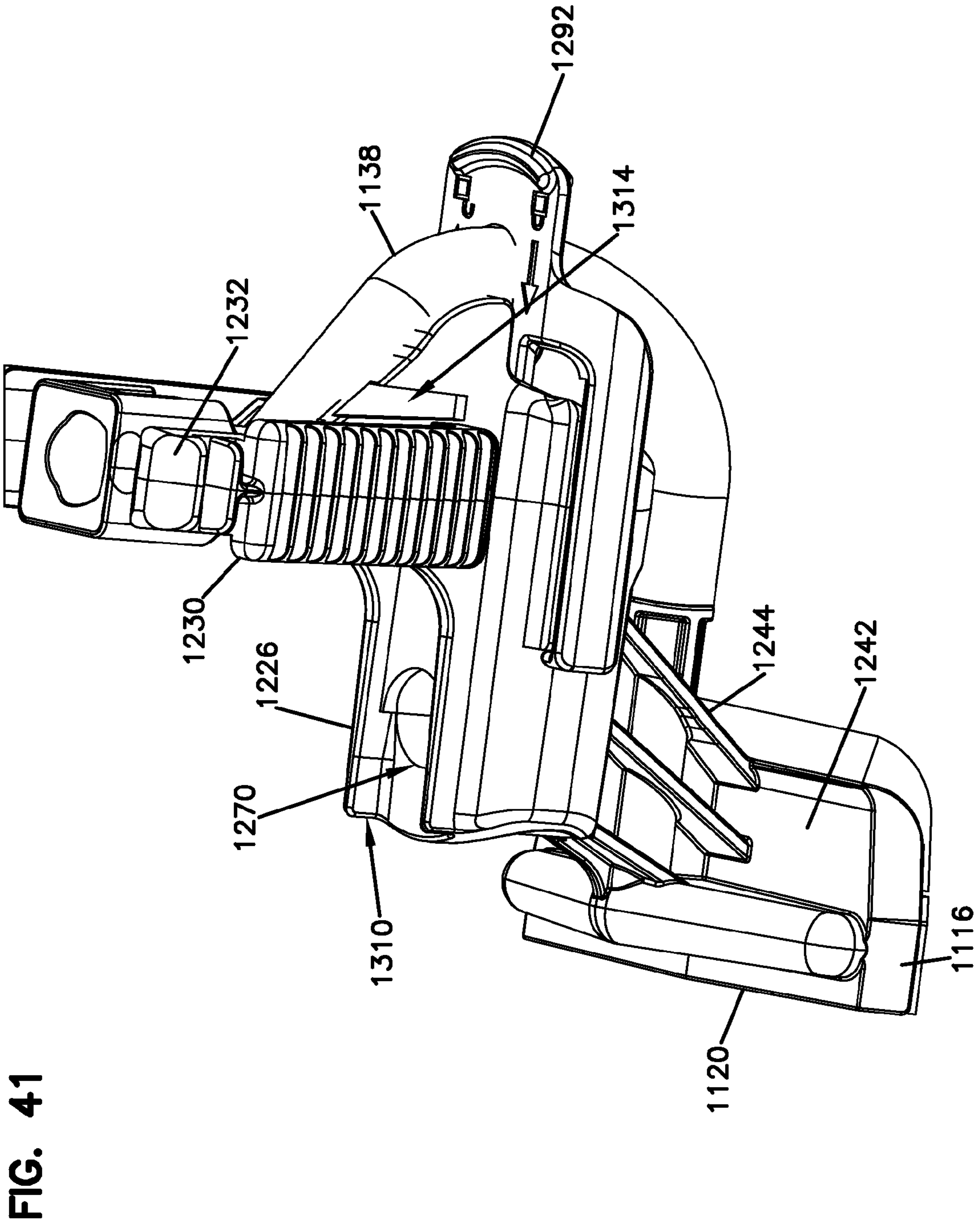
FIG. 41 is a perspective view of the removable paint applicator of FIG. 35 in a fully assembled form.

Referring specifically to FIGS. 35, 38, and 41, the coupling portion 1240 of the manifold body 1238 includes the cam follower surface 1268 that is configured to follow the drive cam 1266 of the motor 1112. The coupling portion 1240 can slidably move within the socket 1236 of the receiver 1226 for vibration in the direction perpendicular to the longitudinal axis $A_{MB}$ of the device body 1122. The receiver 1226 defines a clearance hole 1270 for accommodating the drive cam 1266 of the motor 1112. The drive cam 1266 can communicate with the cam follower 1268 of the manifold 1120 through the clearance hole 1270.

Referring to FIGS. 35, 38, 40, 41, and 43, the intermediate portion 1244 of the manifold body 1238 defines an internal channel 1272 that extends from the dispensing chamber 1246 to the tube inlet 1248, as noted above. The tube inlet 1248 is configured to sealingly receive a first end 1250 of the paint feed tube 1138. The second end 1274 of the paint feed tube 1138 extends to an adapter structure 1276 defined on the receiver 1226. The adapter structure 1276 defines a tube inlet 1278 for sealingly receiving the second end 1274 of the tube 1138 coming from the dispensing chamber 1246 of the manifold 1120 and a syringe inlet 1280 that receives a syringe luer 1282 of the syringe 1102.

As noted above, the ends 1250, 1274 of the paint feed tube 1138 may be retained with respect to the tube inlet 1278 of the receiver 1226 and the tube inlet 1248 of the manifold 1120 with an interference fit. In other examples, the connection could include a number of different connectors such as barbed fitting, a luer lock, a push-to-connect configuration, etc.

Figure 43:
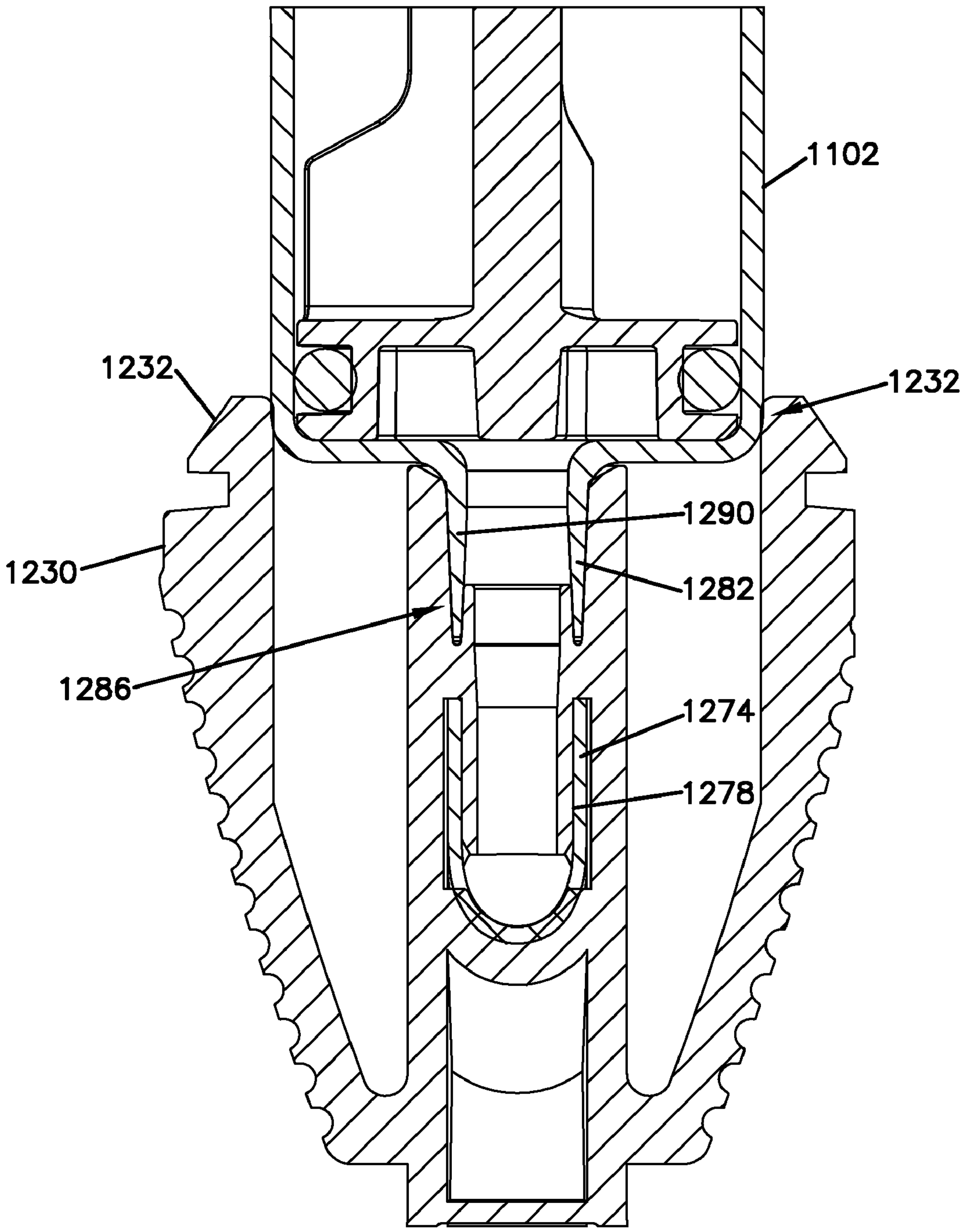
FIG. 43 illustrates the seal between the luer of the syringe and the receiver of the removable paint applicator of FIG. 35.

Now specifically referring to FIG. 43, in the depicted embodiment, the syringe inlet 1280 of the receiver 1226 defines an outer tapered sealing face 1284 that interacts with a tapered sealing face 1286 on the outer diameter (OD) of the syringe 1102. The syringe inlet 1280 of the receiver 1226 also defines an inner tapered sealing face 1288 that interacts with a tapered sealing face 1290 on the inner diameter (ID) of the syringe 1102. The interaction of the sealing faces between the syringe inlet 1280 and the syringe luer 1282 cause an inward compression of the OD of the luer 1282 and an outward expansion of the ID of the luer 1282 to create an automatic seal between the syringe inlet 1280 and the luer 1282 when the two structures are mated. Thus, a completely sealed path is formed all the way from the syringe 1102 to the dispensing chamber 1246, without any paint contacting non-disposable parts of the apparatus (e.g., the main body 1122 of the apparatus 1100).

The tight fit between the syringe luer 1282 and the syringe inlet 1280 to provide the automatic seal also acts as a keying feature for associating the particular removable disposable syringe 1102 with the given device 1100.

Figure 44:
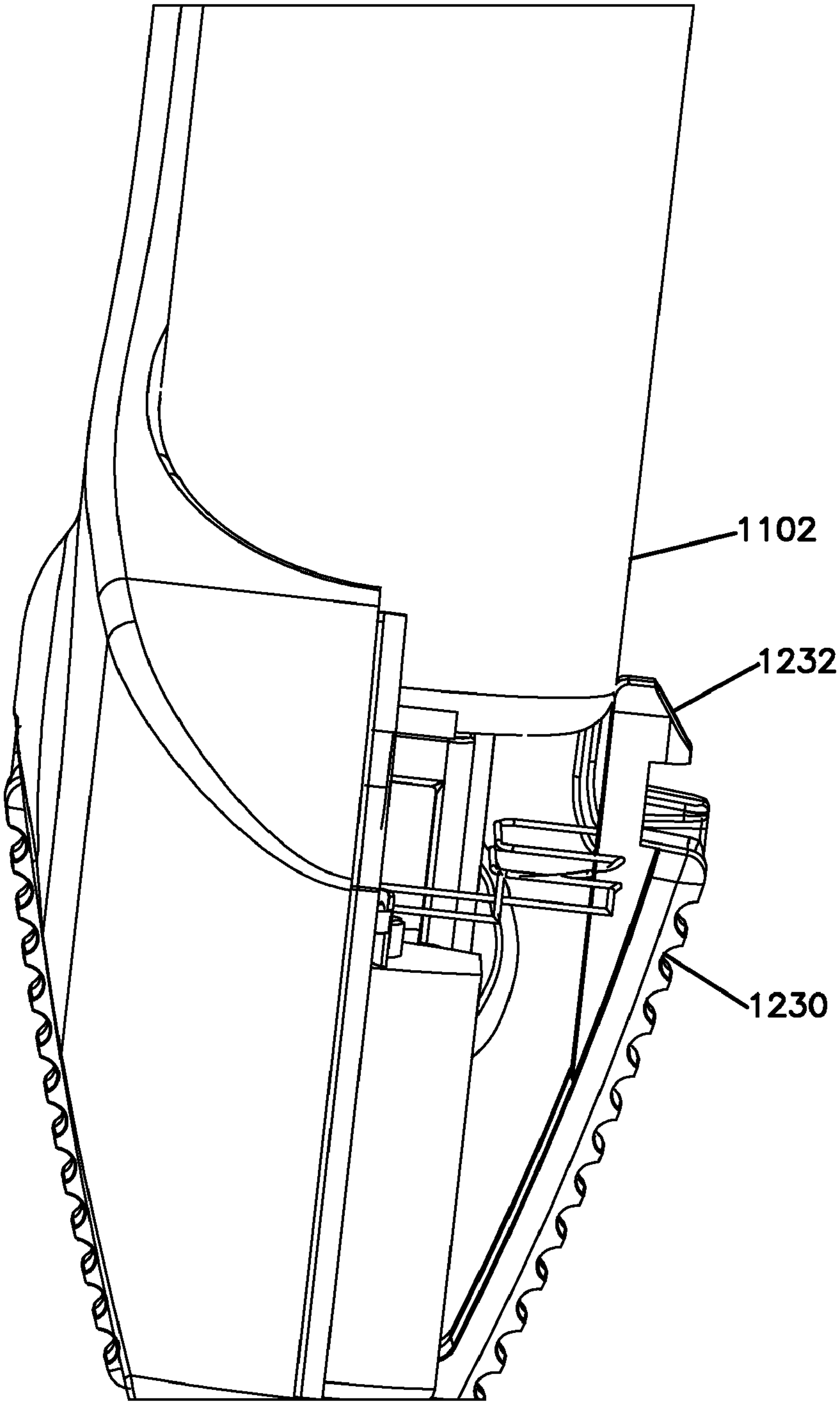
FIG. 44 illustrates a close-up view of the mechanism that prevents removal of the paint applicator from the body of the apparatus when the syringe is present.
Figure 45:
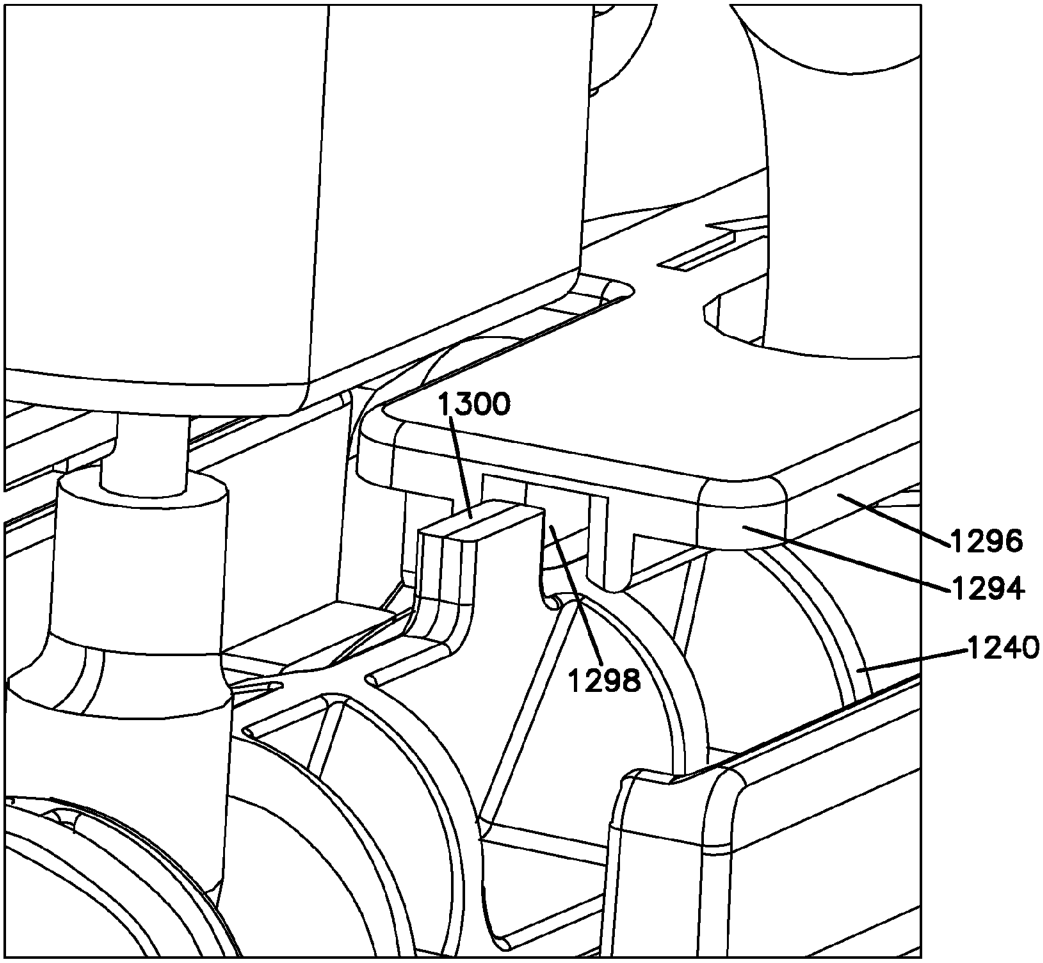
FIG. 45 illustrates a close-up view of the pivot lock feature of the removable paint applicator of FIG. 35.
Figure 46:
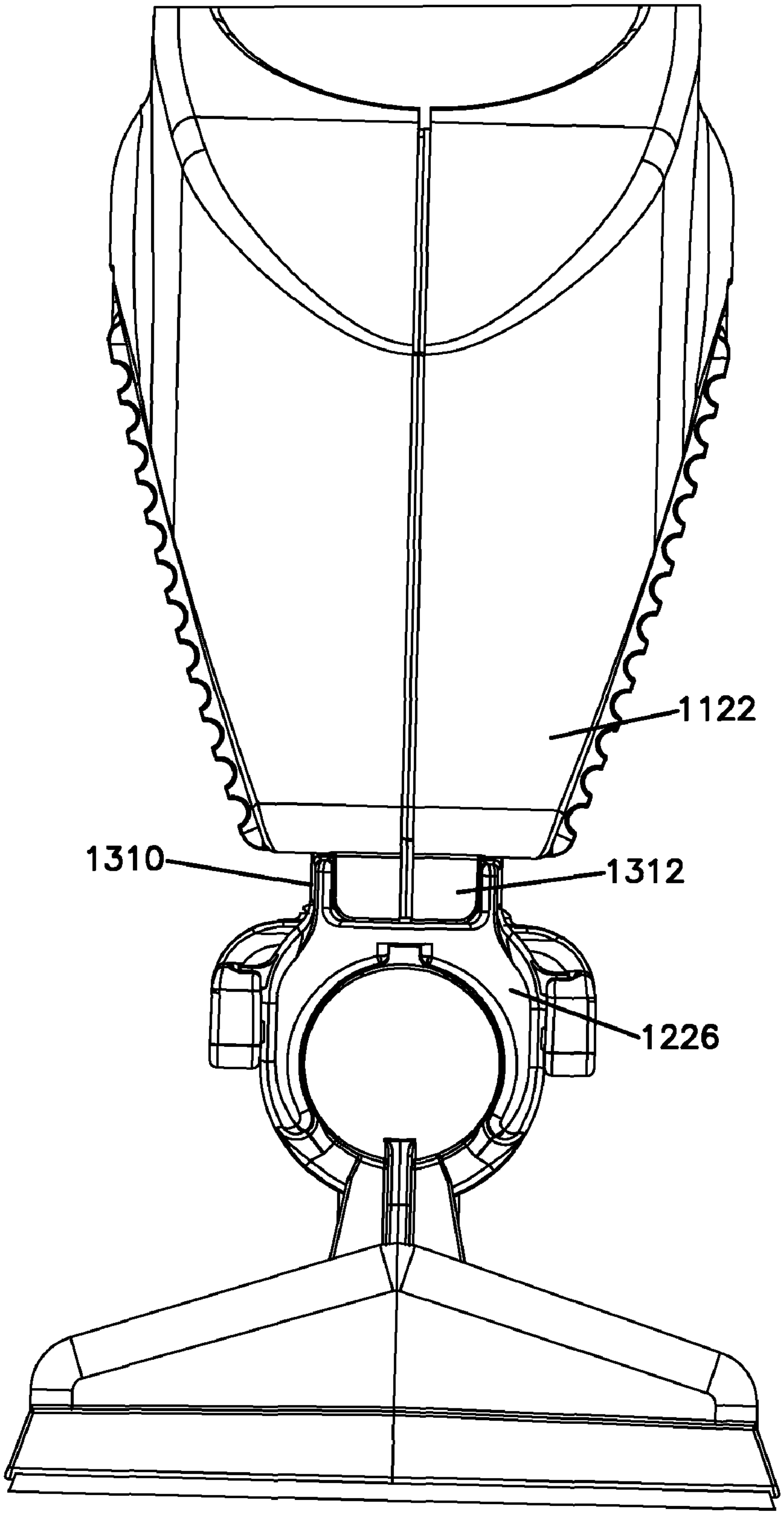
FIG. 46 illustrates an example of a keying mechanism between the body of the apparatus and the removable paint applicator of FIG. 35.
Figure 47:
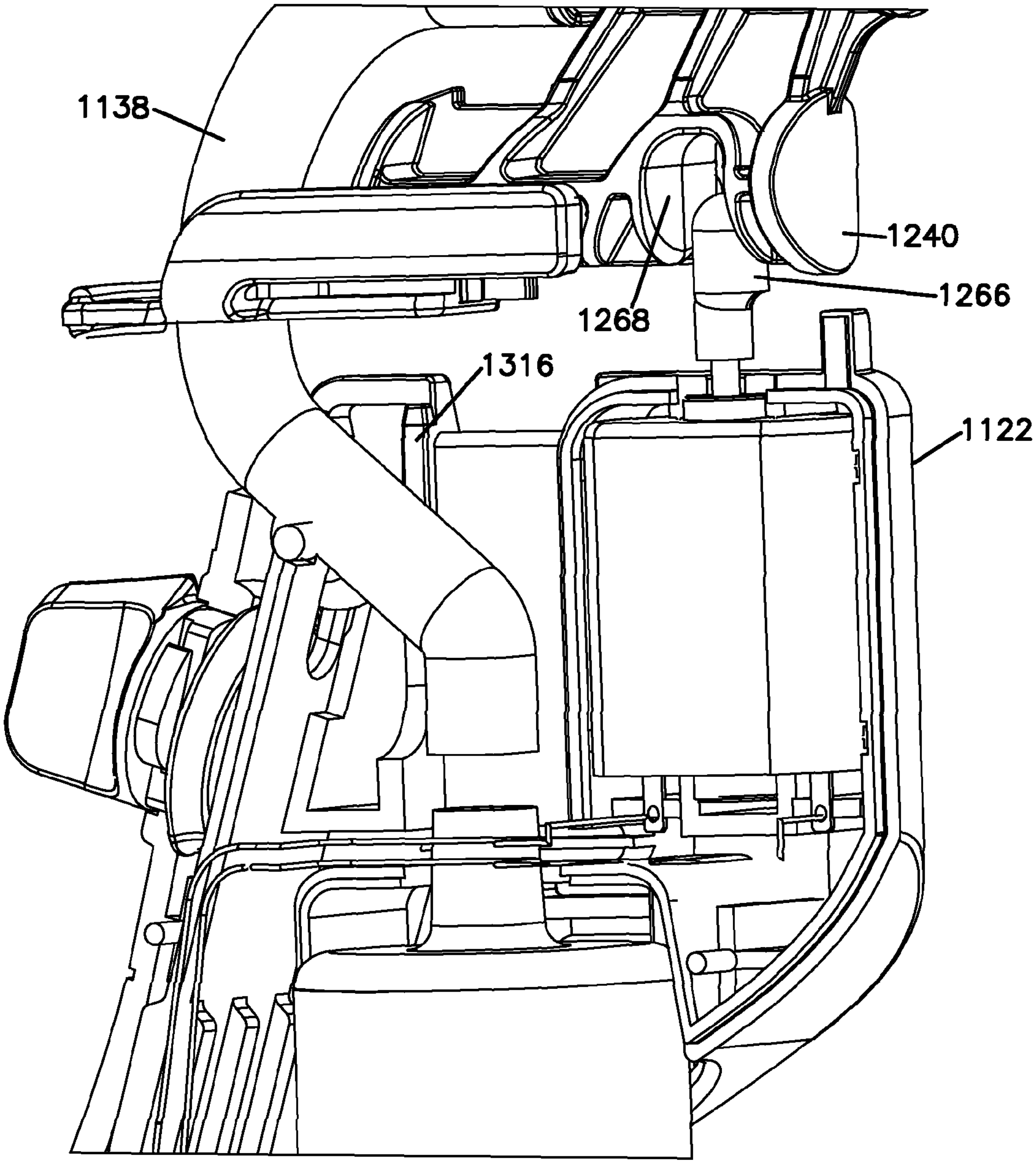
FIG. 47 illustrates another keying mechanism between the body of the apparatus and the removable paint applicator of FIG. 35.

In order to limit the contact of paint with non-disposable parts of the device (e.g., the main body 1122 of the apparatus 1100), the device 1100 has also been configured with certain features to provide a certain sequencing in loading the painting module 1136 into the main body 1122 of the device 1100. For example, the device 1100 is configured such that removable paint applicator 1108 cannot be released from the body 1122 of the device 1100 when the syringe 1102 is present. As shown in FIGS. 43 and 44, when the receiver 1226 of the paint applicator 1108 is mounted to the body 1122, the flexible cantilever arms 1230 of the receiver 1226 are positioned rearwardly far enough along the main body 1122 so that portions thereof overlap with a portion of the syringe 1102. In this manner, the cantilever arms 1230 cannot be flexed inwardly to remove the paint applicator 1108 from the body 1122 without first removing the paint source 1102 from the body 1122. This provides a safety mechanism to limit spilling of paint into the body 1122 of the device 1100 since the plunger 1140 is normally biased toward a paint dispensing position.

In certain embodiments, it might be desired to lock the pivoting motion of the manifold 1120 with respect to the receiver 1226 (allowed by the generally cylindrical shape of the coupling portion 1240 within a complementary shape of the socket 1236 of the receiver 1226) without affecting the up/down vibrating motion. As seen in FIGS. 35, 38, 40, 41, and 45, a pivot lock 1292 may be used. In the depicted embodiment, the pivot lock 1292 defines a locking plate 1294 that is configured to slide within the socket 1236 of the receiver to restrain any pivotal movement of the coupling portion 1240 of the manifold 1120 within the socket 1236. The locking plate 1294 defines side edges 1296 that contact opposing inner surfaces of the socket 1236 and also defines a slot 1298 that receives a tab 1300 defined on the coupling portion 1240 of the manifold 1120. The slot 1298, when engaged over the tab 1300, restrains any pivotal movement of the manifold 1120 along plane(s) generally perpendicular to a line defined by the up/down vibrational path. A clearance hole 1302 in the pivot lock 1292 accommodates the paint feed tube 1138 so as to not interfere with the lumen of the paint feed tube 1138 in either the unlocked or the locked orientation of the pivot lock 1292. A pair of arms 1304 of the pivot lock 1292 interact with complementary tracks 1306 on the receiver 1226 for slidable movement of the pivot lock 1292 along the outer surface of the receiver 1226. The pair of arms 1304 and the complementary tracks 1306 define discrete locking structures 1308 for locking and unlocking the pivot lock 1292.

As noted above, numerous keying features might be provided between the main body 1122 of the device 1100 and some of the removable or disposable portions of the device 1100 so as to associate particular removable or disposable features with a given device. For example, in addition to providing a syringe 1102 that only fits within the given syringe cavity 1144 of the body 1122, providing a syringe 1102 that has a plunger 1140 that only keys to the given urging mechanism 1104, providing a syringe 1102 that has a syringe luer 1282 that only fits a given profile of the syringe inlet 1280 of the receiver structure 1226 (e.g., blindly) and that also encounters tapered sealing faces on the OD and the ID of the luer 1282 for an automatic sealing function, the device 1100 may also key other parts of the removable painting module 1136.

For example, in the depicted embodiment of the device 1100, the removable paint applicator 1108 may be keyed to the main body 1122 of the device 1100. In the given embodiment, the receiver 1226 includes stabilizing ribs 1310 that mate with a complementary keying feature 1312 on the front 1126 of the main body 1122 (please see FIG. 46). As another example, the receiver 1226 includes at least one slot 1314 (a pair of slots 1314 on the given embodiment, one on each side) that mates with a rib 1316 on the body 1122 to stabilize the removable applicator 1108 (please see FIG. 47).

It should be noted that the example structures described above are only some of the many features that can be used for keying purposes and other structures can be used.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown and described. However, the present inventor also contemplates examples in which only those elements shown and described are provided.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. Section 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The invention claimed is:

1. A hand held paint edging apparatus configured for being held and operated by a single hand of a user, comprising:

(a) a main body configured to detachably receive a disposable painting module;

(b) a disposable painting module arranged and configured to be operably rapidly detachably engaged with and carried by said main body, said painting module having all paint carrying and contacting components of the edging apparatus, comprising:

(i) a paint reservoir configured for rapid detachable engagement with said main body, comprising a syringe body having a fluid outlet and a plunger slidable within said syringe body for discharging paint from said body and through said fluid outlet;

(ii) a paint applicator arranged and configured for rapid detachable engagement with said main body and operable to slidably apply paint in edging manner to a work surface; and (iii) a fluid coupling operatively connected to deliver paint from said reservoir fluid outlet to said paint applicator;

(c) flow control apparatus cooperatively engaging said fluid coupling for controllably regulating flow of paint through said fluid coupling between closed and selectively open positions;

(d) an urging mechanism including a constant force spring coupled to said main body and movable to impart a substantially constant force on said reservoir plunger throughout its operative travel through said syringe body, to discharge paint from said reservoir through said fluid outlet;

(e) an electric vibrator mounted to said main body and operatively connected to said paint applicator and to receive energizing power from a power source, for imparting when energized through a switch, oscillatory vibrating motion to said paint applicator; and (f) a trigger mechanism mounted to said main body and operatively connected to said switch, said flow control apparatus and said urging mechanism, said trigger mechanism being operable between non-actuated and actuated modes by the same hand of a user that operatively holds the paint edging apparatus; said trigger mechanism being operable when moved to said actuated mode to:

(i) close said switch to provide said energizing power to said electric vibrator;

(ii) move said flow control apparatus to selectively enable fluid flow through said fluid coupling; and (iii) impart a momentary break away force to said reservoir plunger through said urging mechanism in addition to that of said constant force, to overcome any initial sticking of said plunger within said syringe body.

2. An apparatus according to claim 1, wherein one of said paint applicator and said main body includes a pair of opposed cantilever arms, having at least a portion that is elastically flexible, and wherein the other of said paint applicator and said main body includes receptors configured to cooperatively receive and operatively secure said arms in rapid snap-fit interlocking manner to releasibly secure said paint applicator to said main body.

3. An apparatus according to claim 2, further including an interlocking apparatus comprising said arms and said receptors when operatively engaged and said paint reservoir when operatively engaged with said main body, to prevent removal of said paint applicator from said main body as long as said paint reservoir remains operatively engaged with said main body.

4. An apparatus according to claim 1, wherein the paint applicator includes a manifold having an inlet coupled to the fluid coupling and having at least one paint dispensing opening, the manifold configured to receive paint through said manifold inlet and to discharge the received paint through said paint dispensing opening; and wherein said main body extends along a longitudinal axis, and wherein said apparatus includes a pivot connection between said main body and said manifold having a rotation axis that is generally perpendicular to said longitudinal axis, to allow said main body to freely pivot from side to side about said pivot axis when said paint applicator is engaging said work surface and applying paint thereto.

5. An apparatus according to claim 4, wherein said pivot connection forms a part of said paint applicator.

6. An apparatus according to claim 1, wherein the main body includes a handle portion that extends generally rearwardly at an acute angle with respect to a longitudinal axis defined by the main body, wherein a user can move the hand held paint edging apparatus over a work surface to apply paint to the work surface and also actuate the trigger at the same time by grasping the handle with a single hand.

7. An apparatus according claim 6, wherein said paint applicator includes a manifold portion for holding a porous applicator having a generally planar surface for applying paint to said work surface, wherein said manifold is configured to orient said planar surface generally perpendicular to said longitudinal axis of said main body.

8. An apparatus according to claim 1, wherein the paint applicator includes a manifold having an inlet coupled to the fluid coupling and having at least one paint dispensing opening, the manifold configured to receive paint through said manifold inlet and to discharge the received paint through said paint dispensing opening; and wherein said manifold defines a cavity for holding a porous applicator, said manifold including first and second oppositely disposed sidewalls extending from an upper end of the manifold to lower edges thereof, wherein said porous applicator is disposed within said cavity and is contained between said sidewalls and extends slightly beyond said lower sidewall edges, and is compressible within said manifold as pressure is applied to said manifold in a direction from the upper end of the manifold toward said sidewall edges; wherein maximum compression of said porous applicator is limited by the distance that said porous applicator extends beyond said lower sidewall edges when in said uncompressed state; whereby maximum compression of the porous applicator remains constant regardless of how much excess pressure is applied to the manifold after the sidewall lower edges engage said work surface.

9. An apparatus according to claim 8, wherein at least a portion of said manifold sidewalls downwardly diverge from one another in the direction of said sidewall lower edges.

10. An apparatus according to claim 1, wherein the paint applicator includes a manifold having an inlet coupled to the fluid coupling and having at least one paint dispensing opening, the manifold configured to receive paint through said manifold inlet and to discharge the received paint through said paint dispensing opening; and wherein the paint applicator includes a porous applicator attached to the manifold, said porous applicator being configured to receive the paint discharged from the paint dispensing opening and to apply the paint to said work surface, said manifold defining an upper portion containing said paint inlet and dispensing outlet and a lower work surface contact portion that includes first and second sidewalls spaced apart by an internal width extending therebetween, said porous applicator being arranged and laterally sized to lie between and completely within said width defined by said first and second sidewalls of said surface contact portion of the manifold.

11. An apparatus according to claim 10, wherein each of said first and second sidewalls defines a distal edge configured for operatively contacting said work surface to be painted, each of said sidewalls being angled away from the edge so as to leave a space between said upper manifold portion and a second work surface that includes at least a portion generally perpendicular to said work surface to which paint is being applied.

12. A hand held paint edging apparatus configured for being held and operated by a single hand of a user, comprising:

(a) a main body configured to detachably receive a disposable painting module;

(b) a disposable painting module arranged and configured to be operably rapidly detachably engaged with and carried by said main body, comprising:

(i) a paint reservoir configured for rapid detachable engagement with said main body, comprising a syringe body having a fluid outlet and a plunger slidable within said syringe body for discharging paint from said body through said fluid outlet;

(ii) a paint applicator arranged and configured for rapid detachable engagement with said main body and operable to slidably apply paint in edging manner to a working surface, comprising:

(1) A porous applicator configured to accept discharged paint from said paint reservoir and to apply said paint to a working surface;

(2) An applicator housing defining a manifold for receiving and dispersing paint, said housing forming a recessed portion sized and configured to receive and substantially contain said porous applicator therein except for a lower portion thereof configured to discharge and apply paint to a working surface; said manifold being configured to apply paint passing therethrough to said porous applicator; and (3) A plurality of projection members downwardly extending from said applicator housing to lower edges configured to contact said working surface when pressure is applied to said applicator housing, to compress said porous applicator between said applicator housing and the working surface; said projections limiting the amount of operative compression on said porous applicator, wherein an even, uniform flow of paint is dispersed through said porous applicator to said working surface; and (iii) a fluid coupling operatively connected to deliver paint from said reservoir fluid outlet to said paint applicator housing;

(c) a first flow control apparatus cooperatively engaging said fluid coupling for controllably regulating flow of paint through said fluid coupling between closed and selectively open positions;

(d) an urging mechanism including a constant force spring coupled to said main body and movable to impart a substantially constant force on said reservoir plunger throughout its operative travel through said syringe body, to discharge paint from said reservoir through said fluid outlet;

(e) a trigger mechanism mounted to said main body and operatively connected to said first flow control apparatus, said trigger mechanism being operable between non-actuated and actuated modes by the same hand of a user that operatively holds the paint edging apparatus, and being operable when moved to said actuated mode to move said first flow control apparatus to selectively enable fluid flow through said fluid coupling; and (f) a second fluid control apparatus cooperatively engaging said fluid coupling and having a control mechanism to adjust the volumetric rate of uniform flow through said fluid coupling, independent of the first fluid control apparatus that is operated by the trigger mechanism, and being suitable for adjusting flow rate to accommodate different paint viscosities.

13. An apparatus according to claim 12, wherein:

(a) said plurality of projection members comprise opposed sidewalls of said applicator housing extending from said manifold to lower edges of said sidewalls; and (b) wherein said porous applicator is secured within said applicator housing recessed portion and has a predetermined thickness sized to extend in an uncompressed state a predetermined fixed distance below said sidewall lower edges, such that when operative pressure is applied through said main body on said applicator housing to compress said porous applicator, the porous applicator compression is limited by said predetermined fixed distance, regardless of whether further forces are applied to said applicator housing after said sidewall lower edges engage said work surface; whereby uniform flow of paint through said porous applicator to the work surface is maintained as said pad is moved along the working surface.

14. An apparatus according to claim 13, wherein said working surface comprises a first working surface, and wherein at least a portion of said applicator housing opposed sidewalls diverge from one another in the downward direction and are configured such that only outermost portions of said diverging sidewalls are designed to operatively engage a second working surface, adjacent to and extending perpendicular to said first work surface to which paint is being applied, whereby frictional forces between said sidewalls and second working surface are reduced.

15. An apparatus according to claim 14, wherein said outermost portions of said diverging sidewall portions comprise at least a portion of the lower outer edges of said sidewalls.

16. An apparatus according to claim 12, wherein said main body extends along a longitudinal axis, and wherein said apparatus includes a pivot connection between said main body and said applicator housing, having a rotational axis that is generally perpendicular to said longitudinal axis, allowing said main body to freely pivot from side to side about said pivot axis when said paint applicator is operatively engaging said working surface and applying paint thereto.

17. An apparatus according to claim 12, including an interlocking apparatus cooperatively arranged and configured between said paint applicator, said paint reservoir and said main body, operative to prevent detachment of said paint applicator from said main body when said paint reservoir is operatively engaged with said main body.

18. An apparatus according to claim 12, wherein one of said paint applicator and said main body includes a pair of opposed cantilever arms, having at least a portion that is elastically flexible, and wherein the other of said paint applicator and said main body includes receptors configured to cooperatively receive and operatively secure said arms in rapid snap-fit interlocking manner to releasibly secure said paint applicator to said main body.

19. An apparatus according to claim 12, further including an electric vibrator mounted on said main body and configured to selectively impart vibratory motion to said applicator housing; wherein vibration of said applicator housing results in back and forth reciprocal movement within a single plane of motion and in a direction substantially parallel with the direction of edging movement of said paint applicator; whereby said back and forth reciprocal motion reduces drag of said paint applicator against the working surface and enhances movement along a straight edging line.

20. The apparatus of claim 12, wherein said painting module comprises all of the paint carrying and contacting components of the edging apparatus.

* * * * *